(12) United States Patent
Shimizu et al.

(10) Patent No.: US 10,638,026 B2
(45) Date of Patent: Apr. 28, 2020

(54) IMAGE PICKUP APPARATUS THAT CONTROLS IMAGE PICKUP APPARATUS BODY ACCORDING TO LENS BARREL MOUNTED THEREON, AND METHOD OF CONTROLLING THE SAME

(71) Applicant: CANON KABUSHIKI KAISHA, Tokyo (JP)

(72) Inventors: Yoko Shimizu, Kawasaki (JP); Takashi Arai, Yokohama (JP); Takeshi Hamada, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 4 days.

(21) Appl. No.: 15/924,774

(22) Filed: Mar. 19, 2018

(65) Prior Publication Data

US 2018/0278817 A1    Sep. 27, 2018

(30) Foreign Application Priority Data

Mar. 22, 2017 (JP) .................... 2017-055837

(51) Int. Cl.
*H04N 5/225* (2006.01)
*H04N 5/232* (2006.01)
*G02B 7/14* (2006.01)
*G02B 27/00* (2006.01)
*G03B 17/14* (2006.01)
(Continued)

(52) U.S. Cl.
CPC ............. *H04N 5/2254* (2013.01); *G02B 7/14* (2013.01); *G02B 27/0018* (2013.01); *G03B 9/02* (2013.01); *G03B 11/04* (2013.01); *G03B 17/14* (2013.01); *H04N 5/2253* (2013.01); *H04N 5/232* (2013.01); *H04N 5/23212* (2013.01); *H04N 5/23241* (2013.01); *H04N 5/23296* (2013.01); *G02B 5/003* (2013.01)

(58) Field of Classification Search
CPC ............... H04N 5/2253; H04N 5/2254; H04N 5/23212; H04N 5/23296; G02B 7/14
USPC .......... 348/357, 340, 360, 842; 396/355, 34, 396/494; 250/515.1, 208.1
See application file for complete search history.

(56) References Cited

U.S. PATENT DOCUMENTS 7,804,532 B2 * 9/2010 Takahashi ................ H04N 9/64
                                                             348/243
8,749,693 B2 * 6/2014 Uchida ................... H04N 5/225
                                                             348/340
(Continued)

FOREIGN PATENT DOCUMENTS

JP    2004-117402 A    4/2004
JP    2010-176071 A    8/2010

Primary Examiner — Marly S Camargo
(74) Attorney, Agent, or Firm — Carter, DeLuca & Farrell LLP

(57) ABSTRACT

An image pickup apparatus on and from which a lens unit can be mounted and removed. The image pickup apparatus includes an image pickup device, a mount part on and from which a lens unit is mounted and removed on the image pickup apparatus, a light shielding member that is provided between the image pickup device and the mount part, and shields light in a peripheral part of a light flux guided by the lens unit by adjusting an opening amount in a photographic optical path. The opening amount of the light shielding member is controlled based on information on the lens unit mounted on the mount part.

18 Claims, 39 Drawing Sheets

(51) Int. Cl.
*G03B 9/02* (2006.01)
*G03B 11/04* (2006.01)
*G02B 5/00* (2006.01)

(56) References Cited

U.S. PATENT DOCUMENTS

| | | | | |
|---|---|---|---|---|
| 9,282,268 | B2* | 3/2016 | Tange | H04N 5/3745 |
| | | | | 348/308 |
| 10,070,027 | B2* | 9/2018 | Takahashi | H04N 5/2254 |
| | | | | 348/143 |
| 2005/0254812 | A1* | 11/2005 | Kosaka | G03B 17/20 |
| | | | | 396/147 |
| 2006/0007551 | A1* | 1/2006 | Sakurai | G02B 21/00 |
| | | | | 396/611 |
| 2010/0253832 | A1* | 10/2010 | Duparre | H04N 5/225 |
| | | | | 348/340 |
| 2013/0033606 | A1* | 2/2013 | Takahashi | H04N 5/33 |
| | | | | 348/164 |

* cited by examiner

ZOOMING OPERATION

FOCUSING OPERATION

DIAPHRAGM OPERATION

FIG. 36A
FIG. 36B
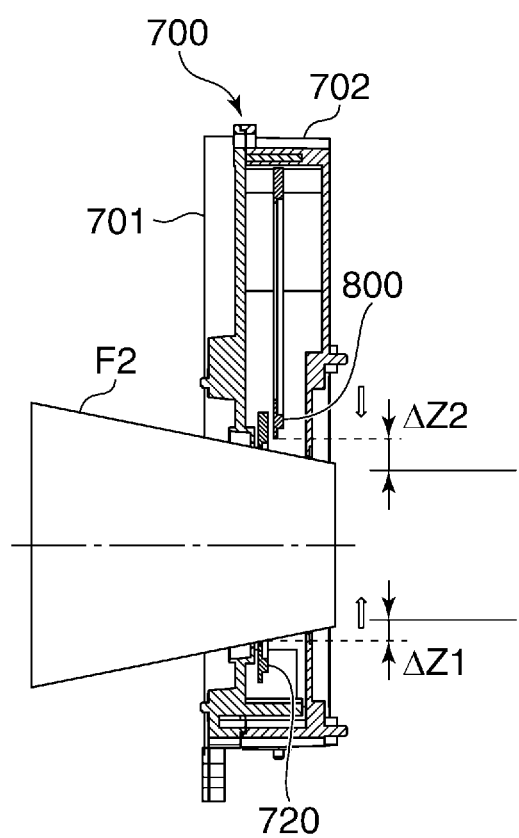
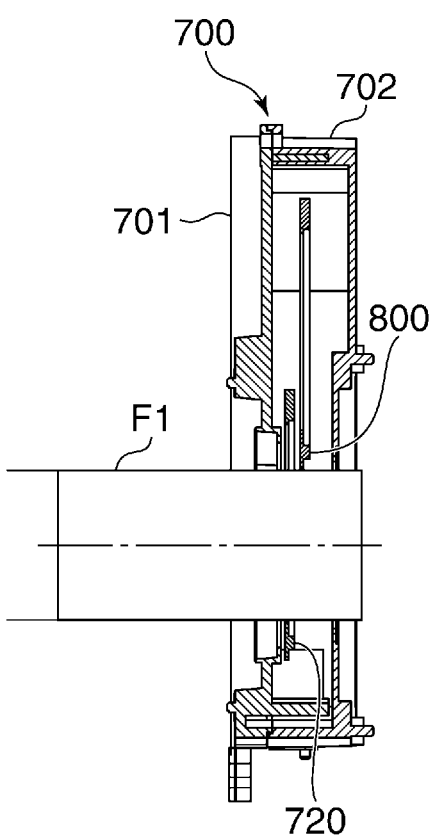

*FIG. 37A*     *FIG. 37B*
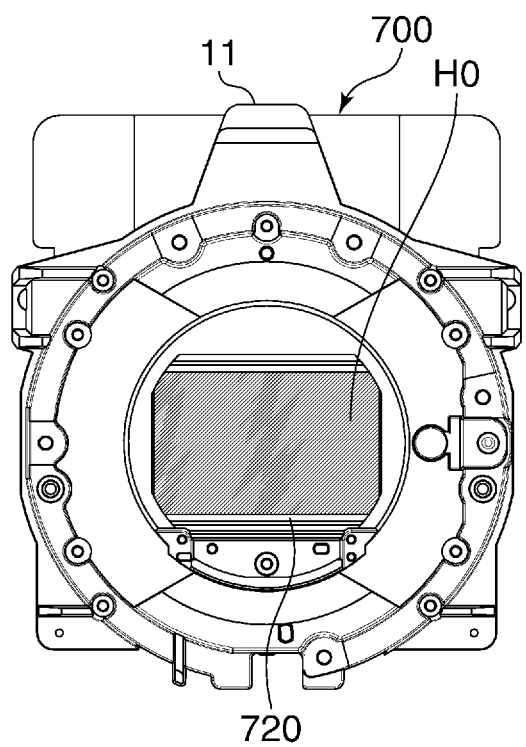
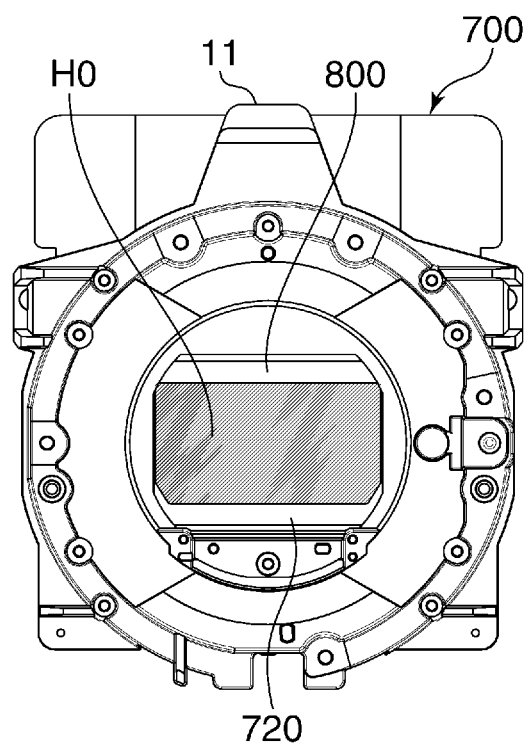

IMAGE PICKUP APPARATUS THAT CONTROLS IMAGE PICKUP APPARATUS BODY ACCORDING TO LENS BARREL MOUNTED THEREON, AND METHOD OF CONTROLLING THE SAME

BACKGROUND OF THE INVENTION

Field of the Invention

The present invention relates to an image pickup apparatus that is capable of interchanging a lens barrel, and more particularly to an image pickup apparatus that controls an image pickup apparatus body according to a lens barrel mounted thereon.

Description of the Related Art

A lens-interchangeable image pickup apparatus, such as a digital single-lens reflex camera, has an opening area formed in an image pickup apparatus body such that an effective light flux entering an image pickup device provided in the image pickup apparatus body is not shielded, and that unnecessary light outside the effective light flux is shielded. In general, an opening amount of the opening area is determined according to a lens which is the largest in the effective light flux of lenses which can be mounted on the image pickup apparatus body. Therefore, in a case where a lens which is small in the effective light flux is mounted on the image pickup apparatus body, the above-mentioned unnecessary light can enter the image pickup apparatus body. To solve this problem, there is generally employed, for example, a method of adjusting an attachment angle of a hood, which is attached on an object-side tip end of the lens barrel, or an opening angle of a matte box, to thereby prevent a high-luminance light source from being included in a photographed image.

However, in a photographing environment in which the image pickup apparatus is used in a state accommodated e.g. in a housing, it is desirable to use the image pickup apparatus in a minimal configuration state with no attachment of a hood, a matte box, or the like. Further, in the case of an image pickup apparatus used for the purpose of observation, such as a monitoring camera, a photographer (monitoring person) is usually remote from the image pickup apparatus, and in this case, it is difficult for the photographer to adjust a light shielding member attached to the lens barrel. Further, in a photographing environment in which a light source exists outside a photographing view angle, bright light emitted from the light source is sometimes reflected by an edge surface of the photographic lens, an inner wall of the lens barrel, an inner wall or an edge surface of a component inside the image pickup apparatus body, or the like. The light reflected as above reaches the image pickup device as unnecessary light, and causes flare or ghost.

To solve such a problem, Japanese Laid-Open Patent Publication (Kokai) No. 2004-117402 proposes an image pickup apparatus equipped with a variable power optical system and configured such that an unnecessary light reduction member having an opening with a variable shape is provided on an emission surface side of a rear group lens of the variable power optical system. According to the technique described in Japanese Laid-Open Patent Publication (Kokai) No. 2004-117402, the shape of the opening of the means for reducing unnecessary light is varied according to a magnification of the variable power optical system, whereby it is possible to prevent occurrence of flare in telescopic photographing. Japanese Laid-Open Patent Publication (Kokai) No. 2010-176071 also proposes a technique for disposing an unnecessary light reduction member that controls the opening area according to an image output area of the image pickup device, on a photographic lens side of the lens-interchangeable image pickup apparatus. According to the technique described in Japanese Laid-Open Patent Publication (Kokai) No. 2010-176071, it is possible to shield unnecessary light by changing the opening area of the unnecessary light reduction member according to vertical and lateral sizes or an aspect ratio of the image output area of the image pickup device.

However, in a case where the opening of the unnecessary light reduction member provided on the photographic lens side is controlled, the unnecessary light reduction member is required to be provided on all of the lens barrels which can be mounted on the image pickup apparatus, and hence this method is not practical. Further, if the unnecessary light reduction member is arranged on the photographic lens side, unnecessary light entering the image pickup apparatus body is reflected by an inner wall surface and a component within the image pickup apparatus body, and then reaches the image pickup device, which causes flare, ghost, etc.

SUMMARY OF THE INVENTION

The present invention provides an image pickup apparatus that controls an image pickup apparatus body according to a lens barrel mounted thereon, and a method of controlling the same.

In a first aspect of the present invention, there is provided an image pickup apparatus on and from which a lens unit can be mounted and removed, comprising an image pickup device, a mount part on and from which the lens unit is mounted and removed, a light shielding member that is provided between the image pickup device and the mount part, and shields light in a peripheral part of a light flux guided by the lens unit by having an opening amount thereof adjusted in a photographic optical path, and a control unit configured to control the opening amount of the light shielding member based on information on the lens unit mounted on the mount part.

In a second aspect of the present invention, there is provided a method of controlling an image pickup apparatus on and from which a lens unit can be mounted and removed, including an image pickup device, a mount part on and from which the lens unit is mounted and removed, and a light shielding member that is provided between the image pickup device and the mount part, and shields light in a peripheral part of a light flux guided by the lens unit by having an opening amount thereof adjusted in a photographic optical path, the method comprising controlling an opening amount of the light shielding member based on information on the lens unit mounted on the mount part.

Further features of the present invention will become apparent from the following description of exemplary embodiments (with reference to the attached drawings).

BRIEF DESCRIPTION OF THE DRAWINGS

FIGS. 36A and 36B are cross-sectional views taken along B-B in FIG. 34.

FIGS. 37A and 37B are front views corresponding to the cross-sectional views in FIGS. 36A and 36B, respectively.

DESCRIPTION OF THE EMBODIMENTS

The present invention will now be described in detail below with reference to the accompanying drawings showing embodiments thereof.

Figure 1:
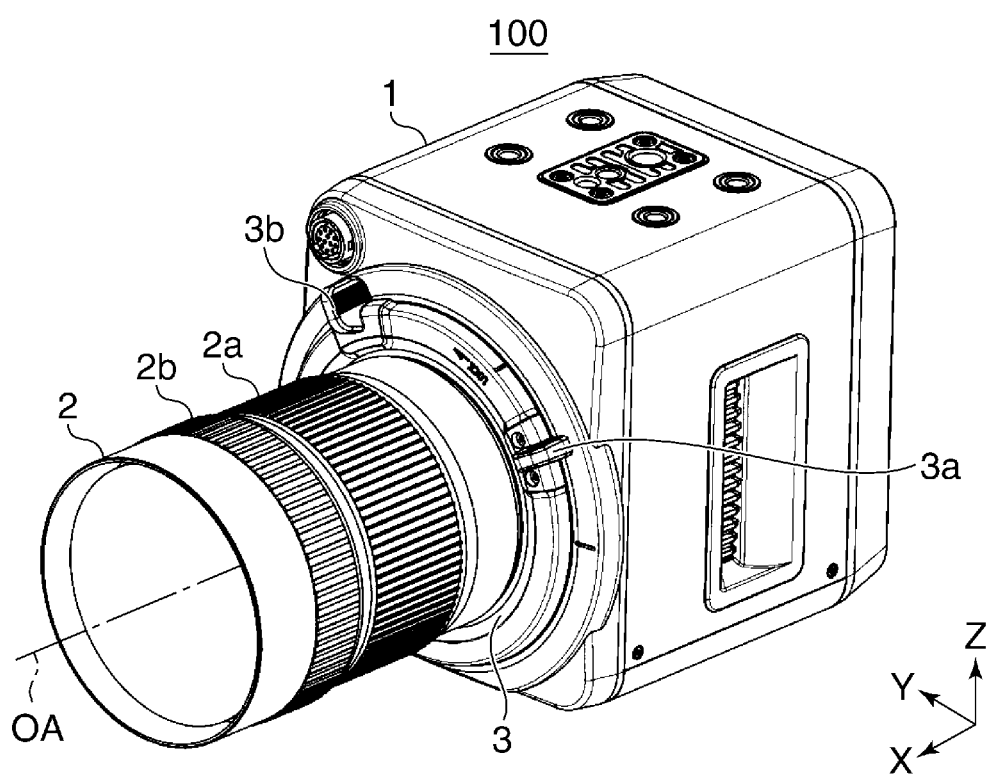
FIG. 1 is a schematic perspective view of an image pickup apparatus according to a first embodiment of the present invention.

FIG. 1 is a schematic perspective view of a lens-interchangeable image pickup apparatus 100 according to a first embodiment of the present invention. The image pickup apparatus 100 has an image pickup apparatus body 1 (hereinafter referred to as the "camera body 1") and a lens barrel 2 which can be removably mounted on the camera body 1 (hereinafter referred to as the "interchangeable lens 2"). Note that a direction parallel to an optical axis OA of the interchangeable lens 2 is defined as an X-axis direction, a direction orthogonal to the X-axis direction in a horizontal plane assuming that the X-axis direction is one direction of horizontal directions is defined as a Y-axis direction, and a direction orthogonal to the X-axis direction and the Y-axis direction is defined as a Z-axis direction for the convenience of explanation.

The interchangeable lens 2 is one of various lens barrels which can be mounted on and removed from the camera body 1, and is assumed here to have a variable optical system. The interchangeable lens 2 can be removably mounted on a lens attaching mount 3 (hereinafter referred to as the "mount 3") which is provided on the camera body 1. In the present embodiment, the mount 3 has a mounting structure in which a screw portion having knobs 3a and 3b is rotated about the optical axis OA to thereby guide a bayonet claw portion provided on the interchangeable lens 2 along the optical axis direction toward an image pickup device disposed within the camera body 1. However, the lens mounting structure that makes it possible to removably mount the interchangeable lens 2 on the camera body 1 is not limited to this, but for example, a well-known bayonet mount or the like may be used. The interchangeable lens 2 has a zoom ring 2a and a focus ring 2b, and is provided with a motive power source for driving a lens group arranged therein, and a controller that controls driving of the lens group. The interchangeable lens 2 includes not only the lens group, but also a diaphragm mechanism that can mechanically adjust an aperture size.

Figure 2:
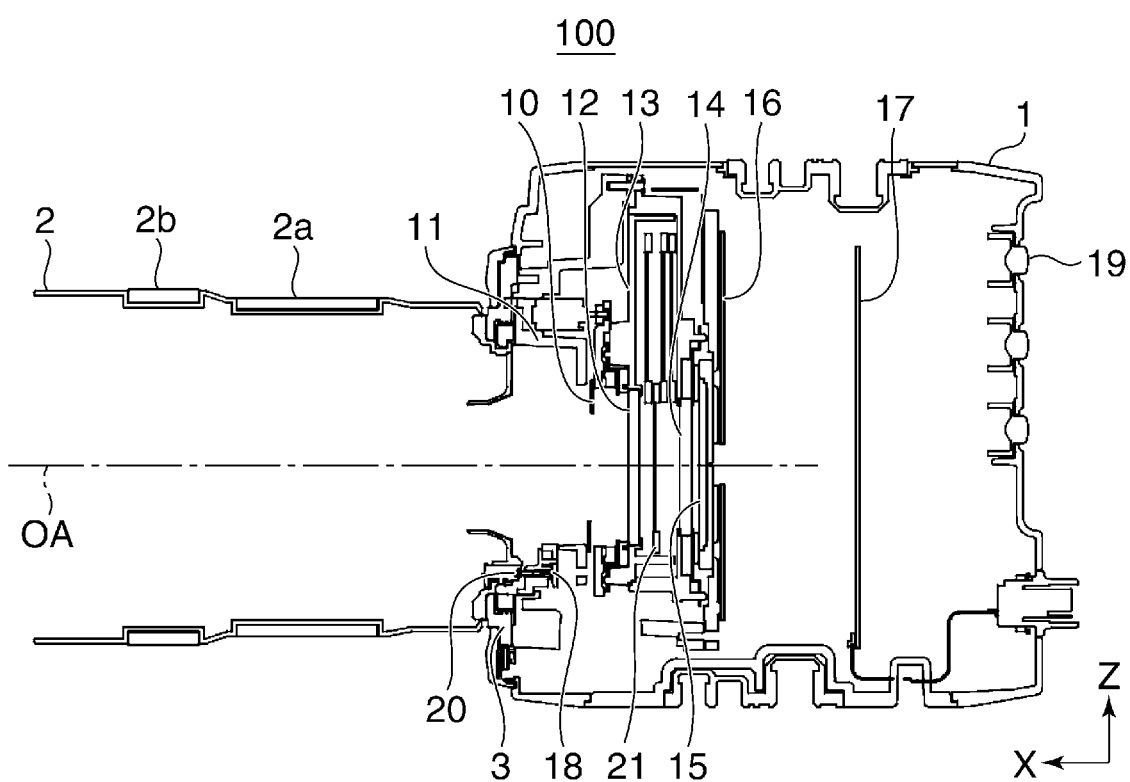
FIG. 2 is a vertical cross-sectional view of the image pickup apparatus according to the first embodiment.

FIG. 2 is a vertical cross-sectional view (view of a cross-section which includes the optical axis OA, and is orthogonal to the Y-axis) of the image pickup apparatus 100. The camera body 1 includes an unnecessary light reduction member 10, low-pass filters 12 and 14, an ND unit 13, the image pickup device, denoted by reference numeral 15, a sensor circuit board 16, a main circuit board 17, a first communication contact 18, an operation section 19, and a mechanical shutter 21. The interchangeable lens 2 includes a second communication contact 20.

The unnecessary light reduction member (light shielding member) 10 is a light shielding member which is drivably mounted on a front base 11 where the mount 3 is provided. The unnecessary light reduction member 10 is arranged on a plane inside the image pickup apparatus 100, which is orthogonal to the optical axis and different from a plane on which the above-mentioned mechanical shutter 21 travels. The detailed construction of the unnecessary light reduction member 10 and how it is driven will be described hereinafter. The low-pass filters 12 and 14 are optical members for reducing moire and false color. The ND unit 13 has a plurality of optical filters including a light amount attenuation filter for adjusting the amount of light entering the image pickup device 15 and an infrared absorption filter (infrared cut filter), and is an example of filter switching means which is capable of inserting and retracting each optical filter into and from a photographic optical path by sliding the optical filter in a direction orthogonal to the optical axis OA. The operation section 19 is means for performing various operations, such as a power on/off operation. The image pickup device 15 is e.g. a CCD sensor or a CMOS sensor. The sensor circuit board 16 has the image pickup device 15, an analog-to-digital conversion circuit 121 (see FIG. 6) which converts an analog signal output from the image pickup device 15 to a digital signal, and so forth, mounted thereon. The main circuit board 17 is electrically connected to the sensor circuit board 16, and controls the overall operation of the image pickup apparatus 100, such as various image processing operations performed on digital signals acquired from the sensor circuit board 16, outputting of a video, and control of the unnecessary light reduction member 10. Note that details of the control performed by the image pickup apparatus 100 and control blocks of the image pickup apparatus 100 will be described hereinafter.

In a state in which the interchangeable lens 2 is mounted on the camera body 1, the first communication contact 18 provided on the camera body 1 and the second communication contact 20 provided on the interchangeable lens 2 are electrically connected to each other. The main circuit board 17 determines, based on a signal output from a switch, not shown, whether or not the interchangeable lens 2 is mounted on the mount 3 provided on the mount 3. The first communication contact 18 and the second communication contact 20 each have a plurality of communication terminals for inputting and outputting information indicative of a focal length, a zoom position, an aperture, and so forth, of the interchangeable lens 2, and a plurality of terminals, including power supply terminals for supplying power for driving the interchangeable lens 2.

Figure 3:
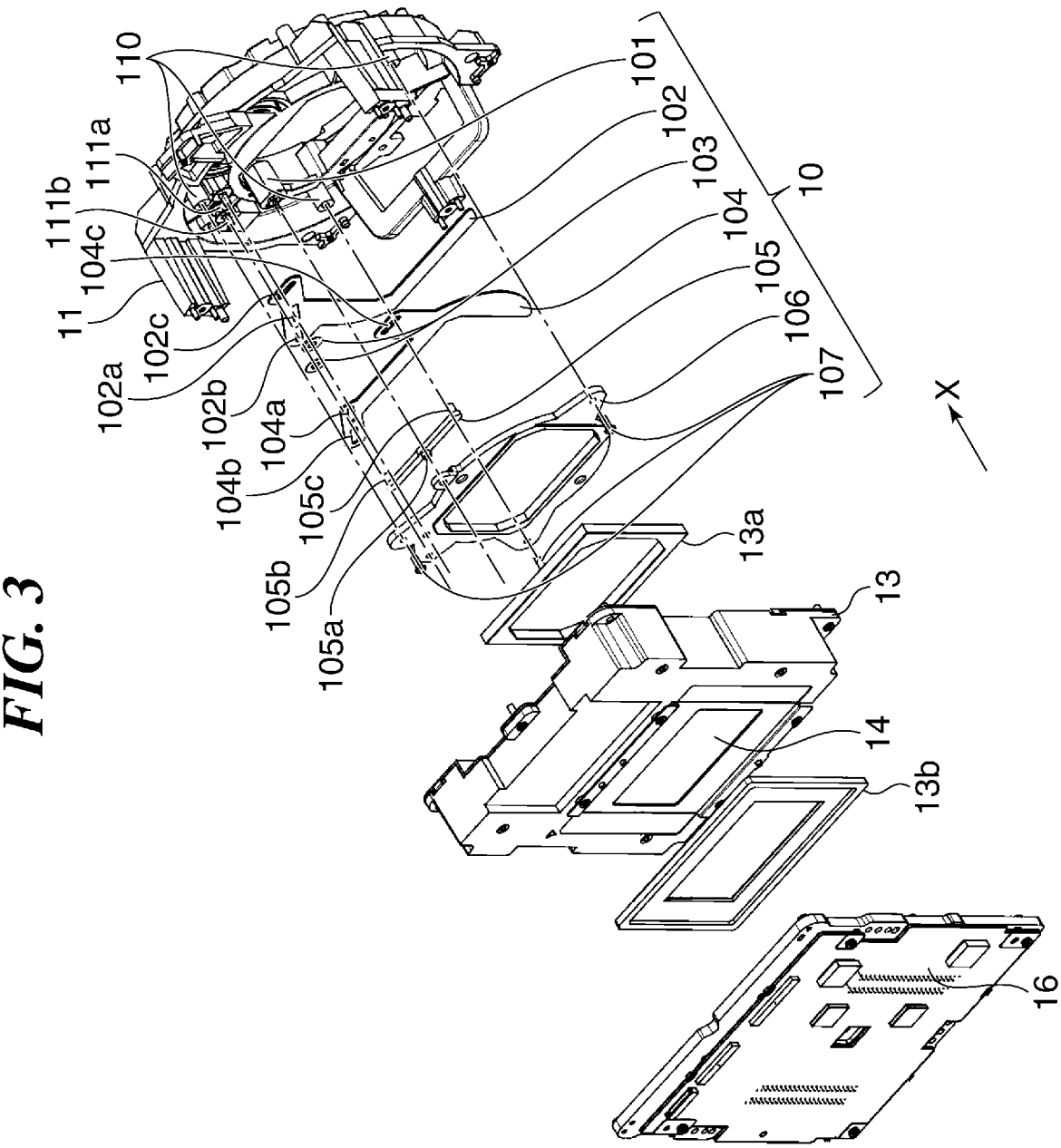
FIG. 3 is an exploded perspective view of essential components of the image pickup apparatus according to the first embodiment.

Next, a method of driving the unnecessary light reduction member 10 will be described. FIG. 3 is an exploded perspective view of essential components of the image pickup apparatus 100, as viewed from the rear side of the image pickup apparatus 100. The unnecessary light reduction member 10 includes a motor 101, a front blade 102, a rear blade 104, sliding spacers 103, a driving arm 105, and a base member 106.

The motor 101 is a drive source of the unnecessary light reduction member 10. The base member 106 is fastened to fastening portions 110 of the front base 11 with screws 107, and the front blade 102 and the rear blade 104 are disposed between the base member 106 and the front base 11 such that they are movable within respective planes orthogonal to the optical axis OA. The front blade 102 and the rear blade 104 each have a substantially L-shape so as to form an opening in an area where a light flux enters, and a shape formed by the front blade 102 and the rear blade 104 around the opening is a symmetrical shape having the optical axis OA as the center.

Support shafts 111a and 111b formed on the front base 11 are inserted through sliding holes 102a and 102b formed in the front blade 102, respectively, and are inserted through sliding holes 104a and 104b formed in the rear blade 104, respectively. The front blade 102 and the rear blade 104 are moved in parallel in respective directions toward the optical axis OA and respective directions away from the optical axis OA along slot shapes of the sliding holes 102a and 102b and the sliding holes 104a and 104b, respectively. The sliding spacers 103 are inserted between the front blade 102 and the rear blade 104 so as to prevent the blades from rubbing against each other to thereby enable smooth movement of the blades. Therefore, a gap corresponding to a thickness of the sliding spacers 103 is formed between the front blade 102 and the rear blade 104 in the optical axis direction.

A central portion 105a of the driving arm 105 is fastened to the motor 101, and the driving arm 105 is rotated about an axis parallel to the X-axis, with the central portion 105a as the center, by driving (rotation) of the motor 101. The motor 101 is electrically connected to the main circuit board 17 via a flexible circuit board, not shown, and the driving of the motor 101, including the rotational angle and the rotational direction during driving of the motor 101, is controlled by a camera controller 124 (see FIG. 6) which controls the unnecessary light reduction member 10. The driving arm 105 has opposite ends formed with drive shafts 105b and 105c, respectively. The drive shaft 105b is slidably fitted in a driving hole 102c formed in the front blade 102, and the drive shaft 105c is slidably fitted in a driving hole 104c formed in the rear blade 104. With this arrangement, rotation of the driving arm 105 is transmitted to the front blade 102 and the rear blade 104 to thereby adjust the size of the opening formed by the front blade 102 and the rear blade 104.

An elastic member 13a seals between the base member 106 and the ND unit 13, and an elastic member 13b seals between the ND unit 13 and the image pickup device 15 (not shown in FIG. 3) mounted on the sensor circuit board 16. This prevents, even when e.g. dust enters from the opening of the mount 3, the dust from entering the image pickup device 15.

Figure 4A:
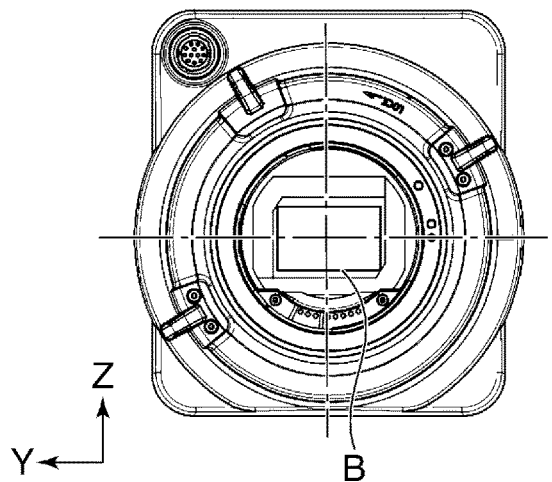
FIGS. 4A to 4C are diagrams useful in explaining a state of an unnecessary light reduction member in a case where an interchangeable lens which is small in effective light flux is mounted in the first embodiment.
Figure 4B:
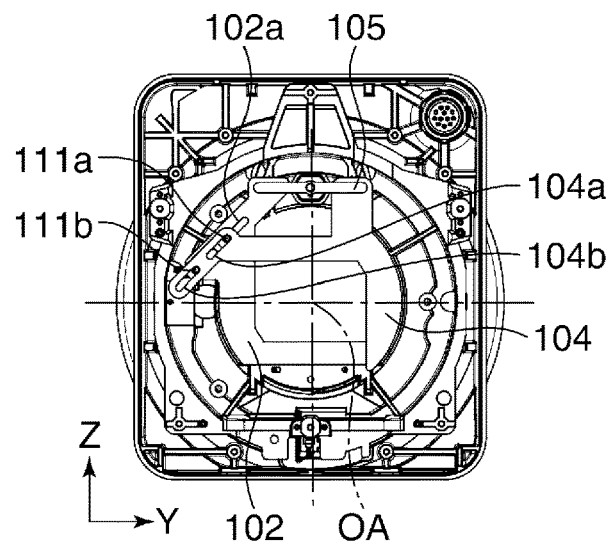
Figure 4C:
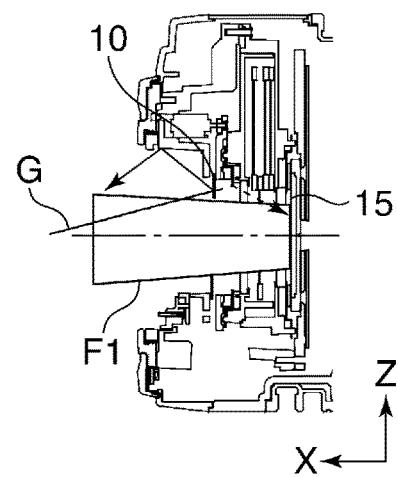
Figure 5A:
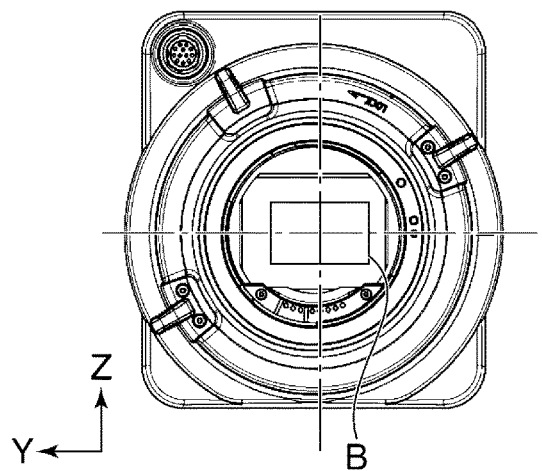
FIGS. 5A to 5C are diagrams useful in explaining a state of the unnecessary light reduction member in a case where an interchangeable lens which is large in effective light flux is mounted in the first embodiment.
Figure 5B:
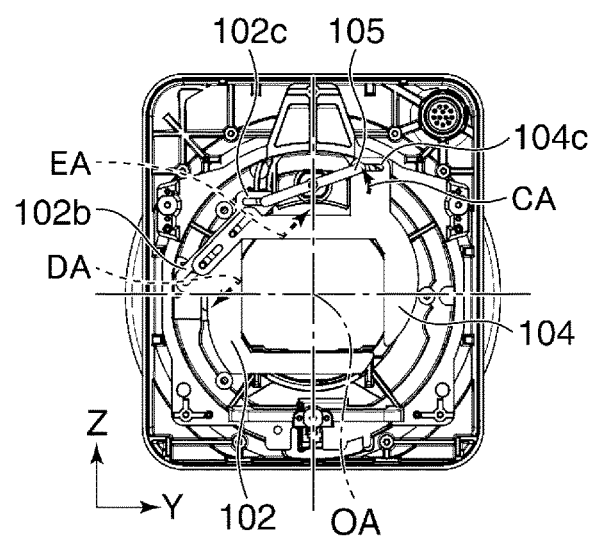
Figure 5C:
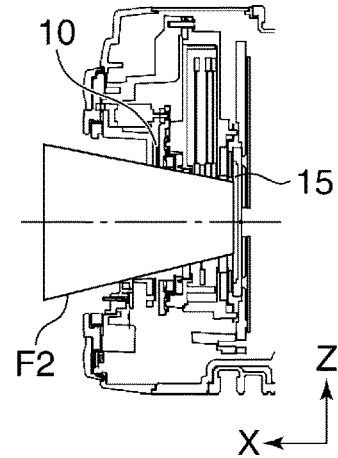

FIGS. 4A to 4C, and 5A to 5C are diagrams useful in explaining a difference in operation of the unnecessary light reduction member 10 due to a difference in effective light flux of the interchangeable lens mounted on the camera body 1. FIGS. 4A to 4C are diagrams useful in explaining the operation of the unnecessary light reduction member 10, which is performed when an interchangeable lens which is small in effective light flux is mounted. FIGS. 5A to 5C are diagrams useful in explaining the operation of the unnecessary light reduction member 10, which is performed when an interchangeable lens which is large in effective light flux is mounted. FIGS. 4A and 5A are front views, FIGS. 4B and 5B are rear views, and FIGS. 4C and 5C are cross-sectional views of the essential components.

An area B in FIGS. 4A and 5A indicates an effective pixel area of the image pickup device 15. When an interchangeable lens which is small in effective light flux is replaced by an interchangeable lens which is large in effective light flux, the driving arm 105 is driven by the motor 101 to rotate from a state shown in FIG. 4B in a direction indicated by an arrow CA, as shown in FIG. 5B. In accordance with this, a force in the Z-axis direction is applied to the driving holes 102c and 104c by the rotational operation of the driving arm 105, whereby the front blade 102 is moved in a direction indicated by an arrow DA, and the rear blade 104 is moved in a direction indicated by an arrow EA, each away from the optical axis OA. Thus, when the interchangeable lens which is large in effective light flux is mounted, as shown in FIG. 5C, the unnecessary light reduction member 10 is controlled to have an opening amount with which an effective light flux F2 is not shielded. Similarly, when the interchangeable lens which is small in effective light flux is mounted, the front blade 102 is moved in a direction opposite to the direction indicated by the arrow DA and the rear blade 104 is moved in a direction opposite to the direction indicated by the arrow EA, each toward the optical axis OA. Thus, the unnecessary light reduction member 10 is controlled to have an opening amount with which an effective light flux F1 is not shielded. As described above, the opening amount of the opening formed by the front blade 102 and the rear blade 104 is changed according to the effective light flux of the interchangeable lens, whereby it is possible to properly reduce unnecessary light.

The unnecessary light reduction member 10 is disposed at a location closer to the interchangeable lens 2 than the low-pass filters 12 and 14 and the ND unit 13 are, and hence the unnecessary light reduction member 10 can prevent unnecessary light entering the camera body 1 from being reflected by these optical components and the inner wall of the camera body 1. For example, when the unnecessary light reduction member 10 is not disposed, light entering at such an angle as indicated by a light beam G in FIG. 4C is reflected by an optical component, and then enters the image pickup device 15, as indicated by a broken line. In contrast, when the unnecessary light reduction member 10 is disposed, the light entering at such an angle as indicated by the light beam G is reflected by the unnecessary light reduction member 10 in a direction toward the interchangeable lens 2, as indicated by a solid line. Even when the light reflected toward the interchangeable lens 2 enters the image pickup device 15 again, the intensity of light is attenuated due to a plurality of times of reflection, and hence the influence is small.

The unnecessary light reduction member 10 is disposed at such a location closer to the image pickup device 15 than the mount 3 is, at which the unnecessary light reduction member 10 is prevented from being brought into contact with the rear end of the interchangeable lens 2 for all interchangeable lenses 2 which can be mounted on and removed from the camera body 1. That is, the use of the interchangeable lens 2 which can be mounted on and removed from the camera body 1 is not limited by the unnecessary light reduction member 10.

Figure 6:
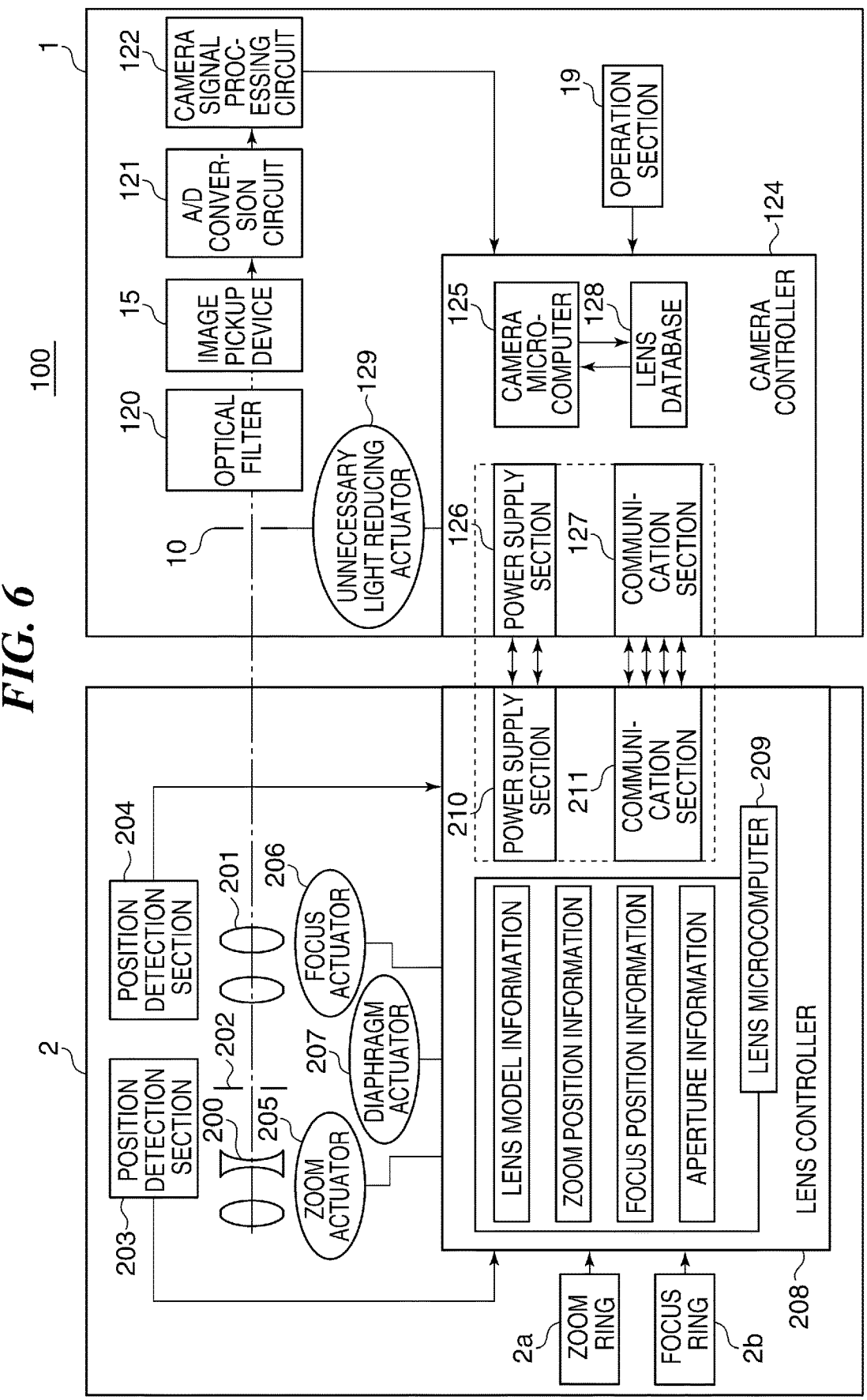
FIG. 6 is a control block diagram of the image pickup apparatus according to the first embodiment.

Next, the configuration for controlling the driving of the unnecessary light reduction member 10 will be described. FIG. 6 is a control block diagram of the image pickup apparatus 100 (the camera body 1 and the interchangeable lens 2). The same components in FIG. 6 as those in FIG. 2 are denoted by the same reference numerals, and detailed description thereof is omitted, as deemed appropriate.

The interchangeable lens 2 includes a plurality of lens groups including a zoom lens 200 which adjusts an angle of view and a focus lens 201 which adjusts focus, a diaphragm 202 which adjusts the aperture size, and a lens controller 208. The zoom lens 200 is driven by a zoom actuator 205 in the optical axis direction, and the position of the zoom lens 200 in the optical axis direction is detected by a position detection section 203. The focus lens 201 is driven by a focus actuator 206 in the optical axis direction, and the position of the focus lens 201 in the optical axis direction is detected by a position detection section 204. The diaphragm 202 is driven by a diaphragm actuator 207 so as to be opened and closed.

The lens controller 208 includes a lens microcomputer 209, a power supply section 210, and a communication section 211. The lens microcomputer 209 receives control signals from the camera body 1 via the communication section 211, and controls the diaphragm actuator 207, the zoom actuator 205, and the focus actuator 206, according to the received control signals. Further, the lens microcomputer 209 controls the zoom actuator 205 and the focus actuator 206 according to respective operations on the zoom ring 2a and the focus ring 2b, which are provided on the interchangeable lens 2, to move the zoom lens 200 and the focus lens 201 in the optical axis direction. The lens microcomputer 209 stores model information (lens ID) of the various lenses, and information concerning zoom, focus, and the aperture. The power supply section 210 and the communication section 211 include the power supply terminals and the communication terminals, which are included in the second communication contact 20, respectively.

The camera body 1 includes optical filters 120, the analog-to-digital conversion circuit 121, a camera signal processing circuit 122, the camera controller 124, and an unnecessary light reduction actuator 129. The optical filters 120 include the low-pass filters 12 and 14, and the various ND filters included in the ND unit 13. The unnecessary light reduction actuator 129 drives the unnecessary light reduction member (light shielding member) 10 under the control of the camera controller 124. Analog signals output from the image pickup device 15 are converted to digital signals by the analog-to-digital conversion circuit 121, and the digital signals output from the analog-to-digital conversion circuit 121 are input to the camera signal processing circuit 122. The camera signal processing circuit 122 performs various image processing on the input digital signals to thereby generate image signals. The image signals generated by the camera signal processing circuit 122 are, although not shown, displayed as an image on a display section, such as a liquid crystal panel, or output from video output terminals to an external device, or stored in a storage medium, such as a semi-conductor memory or an optical disk. Further, the image signals generated by the camera signal processing circuit 122 are input to the camera controller 124 to be used for various processing performed by the camera controller 124, as described hereinafter.

The camera controller 124 includes a camera microcomputer 125, a power supply section 126, a communication section 127, and a lens database 128. The camera microcomputer 125 controls the overall operation of the image pickup apparatus 100 according to signals output from the operation section 19. Further, the camera microcomputer 125 generates control signals for driving the interchangeable lens 2, such as signals for controlling the diaphragm 202 and the focus lens 201, based on image signals acquired from the camera signal processing circuit 122, and transmits the generated control signals to the lens microcomputer 209 via the communication section 127. Further, the camera microcomputer 125 receives image correction information and the like necessary for performing image correction processing based on optical characteristics specific to the interchangeable lens 2 from the lens microcomputer 209 via the communication section 127.

The power supply section 126 and the communication section 127 include the power supply terminals and communication terminals, which are included in the first communication contact 18, respectively. The power supply section 210 and the communication section 211 of the interchangeable lens 2 are connected to the power supply section 126 and the communication section 127 of the camera body 1, respectively, whereby the camera microcomputer 125 and the lens microcomputer 209 are enabled to communicate with each other, and further, the camera microcomputer 125 is enabled to perform various driving control of the interchangeable lens 2. The power supply section 126 supplies electric power to the components of the camera body 1. The power supply section 210 of the interchangeable lens 2 receives supply of power from the power supply section 126 of the camera body 1, and supplies electric power to the components of the interchangeable lens 2.

The lens database 128 stores area information indicative of a short side, a long side, and a diagonal of the effective light flux for each interchangeable lens 2 (hereinafter referred to as the "light flux area information"). The light flux area information, as described hereinafter with reference to FIGS. 7A to 7C, refers to information for identifying the maximum area of the effective light flux for each of the zooming, focusing, and diaphragm operations. The camera microcomputer 125 receives information on the lens unit, such as the model information of the interchangeable lens 2 mounted on the camera body 1, and lens information including zoom position information, focus position information, and aperture information, from the lens microcomputer 209 via the communication section 127. The camera microcomputer 125 collates the information received from the lens microcomputer 209 with the information stored in the lens database 128 to thereby identify the effective light flux area, and drives the unnecessary light reduction actuator 129 for controlling the opening amount of the unnecessary light reduction member 10.

Figure 7A:
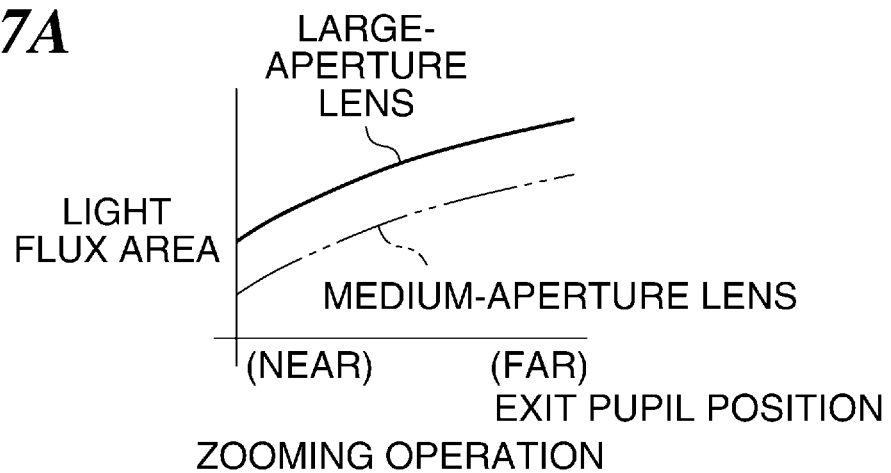
FIGS. 7A to 7C are diagrams each showing an example of light flux area information stored in a lens database in the first embodiment.
Figure 7B:
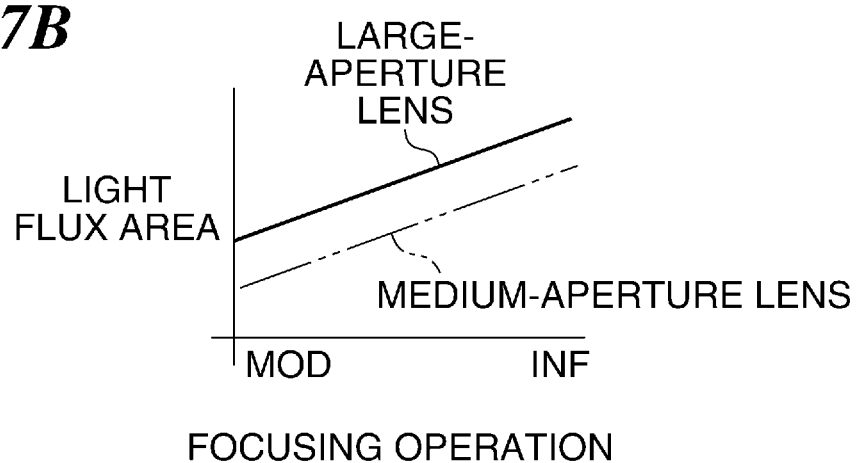
Figure 7C:
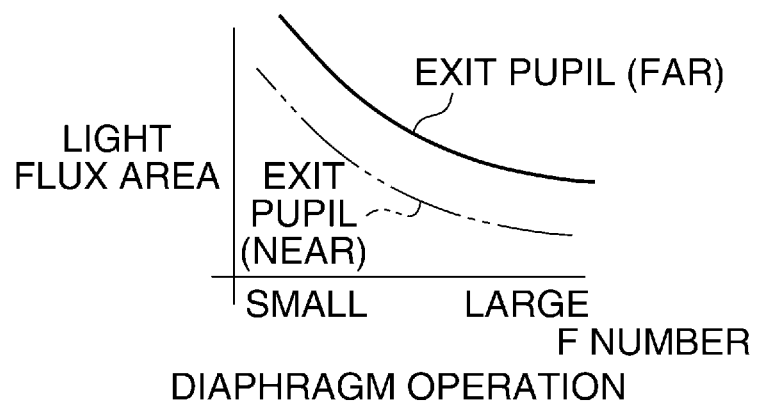

FIGS. 7A to 7C are diagrams each showing an example of the light flux area information stored in the lens database 128. FIG. 7A shows the light flux area information in the zooming operation, and the effective light flux area is different depending on the aperture diameter of the interchangeable lens 2 mounted on the camera body 1. In general, if the focal length is the same, a large-aperture lens having a large aperture diameter, such as an F1.2 lens, is larger in effective light flux area than a medium-aperture lens having a smaller aperture diameter, such as an F4 lens. Further, an exit pupil position is changed by the zooming operation of the lens, and as the exit pupil position is farther, the effective light flux area becomes larger. Therefore, when the interchangeable lens 2 is driven to perform zooming from the wide angle side to the telephoto side, the camera microcomputer 125 drives the unnecessary light reduction actuator 129 based on the light flux area information, to thereby cause the unnecessary light reduction member 10 to be shifted from the state shown in FIG. 4B, in which the opening area is small, to the state shown in FIG. 5B, in which the opening area is large.

FIG. 7B shows the light flux area information in the focusing operation. If the focus position is the same, a large-aperture lens is larger in effective light flux area than a medium-aperture lens. When performing the focusing operation, as the focus position is changed from the minimum object-distance side (MOD) to the infinity-distance side (INF), the effective light flux area becomes larger. Therefore, when the interchangeable lens 2 is driven to change focusing from the minimum object-distance side to the infinity-distance side, the camera microcomputer 125 drives the unnecessary light reduction actuator 129, based on the light flux area information, to thereby cause the unnecessary light reduction member 10 to be shifted from the state shown in FIG. 4B, in which the opening area is small, to the state shown in FIG. 5B, in which the opening area is large.

FIG. 7C shows the light flux area information during diaphragm operation. As shown in FIG. 7C, if the aperture value (F number) is the same, a lens in which the exit pupil position is far is larger in effective light flux area than a lens in which the exit pupil position is near. Further, when performing diaphragm operation, as the aperture value (F number) becomes larger (aperture diameter becomes smaller), the effective light flux area becomes smaller. Therefore, when the interchangeable lens 2 is driven to increase the aperture value (F number), the camera microcomputer 125 drives the unnecessary light reduction actuator 129 based on the light flux area information to thereby cause the unnecessary light reduction member 10 to be shifted from the state shown in FIG. 5B, in which the opening area is large, to the state shown in FIG. 4B, in which the opening area is small.

Figure 8:
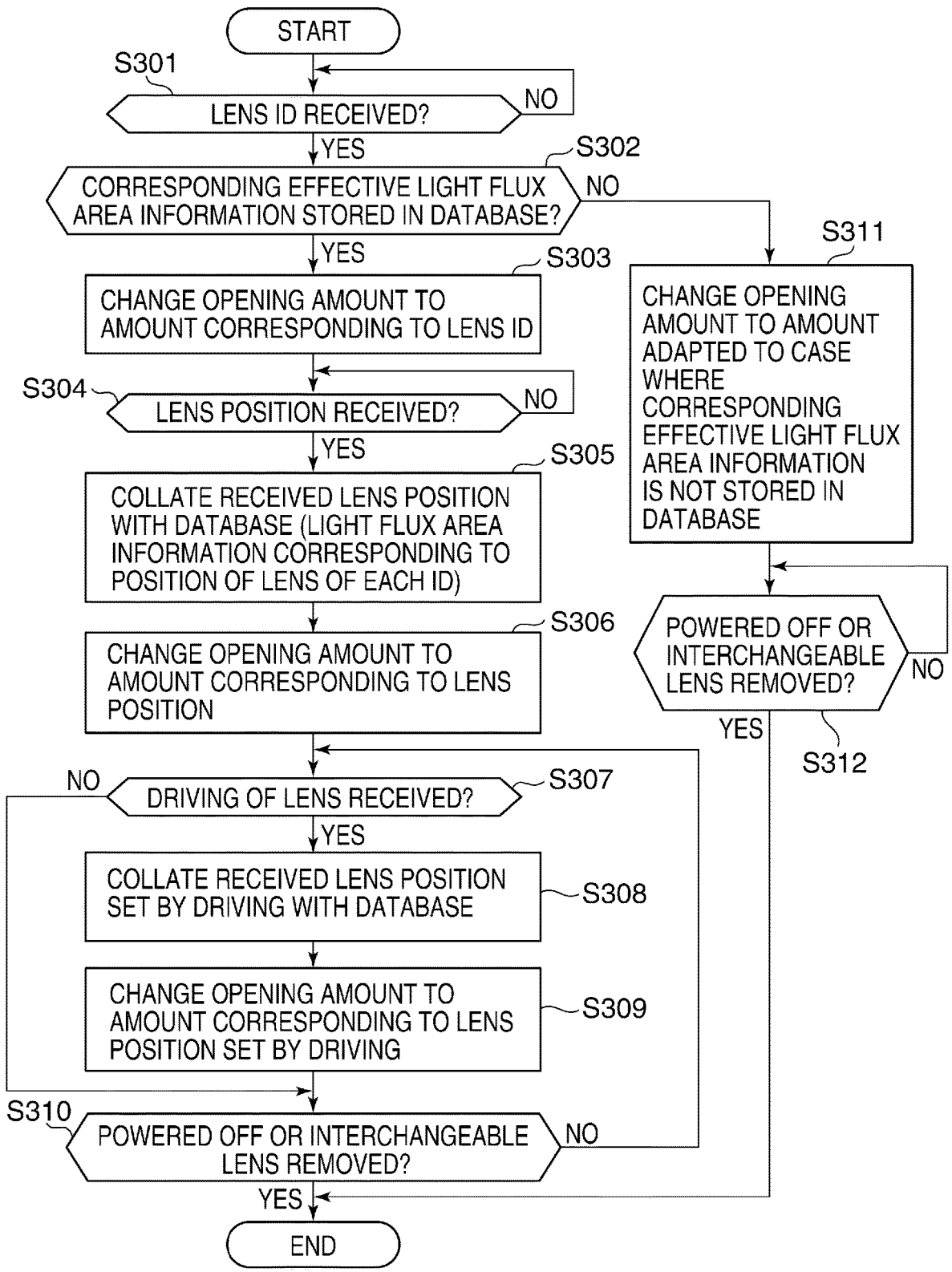
FIG. 8 is a flowchart of a control process for controlling the unnecessary light reduction member in the first embodiment.

FIG. 8 is a flowchart of a process performed by the image pickup apparatus 100 for controlling the unnecessary light reduction member 10. Processing in each step of the control process in FIG. 8 is realized by the camera microcomputer 125 executing a predetermined associated program and thereby controlling the operations of components of the camera body 1. After the interchangeable lens 2 is mounted on the image pickup apparatus 100, when the image pickup apparatus 100 is powered on, the lens microcomputer 209 of the interchangeable lens 2 and the camera microcomputer 125 of the camera body 1 start communication with each other, and the present process is started.

Upon power-on of the image pickup apparatus 100, in a step S301, the camera microcomputer 125 determines whether or not the model information (lens ID) of the interchangeable lens 2 has been received from the lens microcomputer 209. The camera microcomputer 125 waits until the lens ID is received (NO to the step S301), and if it is determined that the lens ID has been received (YES to the step S301), the camera microcomputer 125 proceeds to a step S302. Although not shown, the present program may be configured such that if a predetermined time period has elapsed without receiving the lens ID in the step S301, the camera microcomputer 125 proceeds to a step S311. In the step S302, the camera microcomputer 125 determines whether or not the effective light flux area information of the received lens ID is stored in the lens database 128. If it is determined that the corresponding effective light flux area information is stored (YES to the step S302), the camera microcomputer 125 proceeds to a step S303, whereas if it is determined that the corresponding effective light flux area information is not stored (NO to the step S302), the camera microcomputer 125 proceeds to the step S311.

In the step S303, the camera microcomputer 125 changes the opening amount of the unnecessary light reduction member (light shielding member) 10 to an opening amount corresponding to the lens ID, based on the acquired effective light flux area information. More specifically, the camera microcomputer 125 receives the lens ID from the lens microcomputer 209 when the image pickup apparatus 100 is powered on, and drives, based on the lens ID, the unnecessary light reduction actuator 129 to adjust the opening amount of the unnecessary light reduction member 10 to a proper opening amount at which the maximum effective light flux area of the interchangeable lens 2 mounted on the camera body 1 is not shielded. In a step S304, the camera microcomputer 125 determines whether or not the position information of the zoom lens 200, the focus lens 201, and the diaphragm 202 (hereinafter referred to as the "zoom lens 200 and the like") has been received from the lens microcomputer 209. The camera microcomputer 125 waits until the position information of the zoom lens 200 and the like is received (NO to the step S304), and if it is determined that the position information of the zoom lens 200 and the like has been received (YES to the step S304), the camera microcomputer 125 proceeds to a step S305.

In the step S305, the camera microcomputer 125 collates the position information of the zoom lens 200 and the like acquired in the step S304 with the light flux area information stored in the lens database 128, described with reference to FIGS. 7A to 7C, and identifies the effective light flux area corresponding to the acquired position information. In a step S306, the camera microcomputer 125 drives the unnecessary light reduction actuator 129 to adjust the opening amount of the unnecessary light reduction member 10 to a proper opening amount at which the effective light flux area, acquired in the step S305, is not shielded. In a step S307, the camera microcomputer 125 determines whether or not the zoom lens 200 and the like have been driven (the position information has been changed) based on the position information of the zoom lens 200 and the like acquired from the lens microcomputer 209. If it is determined that the zoom lens 200 and the like have been driven (YES to the step S307), the camera microcomputer 125 proceeds to a step S308, whereas if it is determined that the zoom lens 200 and the like have not been driven (NO to the step S307), the camera microcomputer 125 proceeds to a step S310.

The step S308 and a step S309 are substantially the same as the steps S305 and S306, respectively. More specifically, in the step S308, the camera microcomputer 125 collates the position information of the zoom lens 200 and the like after driving, acquired in the step S307, with the light flux area information stored in the lens database 128, and identifies the effective light flux area corresponding to the acquired position information. Then, in the step S309, the camera microcomputer 125 drives the unnecessary light reduction actuator 129 to adjust the opening amount of the unnecessary light reduction member 10 to a proper opening amount at which the effective light flux area acquired in the step S308 is not shielded.

In the case where the answer to the question of the step S307 is negative (NO), or after execution of the step S309, the camera microcomputer 125 determines, in the step S310, whether or not the image pickup apparatus 100 has been powered off, or the interchangeable lens 2 has been removed. If it is determined that the image pickup apparatus 100 has not been powered off and also the interchangeable lens 2 has not been removed (NO to the step S310), the camera microcomputer 125 returns to the step S307. On the other hand, if it is determined that the image pickup apparatus 100 has been powered off or the interchangeable lens 2 has been removed (YES to the step S310), the camera microcomputer 125 terminates the present process.

In the step S311, the camera microcomputer 125 drives the unnecessary light reduction actuator 129 to adjust the opening amount of the unnecessary light reduction member 10 to the maximum opening amount at which the effective light flux area is not shielded even when any of the interchangeable lenses 2 which can be mounted on the camera body 1 is mounted. After that, in a step S312, the camera microcomputer 125 determines whether or not the image pickup apparatus 100 has been powered off, or the interchangeable lens 2 has been removed. The camera microcomputer 125 repeats the determination of the step S312 until the image pickup apparatus 100 is powered off or the interchangeable lens 2 is removed (NO to the step S312). If it is determined that the image pickup apparatus 100 has been powered off or the interchangeable lens 2 has been removed (YES to the step S312), the camera microcomputer 125 terminates the present process.

As described above, according to the present embodiment, in the lens-interchangeable image pickup apparatus 100, the camera body 1 checks the effective light flux area of the interchangeable lens 2 based on the lens information obtained from the interchangeable lens 2, and controls the opening amount of the unnecessary light reduction member 10. This makes it possible to properly set the opening amount of the unnecessary light reduction member 10 for each interchangeable lens 2 which can be mounted on and removed from the camera body 1, and hence it is possible to effectively reduce unnecessary light entering the image pickup device 15. Further, the camera body 1 adjusts the opening amount of the unnecessary light reduction member 10 in accordance with the positions of the various lenses of the interchangeable lens 2, and hence it is possible to properly control the opening amount of the unnecessary light reduction member 10 in accordance with driving of the lens, such as the zooming operation. Further, the unnecessary light reduction member 10 is disposed within the camera body 1 at a location closer to the mount 3 than the various optical components are. This makes it possible to suppress unnecessary light entering the camera body 1 from being reflected by the inner wall surface of the camera body 1, edge surfaces of the optical components, and the like, whereby it is possible to effectively suppress unnecessary light from entering the image pickup device 15.

Figure 9A:
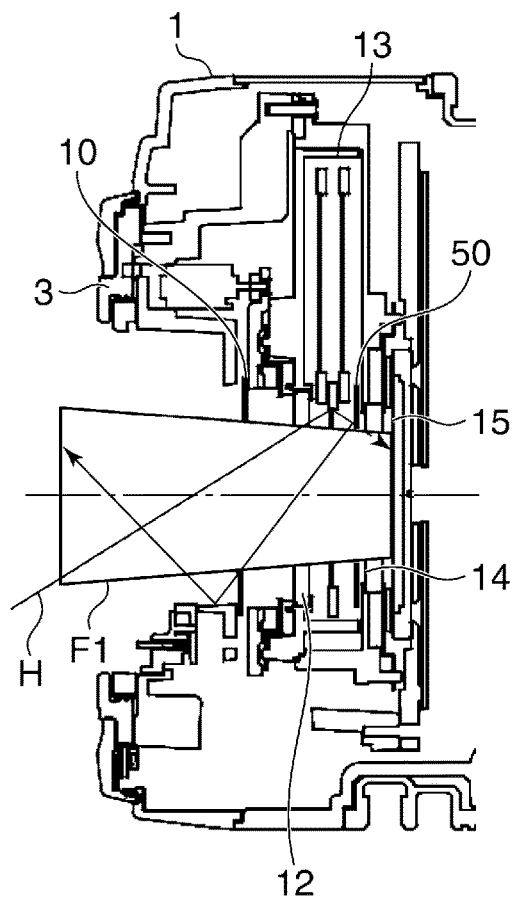
FIGS. 9A and 9B are schematic cross-sectional views of an image pickup apparatus according to a second embodiment.
Figure 9B:
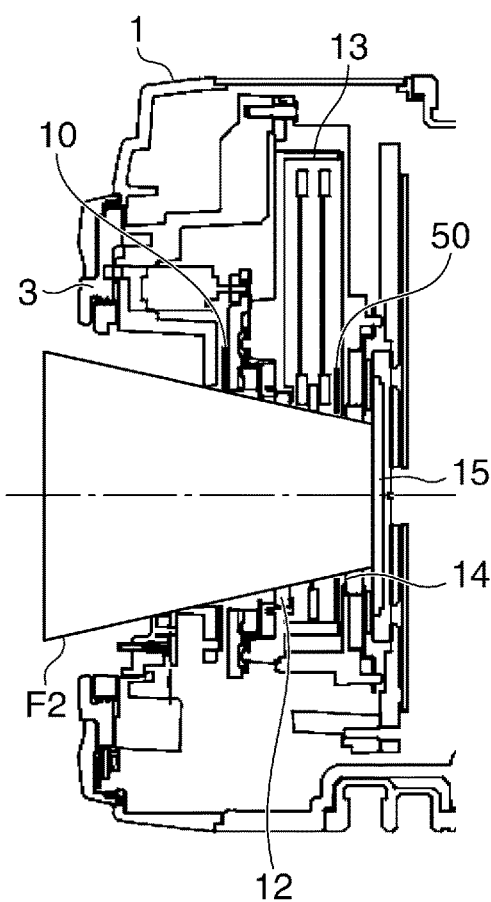

Next, a description will be given of a second embodiment of the present invention. Although in the first embodiment, the description is given of the arrangement in which the unnecessary light reduction member is disposed at one location, in the second embodiment, a plurality of unnecessary light reduction members (light shielding members) are disposed. FIGS. 9A and 9B are schematic cross-sectional views of a lens-interchangeable image pickup apparatus according to the second embodiment of the present invention. FIG. 9A shows a state in which an interchangeable lens 2 which is small in effective light flux is mounted, and FIG. 9B shows a state in which an interchangeable lens 2 which is large in effective light flux is mounted. In the present embodiment, the same components (components) as those of the first embodiment are denoted by the same reference numerals, and description thereof is omitted.

The camera body 1 has the unnecessary light reduction members disposed at two locations. A first unnecessary light reduction member (first light shielding member) 10 is disposed at a location closer to the mount 3 than the low-pass filter 12 is. A second unnecessary light reduction member (second light shielding member) 50 is disposed at a location between the optical components (various optical filters) of the ND unit 13 and the image pickup device 15. The first unnecessary light reduction member 10 is the same as the unnecessary light reduction member 10 described in the first embodiment, and is driven by the unnecessary light reduction actuator 129 (hereinafter referred to as the "first unnecessary light reduction actuator 129" in the present embodiment). The second unnecessary light reduction member 50 has the same structure as that of the first unnecessary light reduction member 10, and is driven by a second unnecessary light reduction actuator (not shown) under the control of the camera microcomputer 125.

As shown in FIGS. 9A and 9B, the opening amount of the first unnecessary light reduction member 10 and the opening amount of the second unnecessary light reduction member 50 are different depending on the size of the effective light flux. The camera microcomputer 125 controls the first unnecessary light reduction actuator 129 and the second unnecessary light reduction actuator based on the light flux area information stored in the lens database 128 to adjust the opening amount of the first unnecessary light reduction member 10 and the opening amount of the second unnecessary light reduction member 50.

In the present embodiment, by disposing not only the first unnecessary light reduction member 10, but also the second unnecessary light reduction member 50, it is possible to more effectively prevent unnecessary light from entering the image pickup device 15. For example, such a light beam H as shown in FIG. 9A sometimes enters depending on the setting of the interchangeable lens 2 or a position of a light source. The light beam H enters from a position close to the opening edge of the first unnecessary light reduction member 10, and hence the light beam H is not shielded by the first unnecessary light reduction member 10. If the second unnecessary light reduction member 50 is not disposed in this case, the light beam H is reflected by a component within the camera body 1, and enters the image pickup device 15 as indicted by a broken line. However, since the second unnecessary light reduction member 50 is disposed between the optical members of the ND unit 13 and the image pickup device 15 (at a location closer to the image pickup device 15 than the first unnecessary light reduction member 10 is), it is possible to reflect the light beam H by the second unnecessary light reduction member 50 as indicated by a solid line. That is, according to the present embodiment, it is possible to suppress unnecessary light which cannot be shielded by the first unnecessary light reduction member 10 from entering the image pickup device 15 by using the second unnecessary light reduction member 50, and hence it is possible to more effectively prevent unnecessary light from entering the image pickup device 15.

Next, a description will be given of a third embodiment of the present invention. In the first and second embodiments, the description is given of the camera body 1 (the image pickup apparatus 100) including the ND unit 13 that inserts and retracts the optical filter into and from the photographic optical path by sliding the same in a direction orthogonal to the optical axis direction. On the other hand, in the present embodiment, the description is given of an ND unit, which can be mounted on a camera body (image pickup apparatus), and has an optical filter-switching mechanism and a mechanism for switching the opening amount for reducing unnecessary light, by disc-shaped members (hereinafter referred to as the "turrets") which can be rotated about an axis parallel to the optical axis. That is, in the present embodiment, the ND unit plays the role of a light shielding member for reducing unnecessary light.

Figure 10:
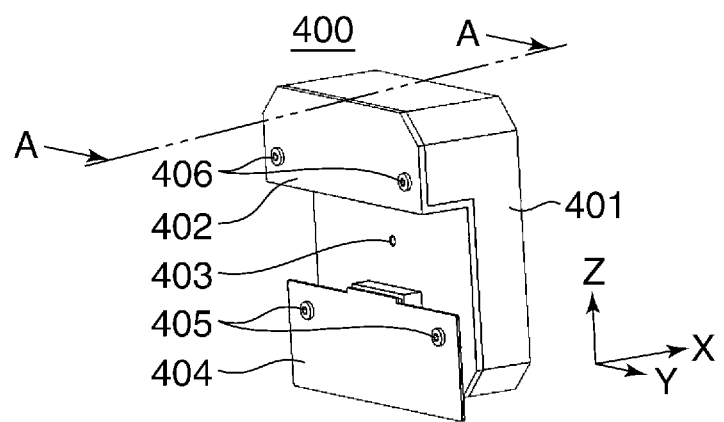
FIG. 10 is a perspective view of the appearance of an ND unit included in an image pickup apparatus according to a third embodiment.
Figure 11:
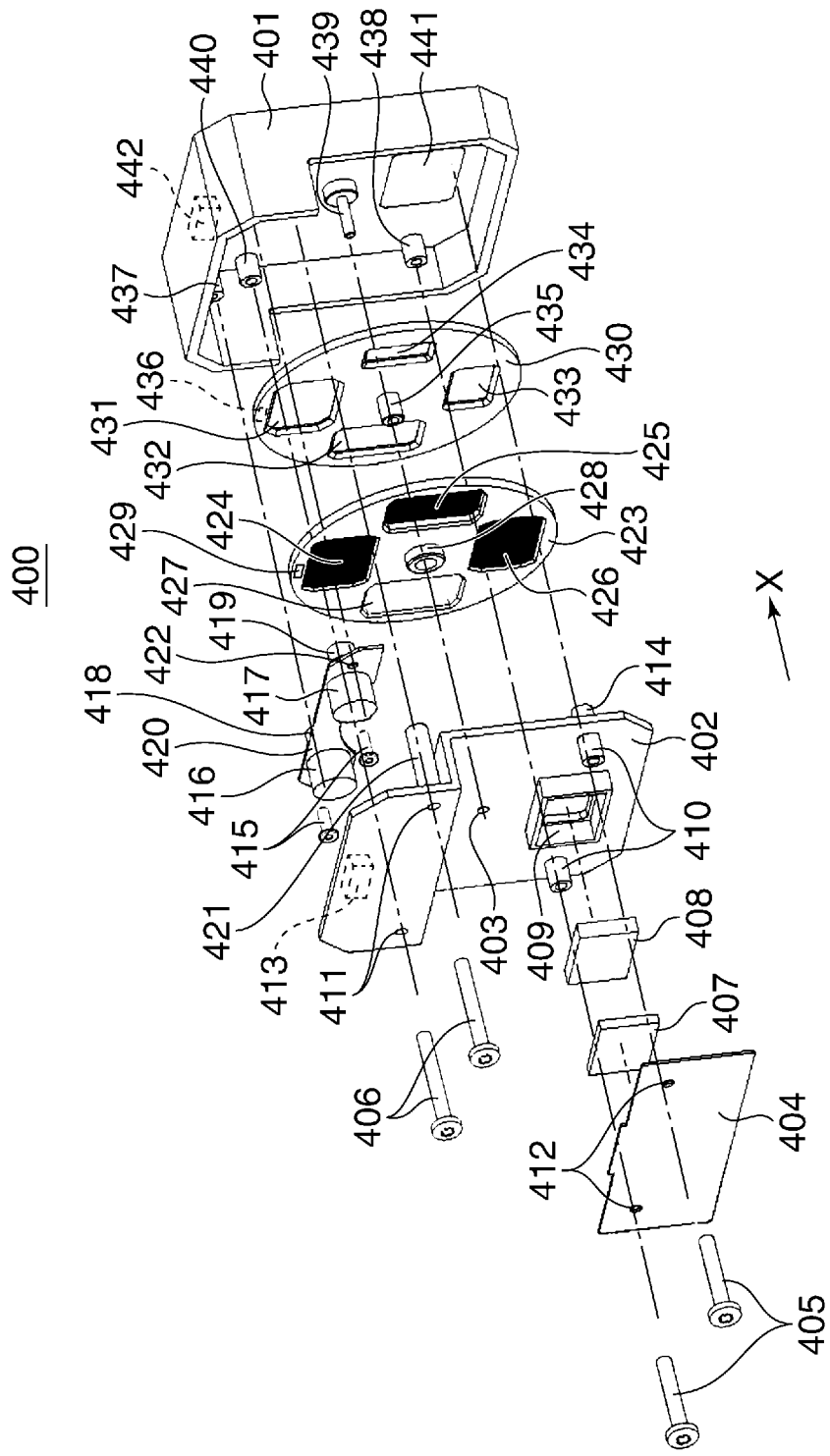
FIG. 11 is an exploded perspective view of the ND unit of the third embodiment.
Figure 12:
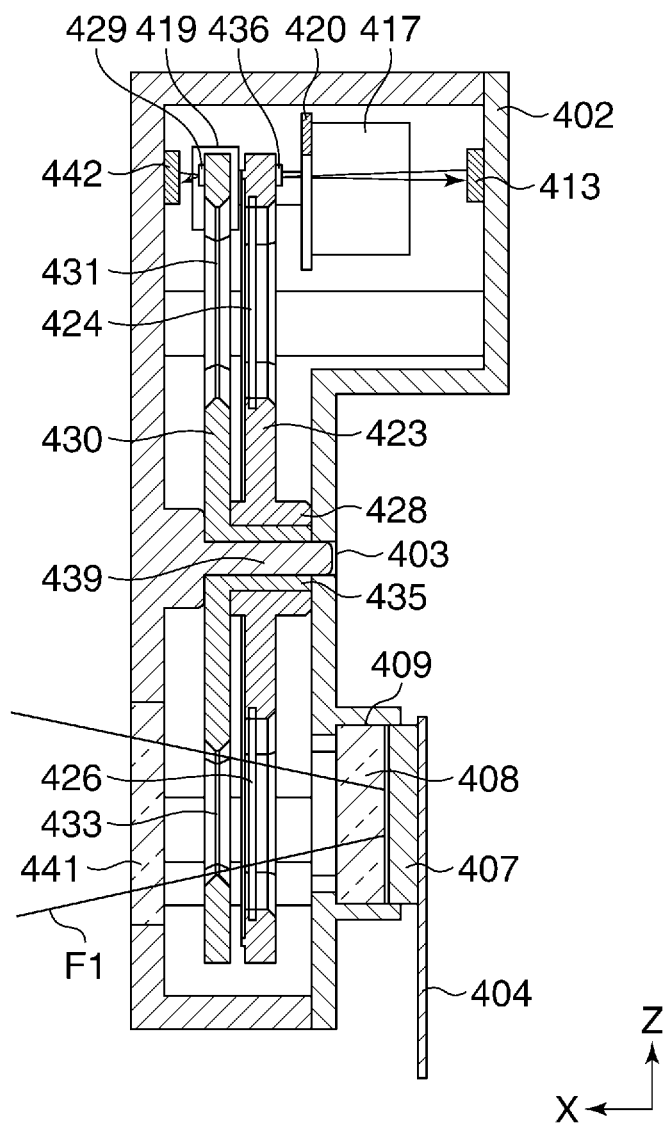
FIG. 12 is a schematic cross-sectional view of the ND unit of the third embodiment.

FIG. 10 is a perspective view of the appearance of the ND unit, denoted by reference numeral 400. FIG. 11 is an exploded perspective view of the ND unit 400. FIG. 12 is a cross-sectional view taken along A-A in FIG. 10. The ND unit 400 has the functions of the unnecessary light reduction member 10 and the ND unit 13, described in the first embodiment. Therefore, no unnecessary light reduction member other than the ND unit 400 is disposed, and the present embodiment has the same arrangement as the first embodiment in other respects, and hence description thereof is omitted.

The ND unit 400 includes exterior covers 401 and 402, a sensor circuit board unit 404, an image pickup device 407, laser photoelectric sensors 413 and 442, stepping motors 416 and 417, a motor holding plate 420, an ND turret 423, and an unnecessary light reduction turret 430. The ND turret 423 and the unnecessary light reduction turret 430, both of which are disc-shaped members, are arranged such that the radial direction thereof is orthogonal to the optical axis (X-axis).

The exterior cover 402 is fixed to the exterior cover 401, together with the sensor circuit board unit 404, with screws 405 inserted through bosses 410 and 414 formed on the exterior cover 402 and bosses 438 formed on the exterior cover 401. Further, the exterior cover 402 is fixed to the exterior cover 401 with screws 406 extended through bosses 421 formed on the exterior cover 402 and bosses 440 formed on the exterior cover 401. Note that the sensor circuit board unit 404 is formed with screw holes 412 through which the screws 405 are inserted, and the exterior cover 402 is formed with screw holes 411 through which the screws 406 are inserted. A low-pass filter 441 is disposed on the exterior cover 401.

The sensor circuit board unit 404 is a component corresponding to the sensor circuit board 16 in the first embodiment. The image pickup device 407 is mounted on the sensor circuit board unit 404. A low-pass filter 408 is fixed in a recess 409 formed in the exterior cover 402 e.g. with an adhesive. The laser photoelectric sensor 413 is mounted on the exterior cover 402, and includes a laser beam source that emits light to an outer peripheral portion of the ND turret 423, and a light receiving sensor that receives light reflected from the ND turret 423. Further, the laser photoelectric sensor 442 is mounted on the exterior cover 401, and includes a laser beam source that emits light to an outer peripheral portion of the unnecessary light reduction turret 430, and a light receiving sensor that receives light reflected from the unnecessary light reduction turret 430. How the laser photoelectric sensors 413 and 442 are used will be described hereinafter.

The stepping motors 416 and 417 each incorporate an encoder for detecting a rotational angle. Further, worm gears 418 and 419 are attached to the stepping motors 416 and 417, respectively. The motor holding plate 420 holding the stepping motors 416 and 417 is fixed on bosses 437 formed on the exterior cover 401 with screws 415 extended through holes 422. At this time, the worm gear 418 is in contact with an outer peripheral gear (not shown) of the ND turret 423, whereby it is possible to rotate the ND turret 423 by driving the stepping motor 416. Similarly, the worm gear 419 is in contact with an outer peripheral gear (not shown) of the unnecessary light reduction turret 430, whereby it is possible to rotate the unnecessary light reduction turret 430 by driving the stepping motor 417. That is, the stepping motor 417, the worm gear 419, and the laser photoelectric sensor 442 form an actuator for driving the unnecessary light reduction turret 430.

A shaft 439 is provided on the external cover 401. A boss 435 of the unnecessary light reduction turret 430 is inserted in a hole of a boss 428 of the ND turret 423. Further, the shaft 439 is fitted in a shaft hole 403 formed in the exterior cover 402 in a state inserted through a hole of the boss 435 of the unnecessary light reduction turret 430. Thus, the ND turret 423 and the unnecessary light reduction turret 430 are supported by the shaft 439 inside the exterior covers 401 and 402.

The ND turret 423 is a member that is driven by the stepping motor 416 to be rotated about the shaft 439, thereby being capable of inserting three types of ND filters into the photographic optical path. The ND turret 423 has a first ND filter 424, a second ND filter 425, and a third ND filter 426, and an opening 427 for preventing the ND filters from being inserted into the photographic optical path. The ND turret 423 has a reflection preventing member 429 provided on the outer periphery thereof. The reflection preventing member 429 is a member coated with e.g. a laser reflection preventing coating material, such as a lusterless black paint, and suppresses reflection of laser beams emitted from the laser photoelectric sensor 413.

The unnecessary light reduction turret 430 is a member that is driven by the stepping motor 417 to be rotated about the shaft 439, thereby being capable of switching four types of openings, which are different in opening area, for the photographic optical path. The unnecessary light reduction turret 430 is formed with a first opening 431, a second opening 432, and a third opening 433, and a fourth opening 434, in the decreasing order of the sizes of the opening area. The unnecessary light reduction turret 430 has a reflection preventing member 436 provided on the outer periphery thereof. The reflection preventing member 436 is a member coated with e.g. a laser reflection preventing coating material, and suppresses reflection of laser beams emitted from the laser photoelectric sensor 442.

Referring to FIG. 12, the effective light flux F1 enters the ND unit 400 through the interchangeable lens, not shown. The ND turret 423 is driven by the stepping motor 416 to set the optimum ND filter, and similarly, the unnecessary light reduction turret 430 is driven by the stepping motor 417 to set the optimum opening. Thus, the effective light flux F1 passes the low-pass filter 441, the opening set by the unnecessary light reduction turret 430, the ND filter set by the ND turret 423, and the low-pass filter 408, and then forms an image on the image pickup device 407.

The laser photoelectric sensor 413 always emits a laser beam toward a portion of the ND turret 423 close to the outer periphery thereof, and usually outputs a light reception signal by receiving a reflected light. At this time, when the laser beam is irradiated to the reflection preventing member 429 by rotation of the ND turret 423, the laser beam is not reflected, which stops the output of the light reception signal. A position where the laser photoelectric sensor 413 does not output the light reception signal is set as an origin point position, and the stepping motor 416 is rotated through a predetermined rotational angle based on the encoder incorporated in the stepping motor 416, whereby it is possible to position a desired ND filter in the photographic optical path. However, a configuration different from the configuration using the laser photoelectric sensor 413 and the reflection preventing member 429 may be employed insofar as it is possible to detect the rotational position of the ND turret 423. Similarly to this, the rotational angle of the unnecessary light reduction turret 430 can be controlled based on a reception signal output from the laser photoelectric sensor 442.

Figure 13:
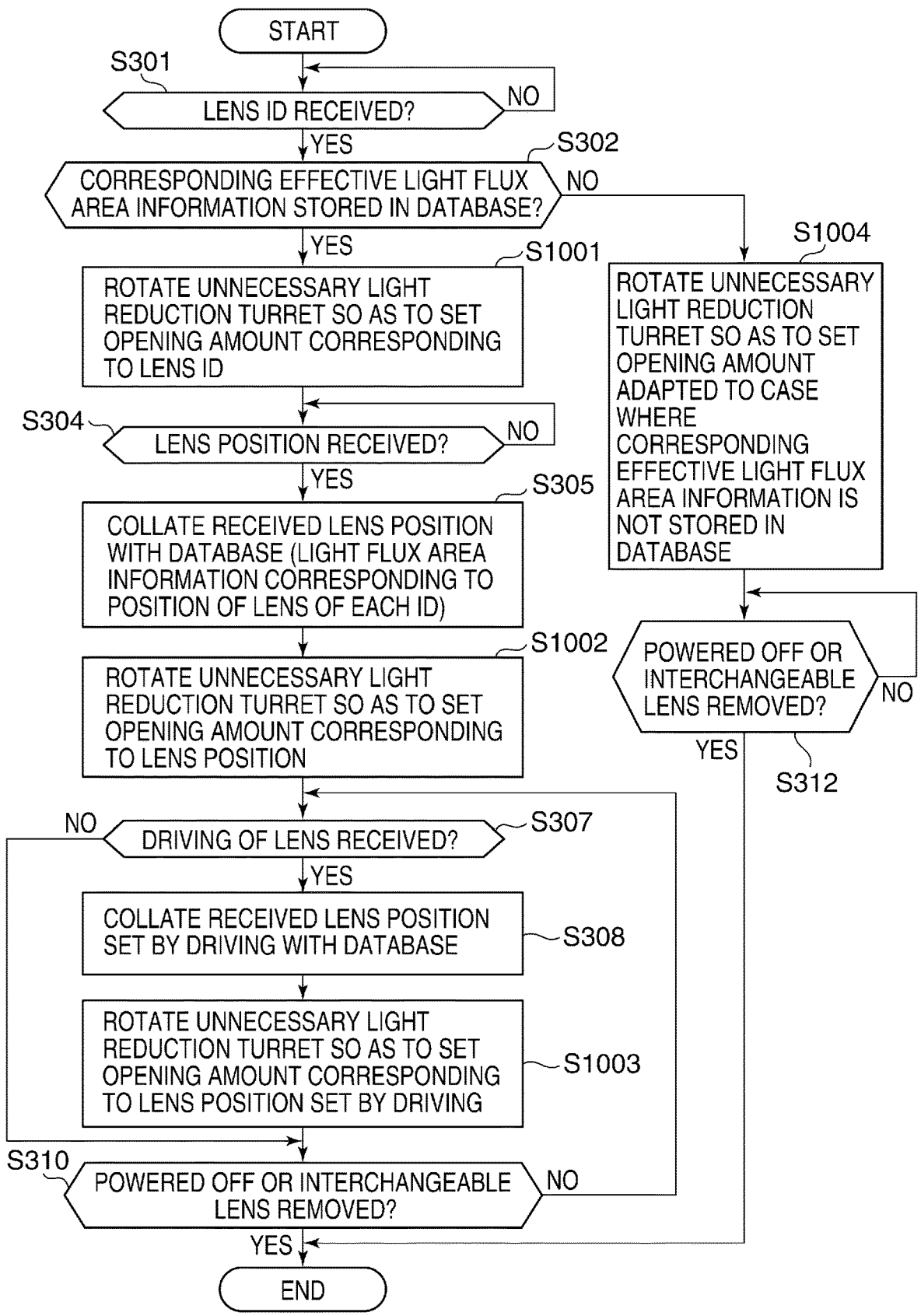
FIG. 13 is a flowchart of a control process for controlling the ND unit of the third embodiment.

FIG. 13 is a flowchart of a control process for controlling the ND unit 400. Although the control block of the ND unit 400 is not shown, an actuator that drives the unnecessary light reduction turret 430 corresponds to the unnecessary light reduction actuator 129 appearing in FIG. 6. Processing in each step of the control process in FIG. 13 is realized by the camera microcomputer of the image pickup apparatus including the ND unit 400, which executes a predetermined associated program to thereby control the operations of components of the image pickup apparatus. In the control process in FIG. 13, steps corresponding to the steps of the control process in FIG. 8 are denoted by the same step numbers, and description thereof is omitted.

If the answer to the question of the step S302 is affirmative (YES), the camera microcomputer 125 proceeds to a step S1001, whereas if the answer to the question of the step S302 is negative (NO), the camera microcomputer 125 proceeds to a step S1004. In the step S1001, the camera microcomputer 125 rotates the unnecessary light reduction turret 430 so as to adjust the opening amount to an amount corresponding to the lens ID received in the step S301. After execution of the step S1001, the camera microcomputer 125 proceeds to the step S304. In a step S1002 following the step S305, the camera microcomputer 125 rotates the unnecessary light reduction turret 430 so as to adjust the opening amount to an amount corresponding to the lens position received in the step S304. After execution of the step S1002, the camera microcomputer 125 proceeds to the step S307.

In a step S1003 following the step S308, the camera microcomputer 125 rotates the unnecessary light reduction turret 430 so as to adjust the opening amount to an amount corresponding to the lens position set by driving of the zoom lens 200 and the like. After execution of the step S1003, the camera microcomputer 125 proceeds to the step S310. In the step S1004, the camera microcomputer 125 rotates the unnecessary light reduction turret 430 so as to adjust the opening amount to an amount which is to be set in the case where the effective light flux area information associated with the received lens ID has not been stored in the lens database 128 (the maximum opening amount at which the effective light flux area is not shielded even when any of the interchangeable lenses 2 is mounted). After execution of the step S1004, the camera microcomputer 125 proceeds to the step S312.

As described above, according to the present embodiment, it is possible to obtain the same advantageous effects as provided by the first embodiment. Further, in the present embodiment, since the unnecessary light reduction turret 430 is arranged in the ND unit 400 as the unnecessary light reduction member, an unnecessary light reduction turret is not required to be arranged separately from the ND unit 400, which makes it possible to achieve space saving.

Figure 14:
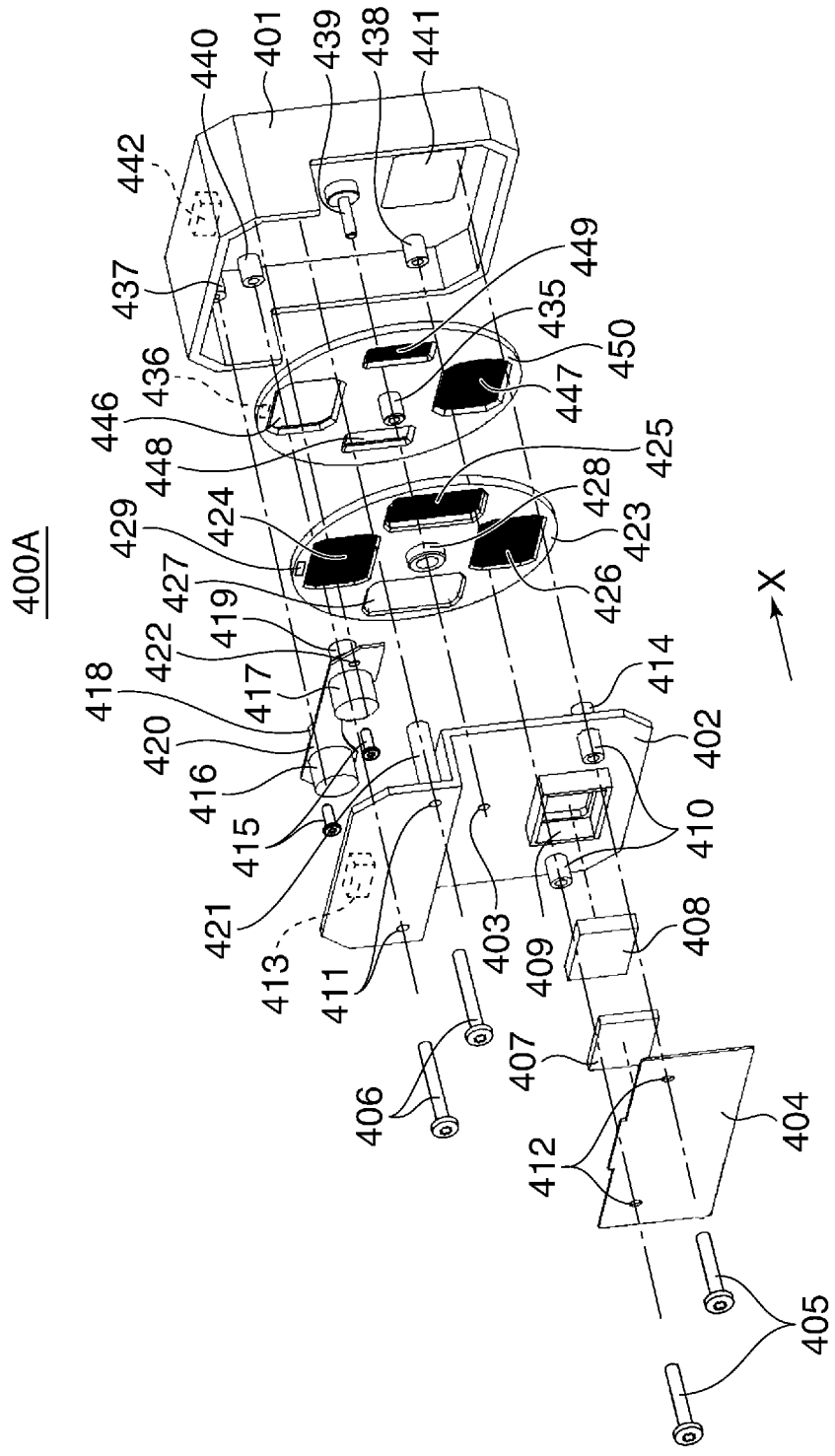
FIG. 14 is an exploded perspective view of an ND unit of a fourth embodiment.
Figure 15:
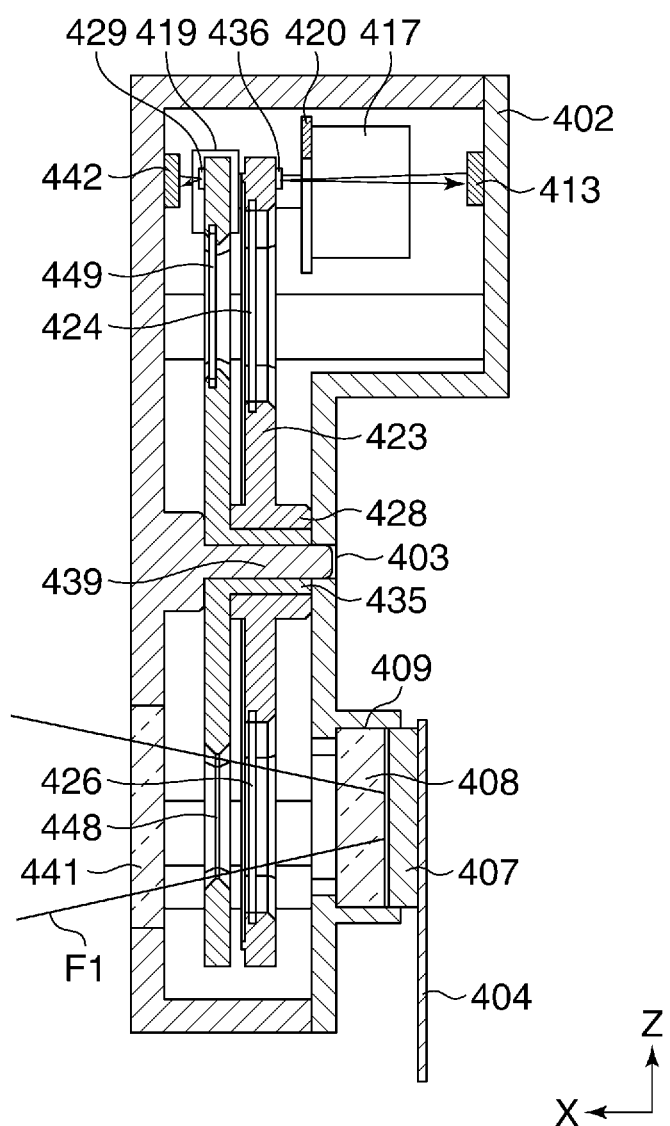
FIG. 15 is a schematic cross-sectional view of the ND unit of the fourth embodiment.

Next, a description will be given of a fourth embodiment of the present invention. FIG. 14 is an exploded perspective view of an ND unit 400A. FIG. 15 is a cross-sectional view of the ND unit 400A, and corresponds to the cross-sectional view in FIG. 12. The ND unit 400A has a structure in which the unnecessary light reduction turret 430 included in the ND unit 400 described in the third embodiment is replaced by an unnecessary light reduction turret 450. The construction of the ND unit 400A is the same as that of the ND unit 400 described in the third embodiment except the unnecessary light reduction turret 450. Therefore, the same components in FIGS. 14 and 15 as those of the ND unit 400 are denoted by the same reference numerals, and description thereof is omitted. Note that the appearance of the ND unit 400A is the same as that of the ND unit 400 (see FIG. 10).

The unnecessary light reduction turret 450 is provided with a first opening 446, a fourth ND filter 447, a second opening 448, and a fifth ND filter 449. The fourth ND filter 447 and the fifth ND filter 449 are the same in density, but these densities are different from those of the first ND filter 424, the second ND filter 425, and the third ND filter 426, which are provided on the ND turret 423. The first opening 446 and the fourth ND filter 447 are equal in size (area), and the second opening 448 and the fifth ND filter 449 are equal in size (area). Therefore, although the unnecessary light reduction turret 450 has only two types of areas for reducing unnecessary light, if the ND turret 423 is used as the opening 427 (if the opening 427 is set on the photographic optical path), one type of the ND filter is additionally provided. Further, by changing the combination of the opening and the ND filter between the unnecessary light reduction turret 450 and the ND turret 423, it is possible to select a desired density from seven different densities provided by the ND filters.

As described above, in the present embodiment, in a case where many openings which are different in area are not required to be provided in the unnecessary light reduction turret 450, the ND filters are provided by making use of a free space of the unnecessary light reduction turret 450 to thereby increase the number of types of the ND filter. This increases a degree of freedom in setting photographing conditions. Note that a control process for controlling the ND unit 400A conforms to the control process in FIG. 13, and hence description thereof is omitted. In the present embodiment, it is also possible to obtain the same advantageous effects as provided by the third embodiment.

Figure 16:
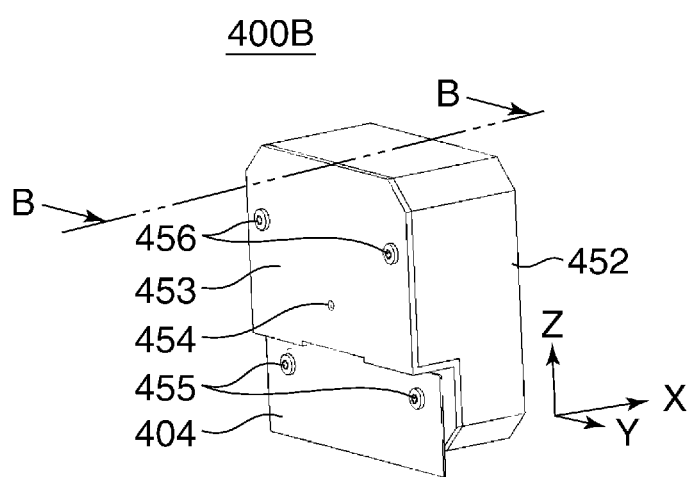
FIG. 16 is a perspective view of the appearance of an ND unit of a fifth embodiment.
Figure 17:
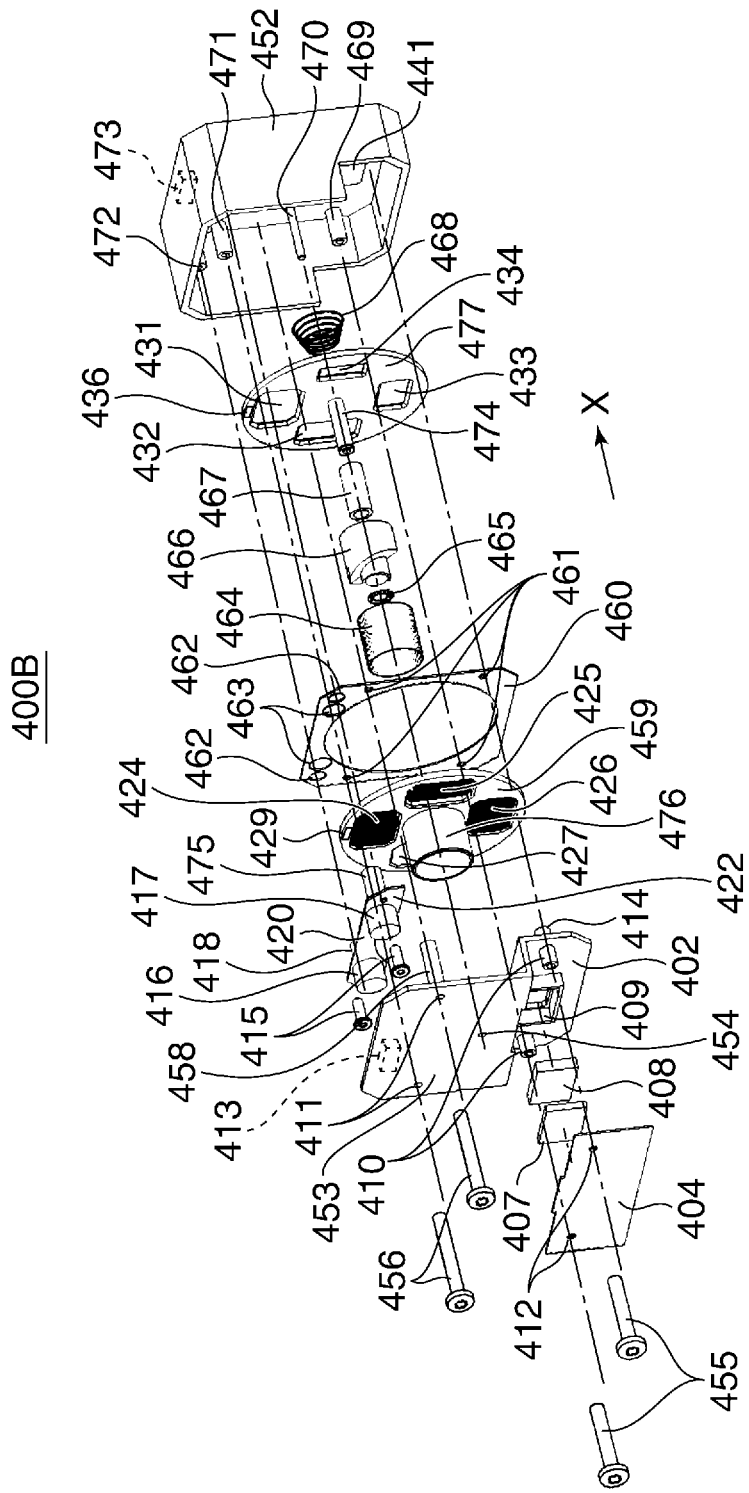
FIG. 17 is an exploded perspective view of the ND unit of the fifth embodiment.
Figure 18A:
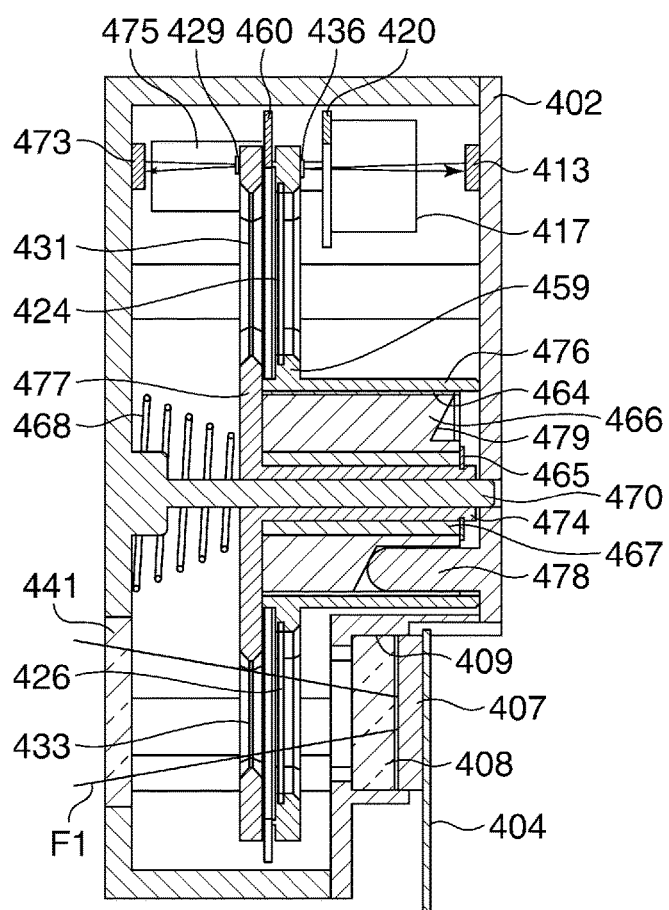
FIGS. 18A and 18B are schematic cross-sectional views of the ND unit of the fifth embodiment.
Figure 18B:
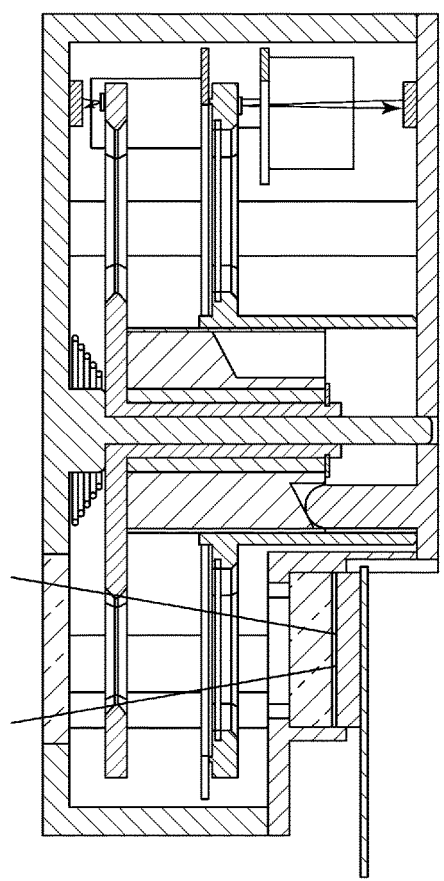

Next, a description will be given of a fifth embodiment of the present invention. FIG. 16 is a perspective view of the appearance of an ND unit 400B. FIG. 17 is an exploded perspective view of the ND unit 400B. FIGS. 18A and 18B are cross-sectional views taken along B-B in FIG. 16. FIG. 18A shows a state in which an ND turret 459, described hereinafter, and an unnecessary light reduction turret 477, described hereinafter, are made close to each other, and FIG. 18B shows a state in which the ND turret 459 and the unnecessary light reduction turret 477 are made distant from each other. Note that a correspondence relationship between the respective components in FIGS. 18A and 18B is clear, and hence the reference numerals of the components are omitted in FIG. 18B. Further, the ND unit 400B is a variation of the ND unit 400 described in the third embodiment, and therefore, the same components in FIGS. 16 to 18B as those of the ND unit 400 are denoted by the same reference numerals, and description thereof is omitted.

The ND unit 400B includes exterior covers 452 and 453, the ND turret 459, and the unnecessary light reduction turret 477. Further, the ND unit 400B includes a turret retaining metal plate 460, a metal ring 464, a polystyrene washer 465, a cam ring 466, a one-way clutch 467, a coil spring 468, and a laser photoelectric sensor 473.

A method of assembling the exterior covers 452 and 453, the sensor circuit board unit 404, and the motor holding plate 420 is the same as the method of assembling the corresponding components of the ND unit 400 described in the third embodiment, and hence description of components associated with this assembly is omitted. More specifically, description of a shaft hole 454, screws 455, screws 456, bosses 458, bosses 469, bosses 471, a shaft 470, and bosses 472 is omitted.

The ND turret 459 is integrally formed with a ring portion 476. The ND turret 459 has the same construction as the ND turret 423 described in the third embodiment in other respects. The turret retaining metal plate 460 is a member that presses a peripheral portion of the ND turret 459 toward the exterior cover 453 to an appropriate degree so as to prevent the ND turret 459 from being displaced in the X-axis direction. The turret retaining metal plate 460 is formed with screw holes 461 for positioning the turret retaining metal plate 460 at a predetermined position, clearance holes 462 for the bosses 472, and worm gear clearance holes 463. The cam ring 466 is a hollow cylindrical member, and has one end surface in the X-axis direction formed into a cam shape. The metal ring 464 is fitted on the outer periphery of the cam ring 466, and is fixed by an adhesive.

The one-way clutch 467 is a member which is locked/unlocked depending on the direction of rotation, and a member using a micro spring or a hard ball is employed as the one-way clutch 467. The one-way clutch 467 is fitted between a shaft 474 provided on the unnecessary light reduction turret 477, and the cam ring 466. The one-way clutch 467 causes the shaft 474 and the cam ring 466 to simultaneously rotate, or the shaft 474 alone to rotate, depending on the direction of rotation. In the present embodiment, when the unnecessary light reduction turret 477 is rotated in an anticlockwise direction, as viewed from the sensor circuit board unit 404, the shaft 474 and the cam ring 466 are simultaneously rotated, whereas when the unnecessary light reduction turret 477 is rotated in a clockwise direction, the shaft 474 alone is rotated. Note that openings formed in the unnecessary light reduction turret 477 are the same as the openings formed in the unnecessary light reduction turret 430 described in the third embodiment.

The polystyrene washer 465 is fitted after fitting the one-way clutch 467 and the cam ring 466 on the shaft 474 to thereby restrict movement of the one-way clutch 467 and the cam ring 466 in a thrust direction (X-axis direction). The coil spring 468 always urges the unnecessary light reduction turret 477 toward the ND turret 459. The laser photoelectric sensor 473 disposed on the exterior cover 452 detects the rotational angle of the unnecessary light reduction turret 477 and the position of the same in the X-axis direction, based on light reflected when emitting a laser beam toward the outer peripheral portion of the unnecessary light reduction turret 477. Note that the rotational angle of the unnecessary light reduction turret 477 can be detected by detecting the rotation origin point position of the unnecessary light reduction turret 477, by using the encoders provided on the stepping motors 416 and 417. The unnecessary light reduction turret 477 can be moved in the X-axis direction, and hence a worm gear 475 attached to the stepping motor 417 is configured to have a length which enables the worm gear 475 to be always engaged with an outer peripheral gear of the unnecessary light reduction turret 477 within the movable range. A cylindrical boss 478 (which is hidden by the exterior cover 453 in FIG. 17) is integrally formed with the exterior cover 453 such that it protrudes from the exterior cover 453 toward the exterior cover 452 in the X-axis direction. The cylindrical boss 478 has a tip end formed into a spherical shape, and is always in contact with a cam surface 479 of the cam ring 466.

Next, the operations of the components of the ND unit 400B will be described. The ND turret 459 is rotated by the stepping motor 416 to set the optimum ND filter. Then, the unnecessary light reduction turret 477 is rotated by the stepping motor 417 to set the optimum opening. In doing this, first, the unnecessary light reduction turret 477 is rotated in the anticlockwise direction, as viewed from the sensor circuit board unit 404. As a result, as described above, the shaft 474 and the cam ring 466 are simultaneously rotated by the action of the one-way clutch 467. At this time, since the cylindrical boss 478 is in contact with the cam surface 479 of the cam ring 466, the unnecessary light reduction turret 477 is moved along the cam surface 479 in the X-axis direction (optical axis direction). Then, the unnecessary light reduction turret 477 is set to the optimum position in the optical axis direction for reducing unnecessary light based on an output signal from the laser photoelectric sensor 473. After that, the unnecessary light reduction turret 477 is rotated in the clockwise direction, as viewed from the sensor circuit board unit 404. As a result, as described above, although the shaft 474 is rotated alone by the action of the one-way clutch 467, the cam ring 466 is not rotated, and hence the unnecessary light reduction turret 477 is not moved in the X-axis direction. Thus, it is possible to set the unnecessary light reduction turret 477 in a state in which the opening having the optimum opening area for reducing unnecessary light is set on the photographic optical path.

With the above-described operations, it is possible to set the opening having the optimum opening area for reducing unnecessary light entering the camera body at the optimum position on the photographic optical path according to the interchangeable lens. Therefore, it is possible to take a finely-tuned countermeasure against an incident light beam obliquely entering as the light beam H, as appearing in FIG. 9A, whereby it is possible to effectively suppress unnecessary light from entering the image pickup device. Note that although the unnecessary light reduction turret 477 can be fixed to the optimum position in the optical axis direction based on the output signal from the laser photoelectric sensor 473, the position of the unnecessary light reduction turret 477 in the optical axis direction cannot be detected in a minute section corresponding to the reflection preventing member 436 provided on the unnecessary light reduction turret 477. However, the reflection preventing member 436 is formed on a small area of the outer periphery of the unnecessary light reduction turret 477, and hence this minute section does not influence the accuracy of the position in the optical axis direction, at which the unnecessary light reduction turret 477 is fixed.

Figure 19:
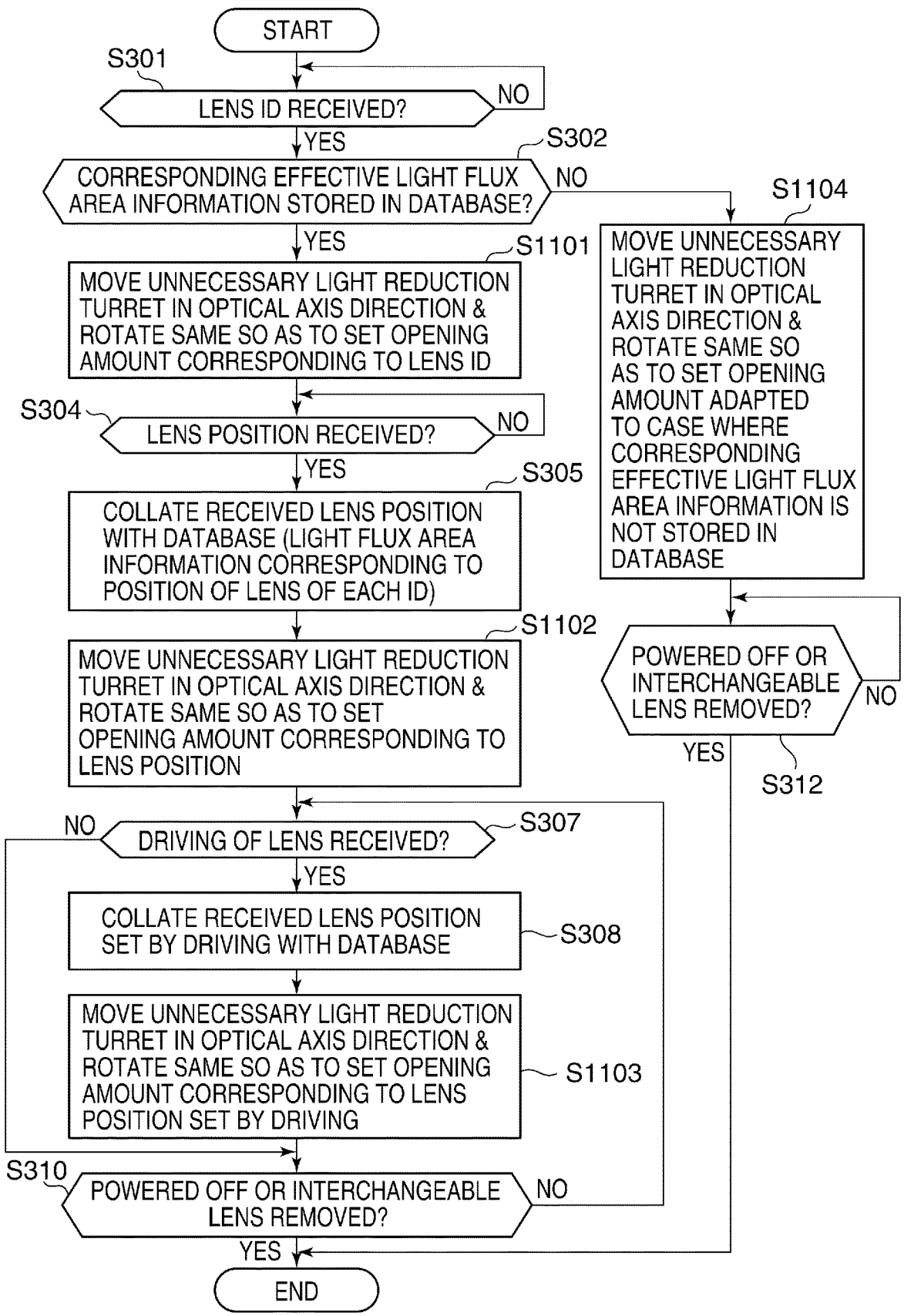
FIG. 19 is a flowchart of a control process for controlling the ND unit of the fifth embodiment.

FIG. 19 is a flowchart of a control process for controlling the ND unit 400B. Although the control block of the ND unit 400B is not shown, an actuator that drives the unnecessary light reduction turret 477 corresponds to the unnecessary light reduction actuator 129 appearing in FIG. 6. Processing in each step of the control process in FIG. 19 is realized by the camera microcomputer of the image pickup apparatus including the ND unit 400B, which executes a predetermined associated program to thereby control the operations of components of the image pickup apparatus. In the control process in FIG. 19, steps corresponding to the steps of the control process in FIG. 8 are denoted by the same step numbers, and description thereof is omitted.

If the answer to the question of the step S302 is affirmative (YES), the camera microcomputer 125 proceeds to a step S1101, whereas if the answer to the question of the step S302 is negative (NO), the camera microcomputer 125 proceeds to a step S1104. In the step S1101, the camera microcomputer 125 moves the unnecessary light reduction turret 477 in the optical axis direction and rotates the same so as to adjust the opening amount to an amount corresponding to the lens ID received in the step S301. After execution of the step S1101, the camera microcomputer 125 proceeds to the step S304. In a step S1102 following the step S305, the camera microcomputer 125 moves the unnecessary light reduction turret 477 in the optical axis direction and rotates the same so as to adjust the opening amount to an amount corresponding to the lens position received in the step S304. After execution of the step S1102, the camera microcomputer 125 proceeds to the step S307.

In a step S1103 following the step S308, the camera microcomputer 125 moves the unnecessary light reduction turret 477 in the optical axis direction and rotates the same so as to adjust the opening amount to an amount corresponding to the lens position set by driving of the zoom lens 200 and the like. After execution of the step S1103, the camera microcomputer 125 proceeds to the step S310. In the step S1104, the camera microcomputer 125 moves the unnecessary light reduction turret 477 in the optical axis direction and rotates the same so as to adjust the opening amount to an amount which is to be set in the case where the effective light flux area information associated with the received lens ID has not been stored in the lens database 128 (the maximum opening amount at which the effective light flux area is not shielded even when any of the interchangeable lenses 2 is mounted). After execution of the step S1104, the camera microcomputer 125 proceeds to the step S312.

As described above, according to the present embodiment, it is possible to obtain the same advantageous effects as provided by the third embodiment, and further, it is possible to more effectively suppress unnecessary light from entering the image pickup device than in the third embodiment.

Figure 20:
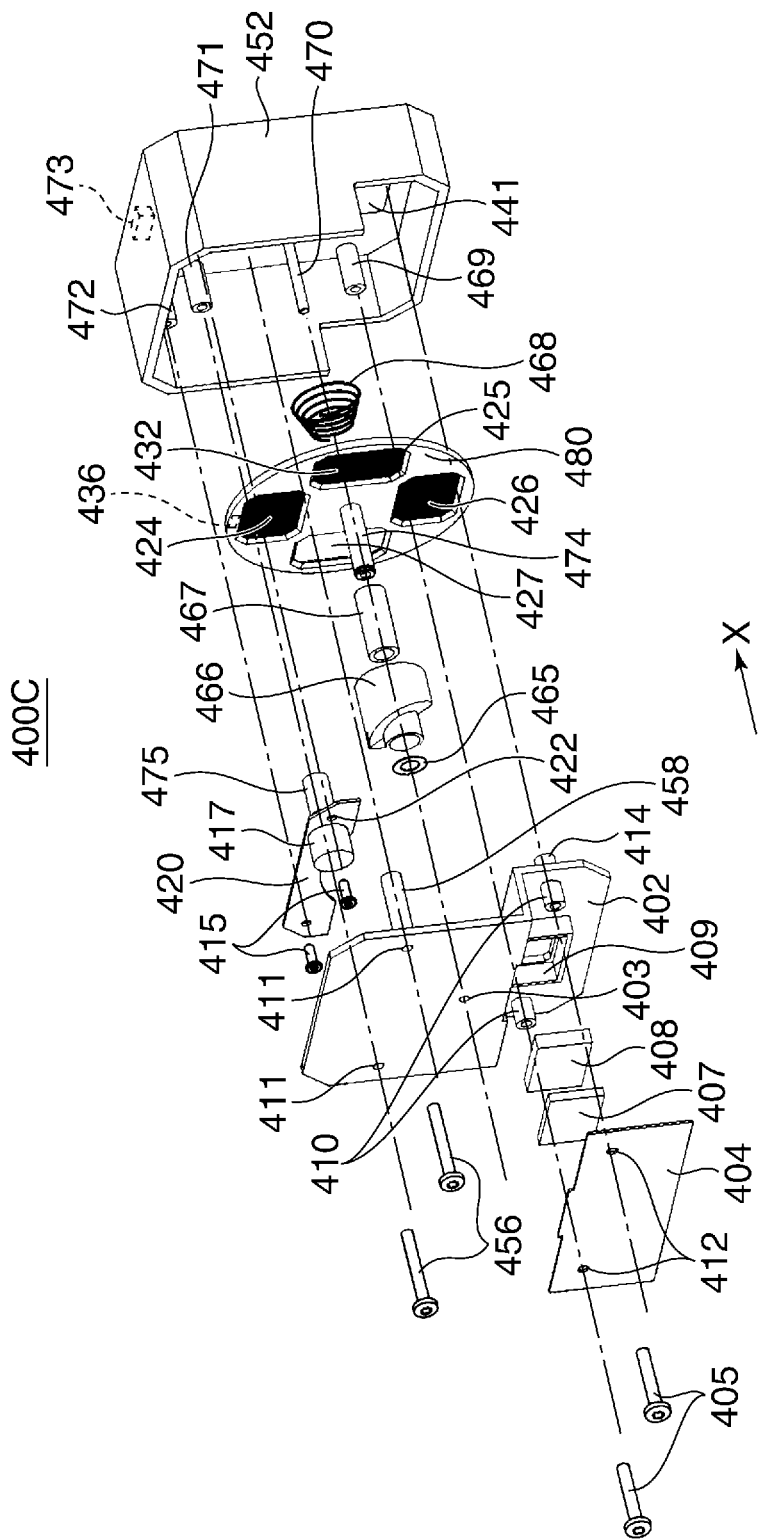
FIG. 20 is an exploded perspective view of an ND unit of a sixth embodiment.
Figure 21A:
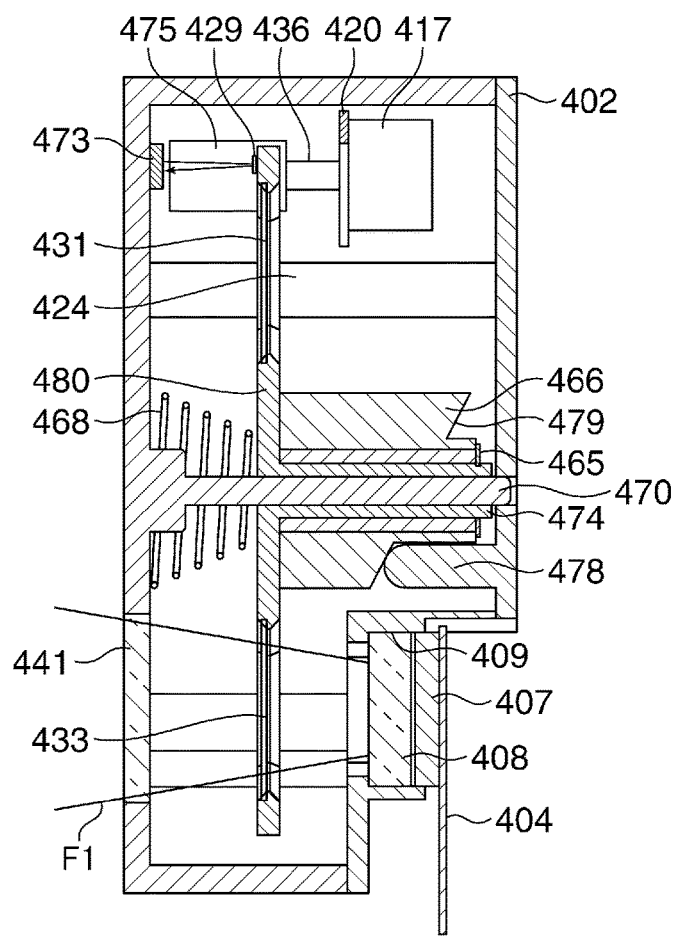
FIGS. 21A and 21B are schematic cross-sectional views of the ND unit of the sixth embodiment.
Figure 21B:
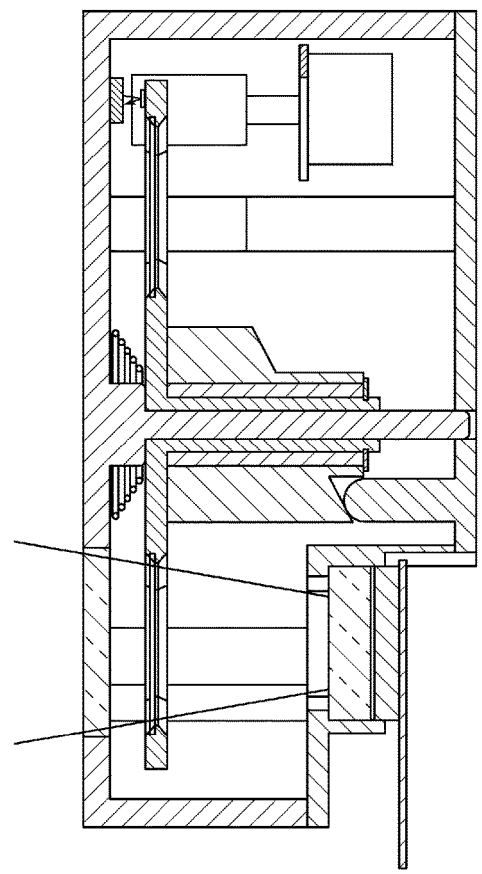

Next, a description will be given of a sixth embodiment of the present invention. FIG. 20 is an exploded perspective view of an ND unit 400C. Note that the appearance of the ND unit 400C is the same as that of the ND unit 400B (see FIG. 16) described in the fifth embodiment. FIGS. 21A and 21B are cross-sectional views of the ND unit 400C. FIG. 21A is a cross-sectional view corresponding to FIG. 18A, and FIG. 21B is a cross-sectional view corresponding to FIG. 18B. The ND unit 400C has a structure in which the ND turret 459 and the members necessary for holding and driving the ND turret 459 are eliminated from the ND unit 400B, and an ND turret 480 is disposed in place of the unnecessary light reduction turret 477 at a location of the unnecessary light reduction turret 477. Therefore, the same components of the ND unit 400C as those of the ND unit 400B are denoted by the same reference numerals, and description thereof is omitted.

The shaft 474 provided on the ND turret 480 is the same as the shaft 474 provided on the unnecessary light reduction turret 477, and the method of assembling the cam ring 466 and so forth to the shaft 474 conforms to that in the fifth embodiment. The arrangement of the ND filters and the opening in the ND turret 480 is the same as the arrangement of the ND filters and the opening in the ND turret 423 in the third embodiment. Therefore, in the ND unit 400C, it is possible to set a desired ND filter or opening in the photographic optical path in a state in which the ND turret 480 is held at a predetermined position in the X-axis direction (optical axis direction). The operation for suppressing unnecessary light from entering the image pickup device is performed only by moving the ND turret 480 in the optical axis direction, and even with this configuration, it is also possible to sufficiently cope with a minute change in light flux. Further, the ND unit 400C makes it possible to reduce the number of components, compared with the ND unit 400B, whereby it is possible to reduce the weight and costs.

Figure 22:
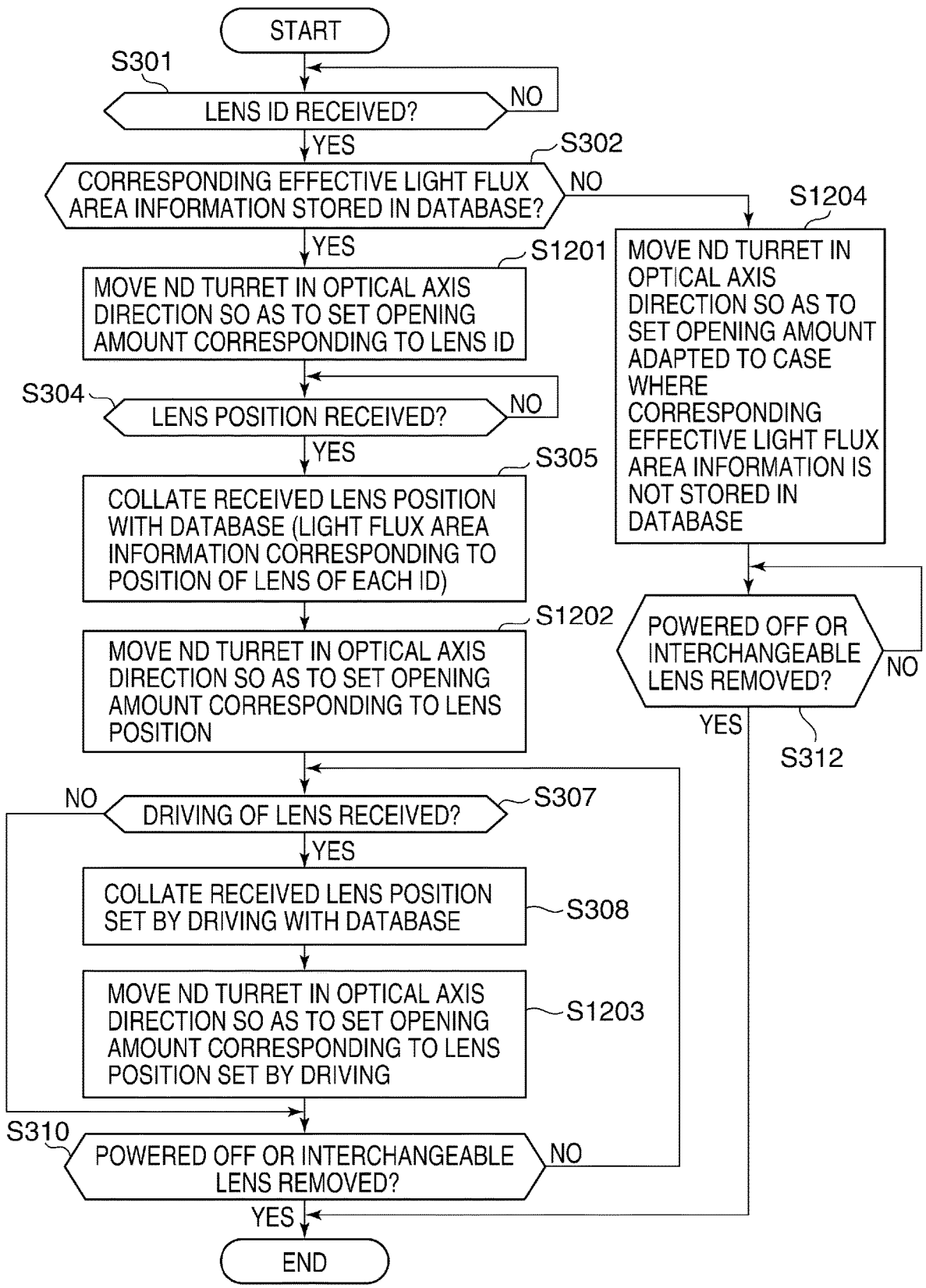
FIG. 22 is a flowchart of a control process for controlling the ND unit of the sixth embodiment.

FIG. 22 is a flowchart of a control process for controlling the ND unit 400C. Although the control block of the ND unit 400C is not shown, an actuator that drives the ND turret 480 corresponds to the unnecessary light reduction actuator 129 appearing in FIG. 6. Processing in each step of the control process in FIG. 22 is realized by the camera microcomputer of the image pickup apparatus including the ND unit 400C, which executes a predetermined associated program to thereby control the operations of components of the image pickup apparatus. In the control process in FIG. 22, steps corresponding to the steps of the control process in FIG. 8 are denoted by the same step numbers, and description thereof is omitted.

If the answer to the question of the step S302 is affirmative (YES), the camera microcomputer 125 proceeds to a step S1201, whereas if the answer to the question of the step S302 is negative (NO), the camera microcomputer 125 proceeds to a step S1204. In the step S1201, the camera microcomputer 125 moves the ND turret 480 in the optical axis direction so as to adjust the opening amount to an amount corresponding to the lens ID received in the step S301. After execution of the step S1201, the camera microcomputer 125 proceeds to the step S304. In a step S1202 following the step S305, the camera microcomputer 125 moves the ND turret 480 in the optical axis direction so as to adjust the opening amount to an amount corresponding to the lens position received in the step S304. After execution of the step S1202, the camera microcomputer 125 proceeds to the step S307.

In a step S1203 following the step S308, the camera microcomputer 125 moves the ND turret 480 in the optical axis direction so as to adjust the opening amount to an amount corresponding to the lens position set by driving of the zoom lens 200 and the like. After execution of the step S1203, the camera microcomputer 125 proceeds to the step S310. In the step S1204, the camera microcomputer 125 moves the ND turret 480 in the optical axis direction so as to adjust the opening amount to an amount which is to be set in the case where the effective light flux area information associated with the received lens ID has not been stored in the lens database 128 (the maximum opening amount at which the effective light flux area is not shielded even when any of the interchangeable lenses 2 is mounted). After execution of the step S1204, the camera microcomputer 125 proceeds to the step S312.

As described above, according to the present embodiment, it is possible to obtain the same advantageous effects as provided by the third embodiment, and further, it is possible to more effectively reduce the weight and costs than in the fifth embodiment.

Figure 23:
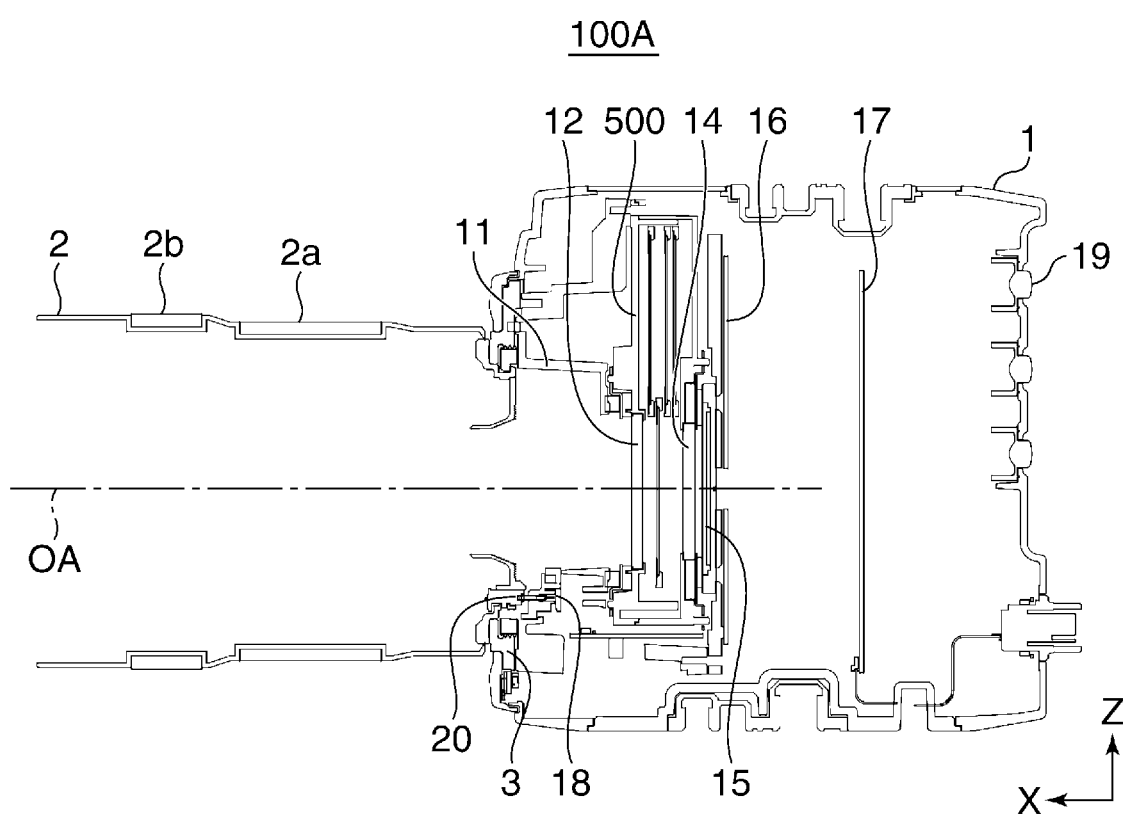
FIG. 23 is a vertical cross-sectional view of an image pickup apparatus according to a seventh embodiment.

Next, a description will be given of a seventh embodiment of the present invention. FIG. 23 is a vertical cross-sectional view (view of a cross-section which includes the optical axis OA, and is orthogonal to the Y-axis) of an image pickup apparatus 100A according to the seventh embodiment. The appearance of the image pickup apparatus 100A is the same as that of the image pickup apparatus 100 (see FIG. 1) described in the first embodiment. The image pickup apparatus 100A differs from the image pickup apparatus 100 in that an ND unit 500 is provided in place of the ND unit 13 of the image pickup apparatus 100. Therefore, the exploded perspective view of the image pickup apparatus 100A is the same as that of the image pickup apparatus 100 (see FIG. 3). Accordingly, the following description is given mainly of the ND unit 500, and the same component elements of the image pickup apparatus 100A as those of the image pickup apparatus 100 are denoted by the same reference numerals, and description thereof is omitted.

The ND unit 500 is mounted on the front base 11 on which the mount 3 is mounted. The ND unit 500 includes an infrared cut filter for reducing light in an infrared range, and a plurality of optical filters (more specifically, four optical filters) which are different in density and each have a light reducing function with respect to light in a visible region. The optical filters are disposed at predetermined intervals in the optical direction, and can be individually inserted into and retracted from the photographic optical path. Note that in the present embodiment, at the time of photographing, one of the four optical filters, selected by a photographer, is inserted into the photographic optical path, and the rest of the optical filters are retracted out of the photographic optical path (toward the positive Z-axis direction). In the following description, an optical filter in the state inserted in the photographic optical path is referred to as the optical filter in the inserted state, and an optical filter in the state not inserted in the photographic optical path is referred to as the optical filter in the retracted state.

Figure 24A:
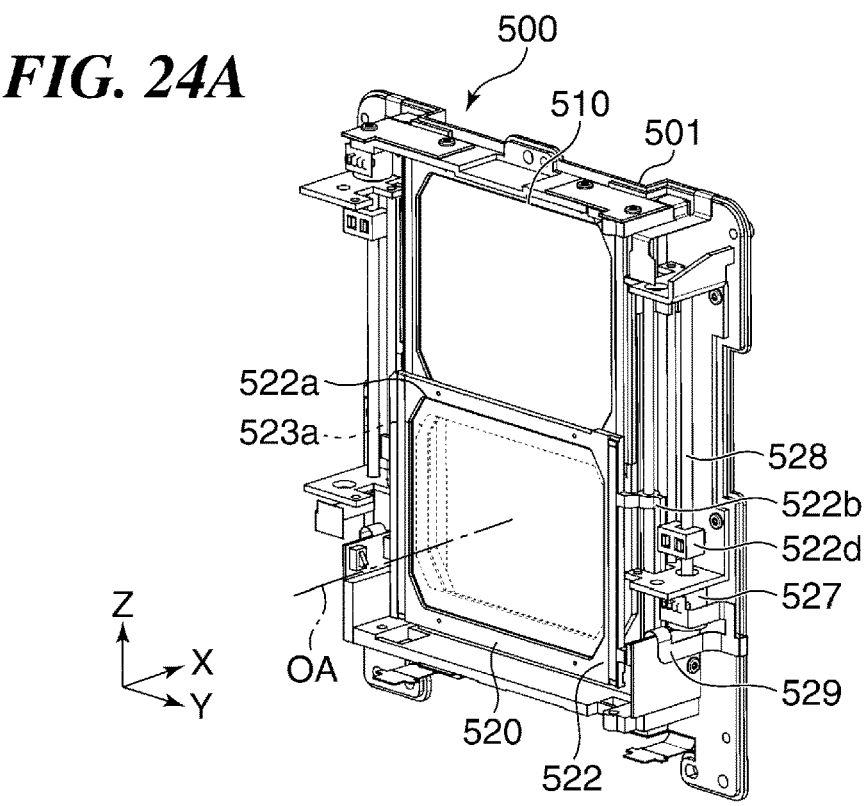
FIGS. 24A and 24B are perspective views of an ND unit of the seventh embodiment.
Figure 24B:
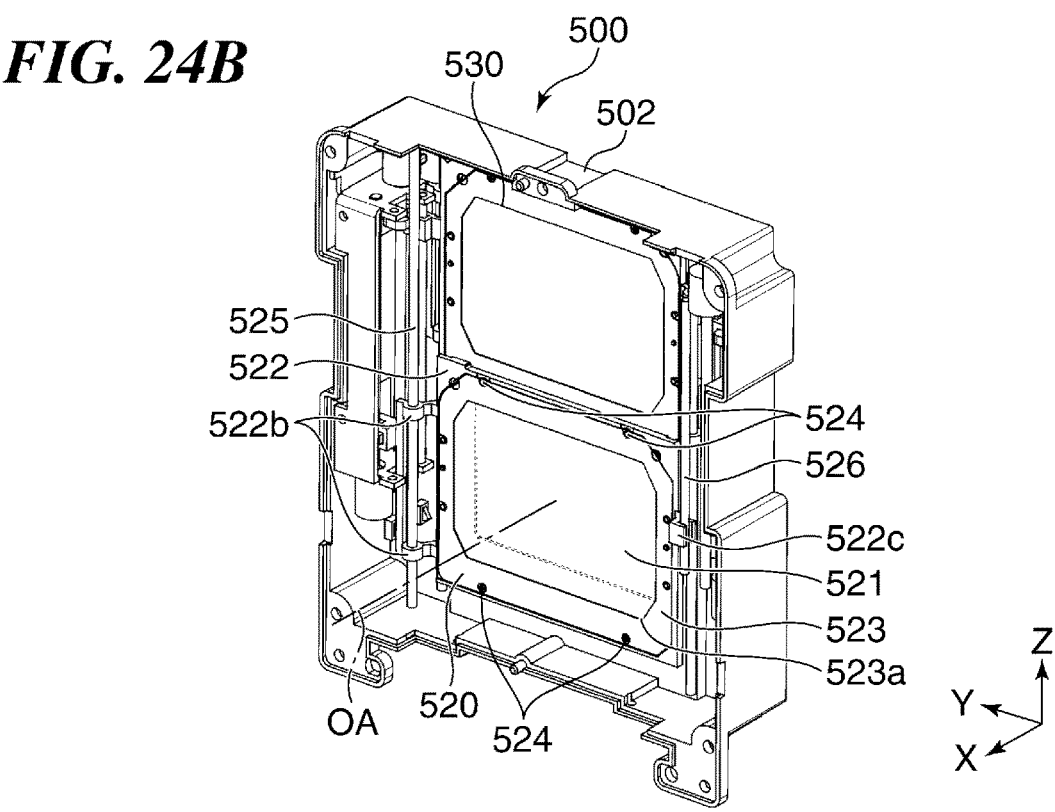

FIGS. 24A and 24B are perspective views of the ND unit 500. FIG. 24A is a perspective view of the ND unit 500, as viewed from the main circuit board 17. FIG. 24B is a perspective view of the ND unit 500, as viewed from the mount 3. In FIGS. 24A and 24B, only a second optical filter, which is a second one from the mount 3, is in the inserted state, and part of the other optical filters is omitted from illustration in order to explain the internal structure of the ND unit 500. The ND unit 500 includes a front cover 501 and a rear cover 502, and a first optical filter 510, the second optical filter, denoted by reference numeral 520, a third optical filter 530, and a fourth optical filter 540 (not shown in FIGS. 24A and 24B, see FIGS. 25A to 26C), which are disposed in the mentioned order from the mount 3.

The structure of the optical filter will be described by taking the second optical filter 520 in the inserted state as an example. Note that the first optical filter 510, the third optical filter 530, and the fourth optical filter 540 each have the same construction as that of the second optical filter 520, and hence description thereof is omitted. The second optical filter 520 has a structure in which a transparent optical glass 521 is held by a base member 522 formed of thermoplastic resin or the like and a mask member 523 formed of a thin metal plate. The optical glass 521 is fitted in a recess formed in the base member 522, and is covered with the mask member 523 from above. The mask member 523 is fixed to the base member 522 with screws 524. The base member 522 and the mask member 523 have openings 522a and 523a through which light flux incident through the interchangeable lens 2 (not shown) can be transmitted toward the image pickup device 15, respectively.

Here, the opening 523a of the mask member 523 is smaller than the opening 522a of the base member 522. This is because the mask member 523 can be formed to be thinner than the base member 522, and hence it is possible to prevent unnecessary light reflected by an edge surface of the opening from entering the image pickup device 15. Further, the opening 523a of the mask member 523 is formed into a size at which the maximum effective light flux of all the effective light fluxes of the interchangeable lenses 2 which can be mounted on and removed from the camera body 1 is not shielded, and the mask member 523 also functions as a mask that shields unnecessary light entering from the outside of the effective light flux. That is, in the present embodiment, the mask member 523 also plays the role of a light shielding member that reduces unnecessary light. The surface of the mask member 523 may be subjected to reflection prevention processing, or may be coated with a light shielding paint for preventing reflection of light.

The base member 522 is provided with arm portions 522b and 522c protruding in the Y-axis direction. The arm portions 522b and 522c are held such that they are slidable in the Z-axis direction along guide shafts 525 and 526, respectively, to thereby make it possible to move the second optical filter 520 only in the Z-axis direction. The arm portions 522b have a protruding portion 522d formed thereon. Further, an actuator 527, which is easy to control the position, such as a stepping motor, is disposed in the ND unit 500. The protruding portion 522d formed on the arm portions 522b is connected to a lead screw 528 which converts the rotational motion of the actuator 527 to a linear motion in the Z-axis direction. The actuator 527 and the main circuit board 17 are electrically connected by a flexible circuit board 529. The camera controller 124 mounted on the main circuit board 17 controls the driving of the actuator 527 to thereby control the movement of the second optical filter 520 in the Z-axis direction (change of the second optical filter 520 between the retracted state and the inserted state).

Figure 25A:
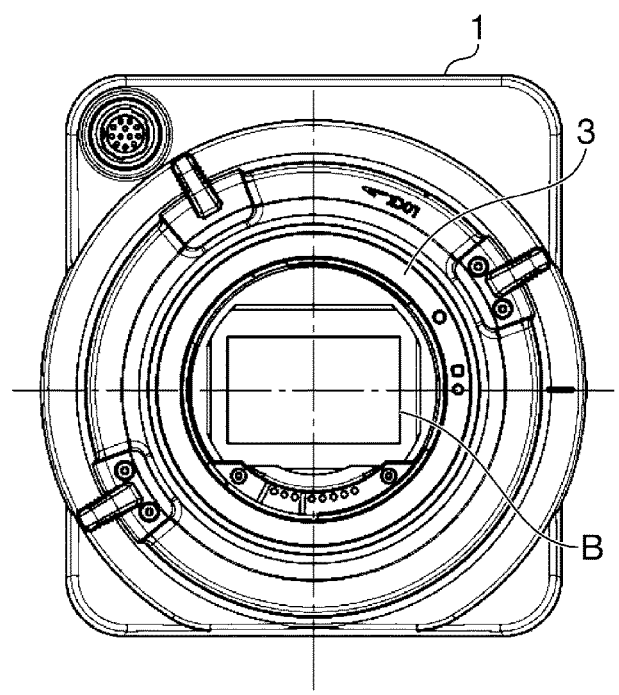
FIGS. 25A to 25D are diagrams useful in explaining the operation of the ND unit of the seventh embodiment, which is performed when an interchangeable lens which is large in effective light flux is mounted.
Figure 25B:
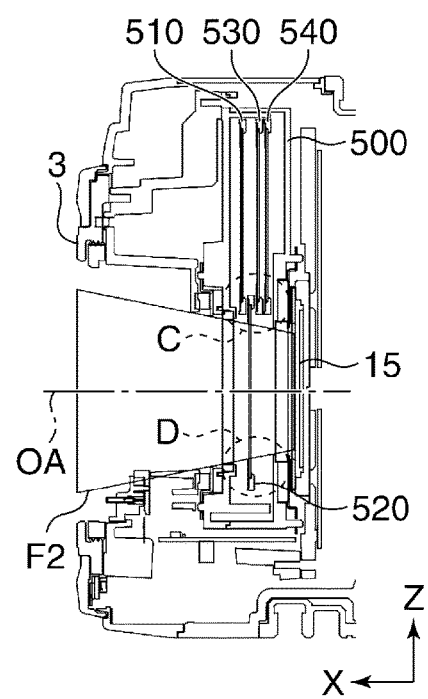
Figure 25C:
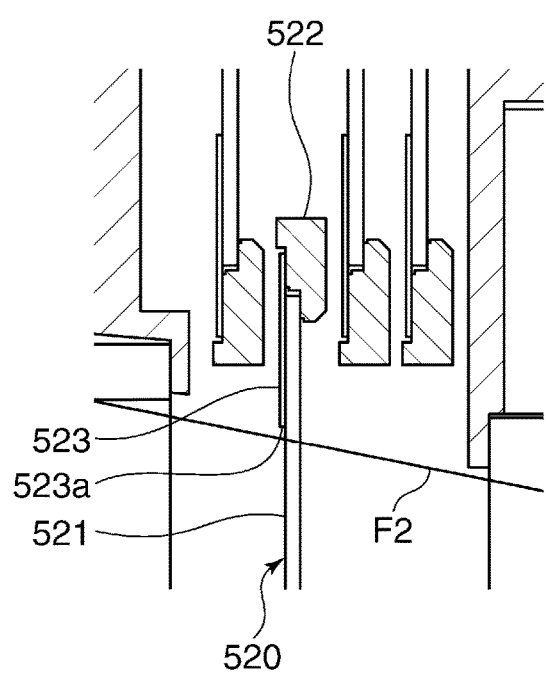
Figure 25D:
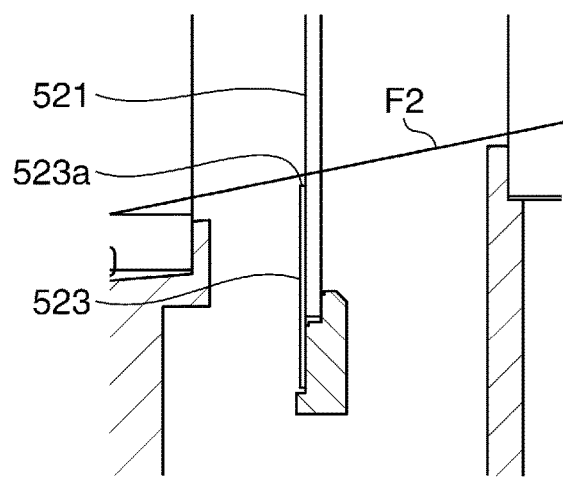

FIGS. 25A to 25D are diagrams useful in explaining the operation of the ND unit 500 in a state having an interchangeable lens (not shown), which is large in effective light flux, mounted on the camera body 1. FIG. 25A is a front view of the camera body 1. FIG. 25B is a cross-sectional view which includes the optical axis OA and is orthogonal to the Y-axis. FIG. 25C is an enlarged view of an area C in FIG. 25B, and FIG. 25D is an enlarged view of an area D in FIG. 25B. An area B in FIG. 25A indicates an effective pixel area of the image pickup device 15, and the effective light flux F2 in FIG. 25B indicates the maximum effective light flux entering the camera body 1.

It is assumed that the interchangeable lens which is the largest in effective light flux of the interchangeable lenses which can be mounted on the camera body 1 is mounted on the camera body 1. In the ND unit 500, the second optical filter 520 in the inserted state is disposed at a location at which the effective light flux F2 is not shielded by a portion, defining the opening 523a, of the mask member 523, as shown in FIGS. 25C and 25D. Note that even when any of the first optical filter 510, the third optical filter 530, and the fourth optical filter 540 is shifted to the inserted state, similarly to the second optical filter 520, the effective light flux F2 is not shielded by a portion, defining the opening, of the mask member of the inserted optical filter.

Figure 26A:
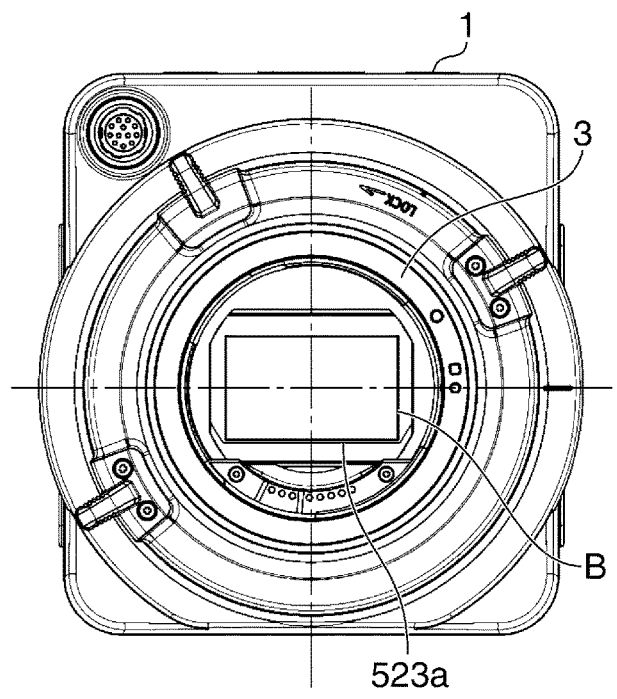
FIGS. 26A to 26D are first diagrams useful in explaining the operation of the ND unit of the seventh embodiment, which is performed when an interchangeable lens which is small in effective light flux is mounted.
Figure 26B:
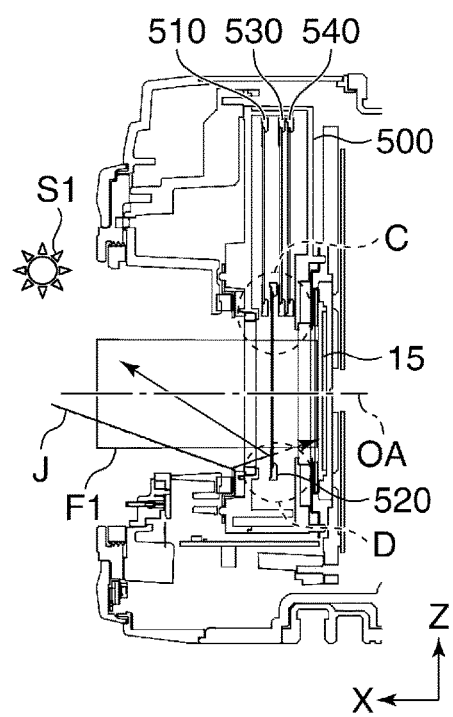
Figure 26C:
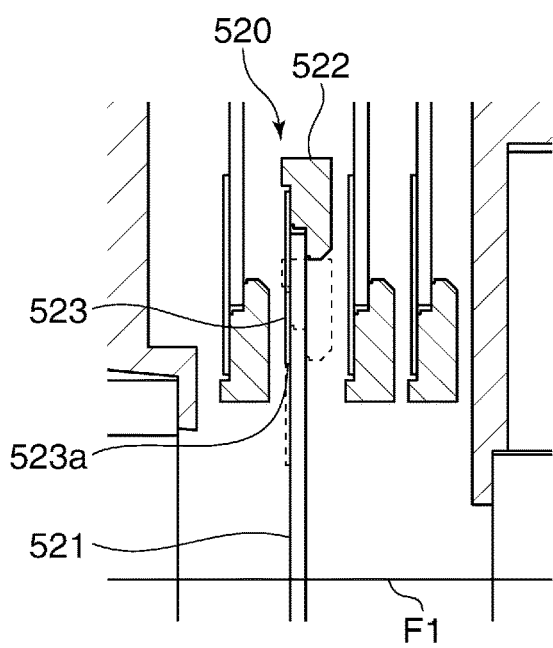
Figure 26D:
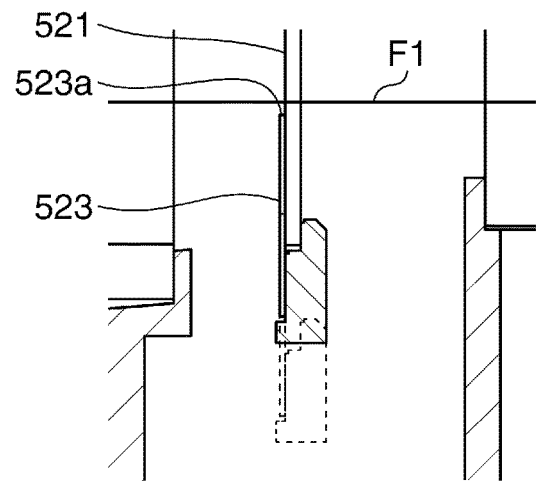
Figure 27A:
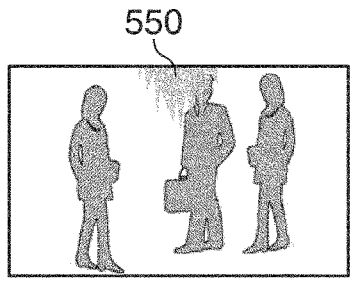
FIGS. 27A to 27C are diagrams useful in explaining a relationship between a position of a second optical filter of the ND unit of the seventh embodiment and a photographed image.
Figure 27B:
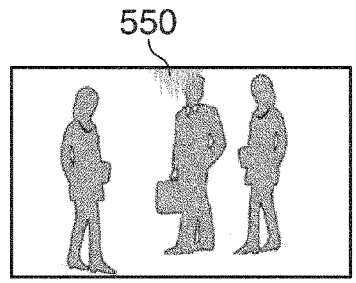
Figure 27C:
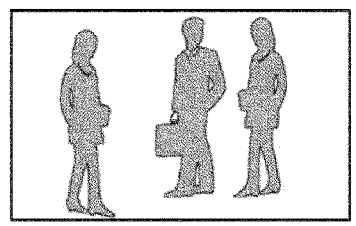

FIGS. 26A to 26D are first diagrams useful in explaining the operation of the ND unit 500 performed when an interchangeable lens (not shown) which is small in effective light flux is mounted. FIG. 26A is a front view of the camera body 1. FIG. 26B is a cross-sectional view which includes the optical axis OA and is orthogonal to the Y-axis. FIG. 26C is an enlarged view of an area C in FIG. 26B, and FIG. 26D is an enlarged view of an area D in FIG. 26B. An area B in FIG. 26A indicates an effective pixel area of the image pickup device 15, and the effective light flux F1 in FIG. 26B indicates the maximum effective light flux entering the camera body 1, and is narrower in light beam range than the effective light flux F2 in FIGS. 25A to 25D. FIGS. 27A to 27C are diagrams useful in explaining a relationship between the position of the second optical filter 520 and a photographed image in a case where a high-luminance light source S1 is positioned above the camera body 1 (in the positive Z-axis direction).

When the light source S1 is at a location upward of the camera body 1 as shown in FIG. 26B, light reflected by a component inside the camera body 1 enters lower part of the image pickup device 15. For example, light entering at such an angle as indicated by a light beam J is reflected by an edge surface of a component within the camera body 1, and then enters the image pickup device 15 as indicated by a broken line. At this time, if the second optical filter 520 is in a position indicated in FIGS. 25A to 25D (position indicated by broken lines in FIGS. 26C and 26D), unnecessary light enters the image pickup device 15, which causes a ghost 550, as shown in FIG. 27A.

To prevent this, as shown in FIG. 26D, the second optical filter 520 is moved from the position indicated by the broken lines to a position indicated by solid lines in the positive Z-axis direction, where a lower side of the effective light flux F1 is not shielded. As a result, as indicated by a solid arrow in FIG. 26B, the light beam J is reflected by the surface of the mask member 523, and returns toward the interchangeable lens. Thus, unnecessary light entering below the effective light flux F1 is shielded by the mask member 523, whereby it is possible to prevent unnecessary light from entering the image pickup device 15. As a result, the ghost 550 is suppressed in a photographed image, as shown in FIG. 27B.

If the photographer desires to further reduce the ghost 550 after checking the photographed image in FIG. 27B, the photographer inputs an instruction for further moving the second optical filter 520 in the positive Z-axis direction from the operation section 19 to make the opening 523a of the mask member 523 closer to the effective light flux F1. This makes it possible to obtain a photographed image without the ghost 550, as shown in FIG. 27C. Thus, the ND unit 500 makes it possible to reduce unnecessary light as much as possible by reducing a gap between the opening 523a of the mask member 523 and the effective light flux F1, and hence it is also possible to prevent occurrence of ghost due to an assembling error, tolerance of components, or the like.

Figure 28A:
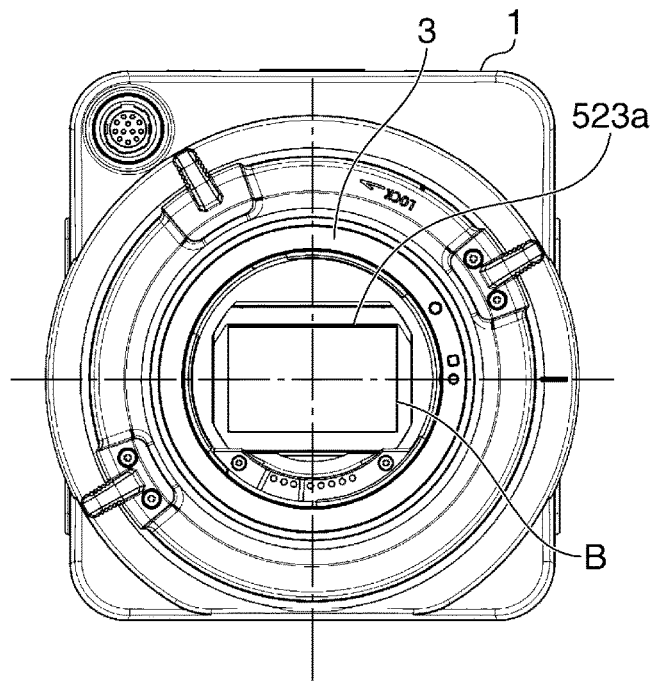
FIGS. 28A to 28D are second diagrams useful in explaining the operation of the ND unit of the seventh embodiment, which is performed when an interchangeable lens which is small in effective light flux is mounted.
Figure 28B:
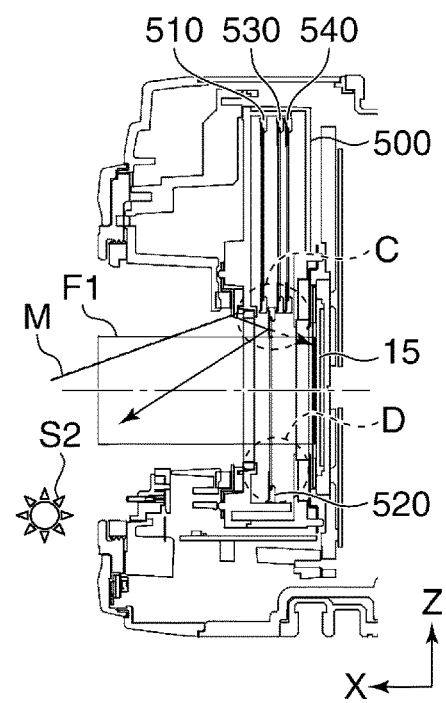
Figure 28C:
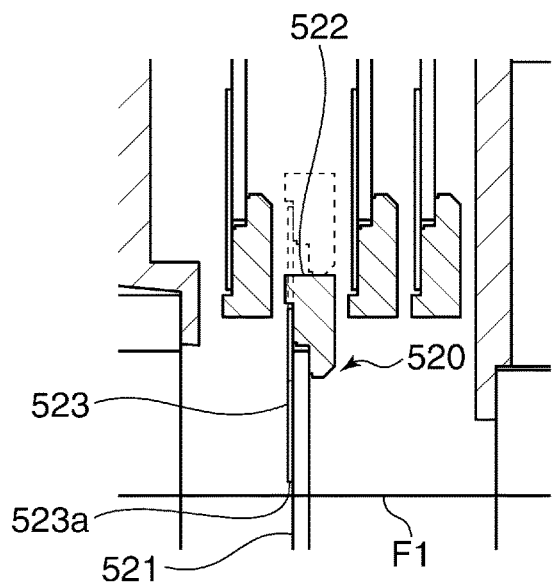
Figure 28D:
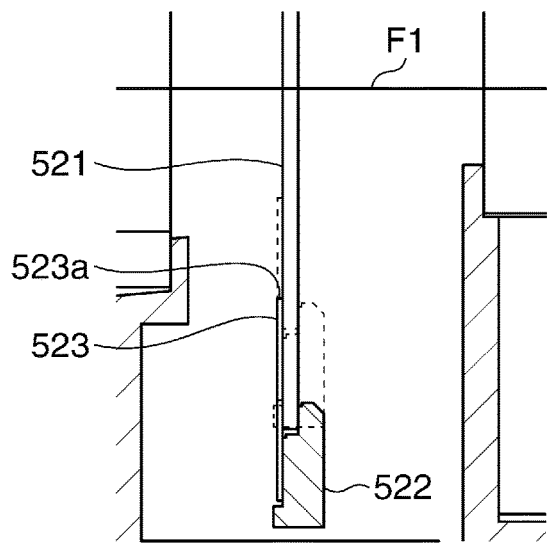

The description has been given of the case where the light source S1 is at the location upward of the camera body 1 with reference to FIGS. 26A to 26D, and 27A to 27C. The following description is given of the control of the ND unit 500 performed when the light source S1 is at a location downward of the camera body 1. FIGS. 28A to 28D are second diagrams useful in explaining the operation of the ND unit 500 performed when an interchangeable lens (not shown) which is small in effective light flux is mounted. FIG. 28A is a front view of the camera body 1. FIG. 28B is a cross-sectional view which includes the optical axis OA and is orthogonal to the Y-axis. FIG. 28C is an enlarged view of an area C in FIG. 28B, and FIG. 28D is an enlarged view of an area D in FIG. 28B. An area B in FIG. 28A indicates an effective pixel area of the image pickup device 15, and the effective light flux F1 in FIG. 28B indicates the maximum effective light flux entering the camera body 1.

When a high-luminance light source S2 is at a location downward of the camera body 1 (in the negative Z-axis direction) as shown in FIG. 28B, light reflected by a component inside the camera body 1 enters upper part of the image pickup device 15. For example, light entering at such an angle as indicated a light beam M is reflected by an edge surface of a component within the camera body 1, and then enters the image pickup device 15 as indicated by a broken line. At this time, if the second optical filter 520 is in a position indicated in FIGS. 25A to 25D (position indicated by broken lines in FIGS. 28C and 28D), unnecessary light enters the image pickup device 15, which causes a ghost.

To prevent this, as shown in FIG. 28C, the second optical filter 520 is moved from the position indicated by the broken lines to a position indicated by solid lines in the negative Z-axis direction, where an upper side of the effective light flux F1 is not shielded. As a result, as indicated by a solid arrow in FIG. 28B, the light beam M is reflected by the surface of the mask member 523, and returns toward the interchangeable lens. Thus, unnecessary light entering above the effective light flux F1 is shielded by the mask member 523, whereby it is possible to prevent unnecessary light from entering the image pickup device 15.

Which of the unnecessary light entering the upper part of the image pickup device 15 or the unnecessary light entering the lower part of the same is to be shielded may be determined by detecting the position of the light source, whereby the optical filter may be automatically driven according to a result of the determination, or the direction and amount of moving the optical filter may be set in accordance with unnecessary light which the photographer desires to shield. The positions of the light sources S1, S2, and the like can be acquired using a well-known technique based on luminance information of a photographed image. In the case of the ND unit 500, by taking into account the effective light flux of the interchangeable lens and the position of the light source, the position of the opening of each optical filter is adjusted in a direction of inserting and retracting the optical filter into and from the photographic optical path (position in the Z-axis direction). This makes it possible to effectively reduce unnecessary light entering the image pickup device 15. Further, the photographer can adjust the position of the optical filter in the inserted state in the Z-axis direction while checking an influence of unnecessary light on a photographed image. Therefore, it is possible to perform photographing by taking a more finely-tuned countermeasure against unnecessary light, and thereby obtain a high-quality photographed image.

In the present embodiment, it is possible to reduce unnecessary light entering the image pickup device 15 using a well-known ND unit which can insert and retract the optical filter into and from the photographic optical path, and hence it is not required to additionally provide an unnecessary light reduction member separately. Further, it is possible to reduce unnecessary light entering the image pickup device 15 only by adjusting the amount of movement of the optical filter when inserting the same into the photographic optical path, and hence it is unnecessary to additionally provide driving means (actuator). This prevents the internal structure of the camera body 1 from being made complicated, and the size of the camera body 1 from being increased.

Figure 29:
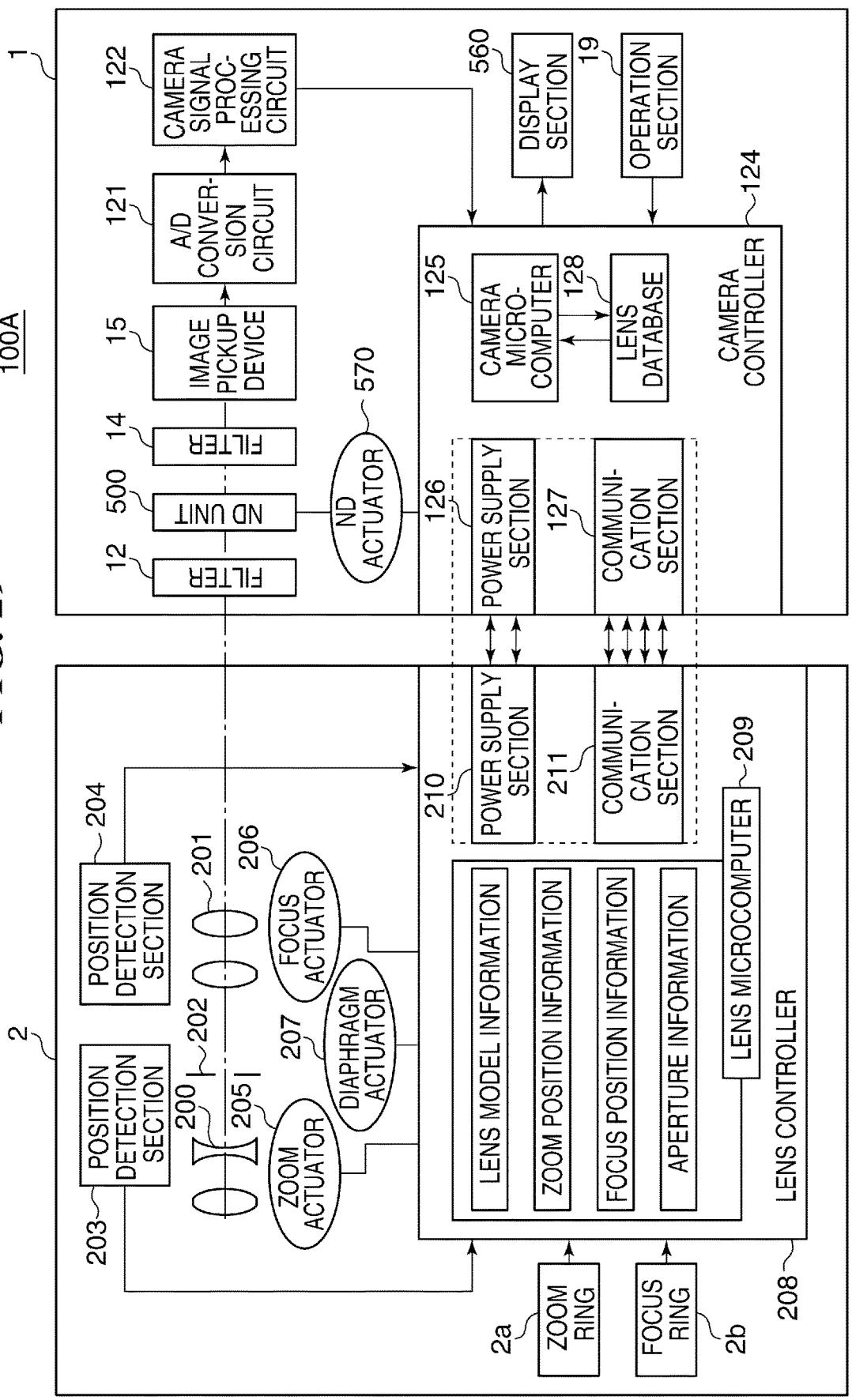
FIG. 29 is a control block diagram of the image pickup apparatus according to the seventh embodiment.

FIG. 29 is a control block diagram of the image pickup apparatus 100A. The image pickup apparatus 100A differs from the image pickup apparatus 100 according to the first embodiment in that the camera body 1 includes a display section 560, and further includes an ND actuator 570 in place of the unnecessary light reduction actuator 129. The same component elements of the image pickup apparatus 100A as those of the image pickup apparatus 100 (see FIG. 6) are denoted by the same reference numerals, and description thereof is omitted. Note that the low-pass filters 12 and 14 which are collectively shown as the optical filter 120 in FIG. 6 and an ND unit 500 replacing the ND unit 13 omitted from FIG. 6 are explicitly shown.

The camera microcomputer 125 collates the lens information acquired from the interchangeable lens 2 with the light flux area information stored in the lens database 128, and identifies the effective light flux area of the interchangeable lens 2. Then, the camera microcomputer 125 drives the ND actuator 570 based on the identified effective light flux area. The ND actuator 570 includes a motor which shifts each optical filter between the inserted state and the retracted state in the ND unit 500, and a motor which adjusts the position of the optical filter in the inserted state in the Z-axis direction. An object image (live view image) is displayed on the display section 560. The photographer can input an instruction to the camera microcomputer 125 via the operation section 19, for adjusting the position of the optical filter in the inserted state in the Z-axis direction. The camera microcomputer 125 drives the ND actuator 570 according to the instruction received from the operation section 19.

Figure 30:
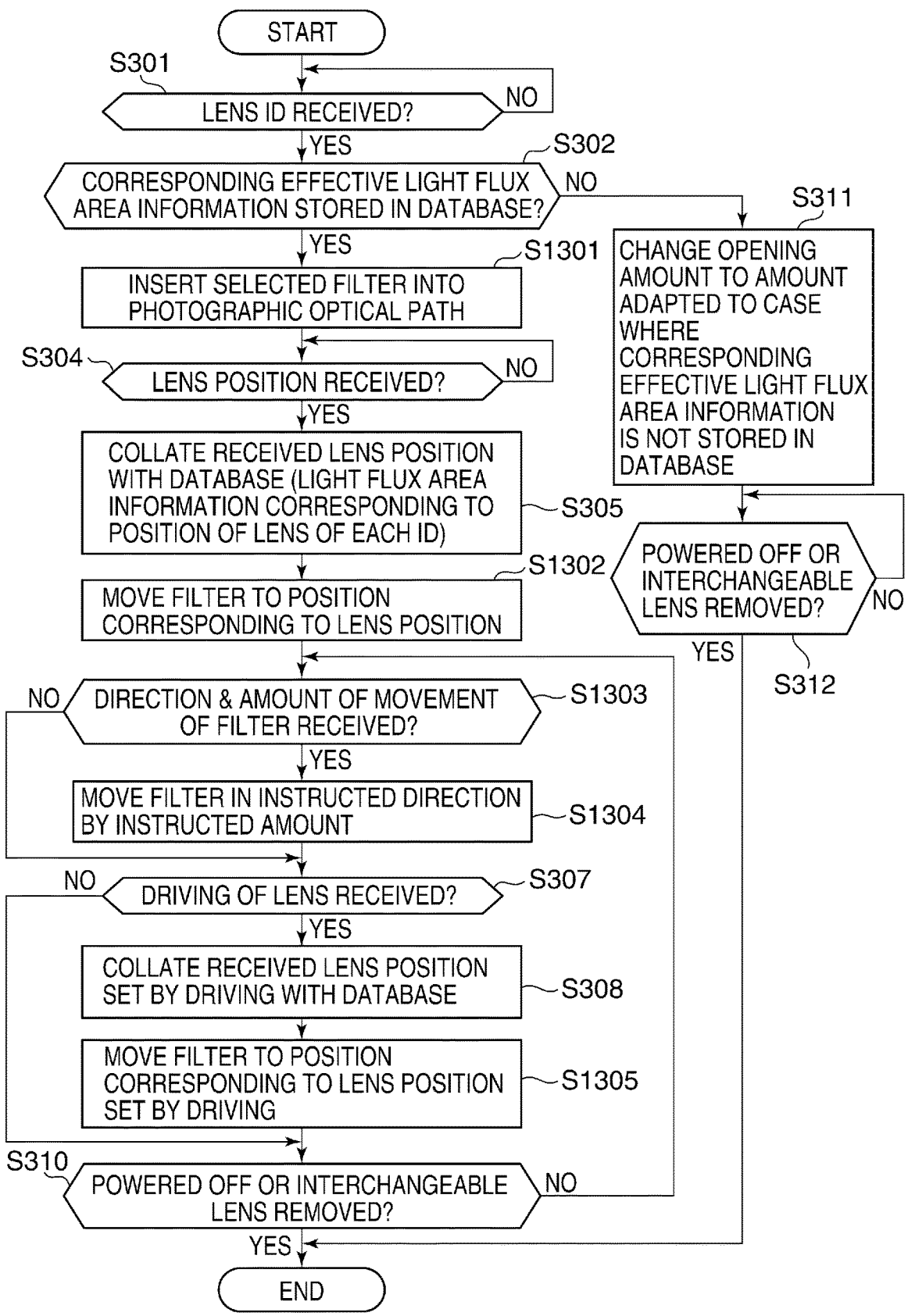
FIG. 30 is a flowchart of a control process for controlling the ND unit of the seventh embodiment.

FIG. 30 is a flowchart of a control process for controlling the ND unit 500. Processing in each step of the control process in FIG. 30 is realized by the camera microcomputer 125 executing a predetermined associated program and thereby controlling the operations of components of the camera body 1. In the control process in FIG. 30, steps corresponding to the steps of the control process in FIG. 8 are denoted by the same step numbers, and description thereof is omitted.

If the answer to the question of the step S302 is affirmative (YES), the camera microcomputer 125 proceeds to a step S1301. In the step S1301, the camera microcomputer 125 drives the ND actuator 570 so as to insert an optical filter selected by the photographer into a position where the lower side of the acquired maximum effective light flux area is not shielded. After execution of the step S1301, the camera microcomputer 125 proceeds to the step S304. In a step S1302 following the step S305, the camera microcomputer 125 drives the ND actuator 570 so as to move the mask member of the optical filter inserted in the photographic optical path to the position where the lower side of the maximum effective light flux area, acquired in the step S305, is not shielded.

In a step S1303 following the step S1302, the camera microcomputer 125 determines whether or not a direction and an amount of moving the optical filter have been input by a photographer's operation. If it is determined that a direction and an amount of moving the optical filter have been received (YES to the step S1303), the camera microcomputer 125 proceeds to a step S1304. In the step S1304, the camera microcomputer 125 drives the ND actuator 570 to move the optical filter by the received movement amount in the received moving direction.

After execution of the step S1304, the camera microcomputer 125 proceeds to the step S307. Further, if it is determined in the step S1303 that a direction and an amount of moving the optical filter have not been received (NO to the step S1303), the camera microcomputer 125 directly proceeds to the step S307. In a step S1305 following the step S308, the camera microcomputer 125 drives the ND actuator 570 so as to move the mask member of the optical filter to the position where the lower side of the effective light flux area, acquired in the step S308, is not shielded. After execution of the step S1305, the camera microcomputer 125 proceeds to the step S310.

Although in the present embodiment, the position of the opening of the optical filter (position of the mask member) is adjusted so as not to shield the lower side of the maximum effective light flux area of the mounted interchangeable lens 2 in the steps S1301, S1302, and S1305, the opening of the optical filter may be preferentially adjusted so as not to shield the upper side in place of the lower side. Further, the photographer may be enabled to select which to prioritize, the upper side or the lower side. According to the present embodiment, the position of the optical filter in the ND unit 500 is adjusted so as not to shield the lower side (or the upper side) of the effective light flux area according to the state of the interchangeable lens 2 mounted on the image pickup apparatus 100A, whereby it is possible to suppress unnecessary light from entering the image pickup device 15.

Figure 31A:
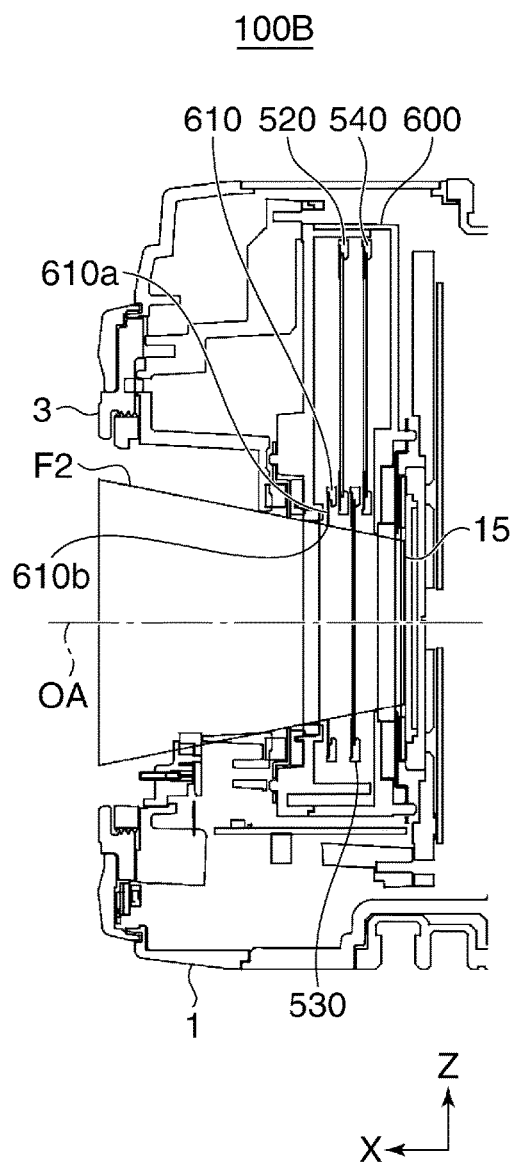
FIGS. 31A and 31B are vertical cross-sectional views of an image pickup apparatus according to an eighth embodiment.
Figure 31B:
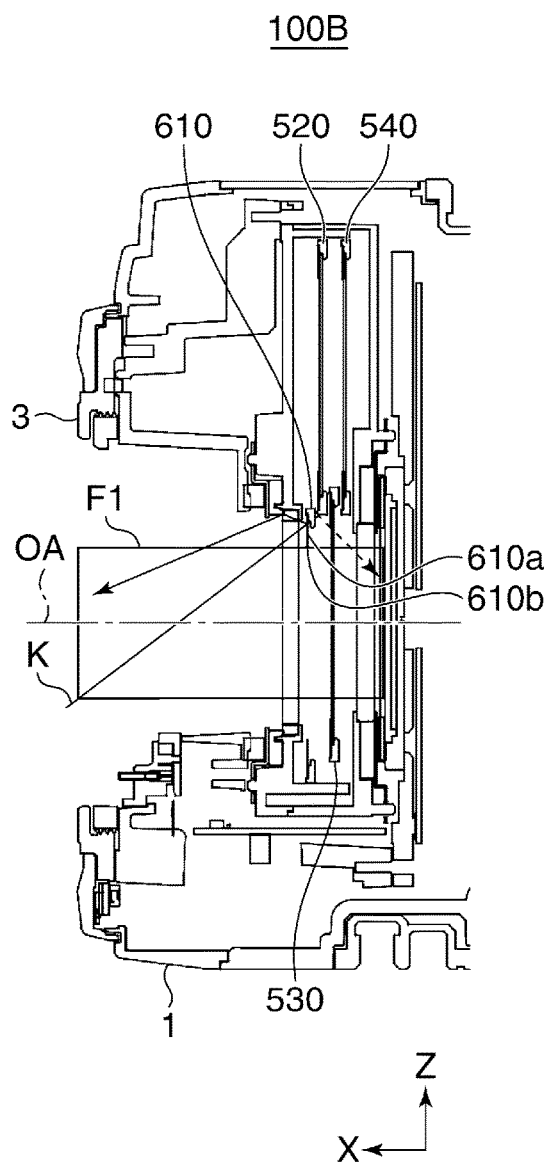

Next, a description will be given of an eighth embodiment of the present invention. FIGS. 31A and 31B are vertical cross-sectional views (cross-sectional views which include the optical axis OA and are orthogonal to the Y-axis) of an image pickup apparatus 100B. FIG. 31A shows a state in which an interchangeable lens 2 which is large in effective light flux is mounted, and FIG. 31B shows a state in which an interchangeable lens 2 which is small in effective light flux is mounted. The image pickup apparatus 100B differs from the image pickup apparatus 100A according to the seventh embodiment in that an ND unit 600 is provided in place of the ND unit 500 of the image pickup apparatus 100A. Therefore, the same component elements of the image pickup apparatus 100B as those of the image pickup apparatus 100A are denoted by the same reference numerals, and description thereof is omitted. Further, the same component elements of the ND unit 600 as those of the ND unit 500 are denoted by the same reference numerals, and description thereof is omitted.

The ND unit 600 included in the image pickup apparatus 100B includes a frame member 610 as the first optical filter, the second optical filter 520, the third optical filter 530, and the fourth optical filter 540, which are arranged in the mentioned order from the mount 3 toward the image pickup device 15. The frame member 610 has an opening 610*b* in which no optical glass in fitted. The frame member 610 is formed by a light shielding member, and is always used in the inserted state. The frame member 610 is moved in the Z-axis direction within the photographic optical path in accordance with the effective light flux of the interchangeable lens 2 mounted on the camera body 1, whereby it is possible to shield unnecessary light by the frame member 610. The frame member 610 has an effect of reducing unnecessary light entering the image pickup device 15, and hence the frame member 610 can be defined as the first optical filter.

In FIGS. 31A and 31B, the frame member 610 and the third optical filter 530 are in the inserted state, and the second optical filter 520 and the fourth optical filter 540 are in the retracted state. Similarly to the ND unit 500, the second to fourth optical filters 520 to 540 can be each controlled to be in the inserted state or the retracted state, and the positions of the second to fourth optical filters 520 to 540 in the Z-axis direction can be individually adjusted in the inserted state.

The frame member 610 is disposed at a location close to the mount 3, whereby it is possible to more effectively prevent unnecessary light from entering the image pickup device 15. The reason for this is as follows: For example, as shown in FIG. 31B, without the frame member 610, light entering at such an angle as indicated by a light beam K would be reflected by an edge surface of a component within the camera body 1, and then enter the image pickup device 15, as indicated by a broken-line arrow. On the other hand, if the frame member 610 is disposed at the location close to the mount 3 and an opening 610*a* of the frame member 610 is moved to a position where upper part of the effective light flux F1 (positive Z-axis direction) is shielded, then, the light beam K is reflected by the surface of the frame member 610, close to the mount 3, and returns toward the interchangeable lens 2 (not shown) as indicated by a solid arrow. Therefore, it is possible to reduce light reflected by an edge surface of a component within the camera body 1, and prevent unnecessary light from entering the image pickup device 15.

Although in the present embodiment, the frame member 610 without an optical glass is disposed at the location close to the mount 3, this is not limitative, but e.g. a low-pass filter may be disposed in the opening 610*a* of the frame member 610.

Figure 32:
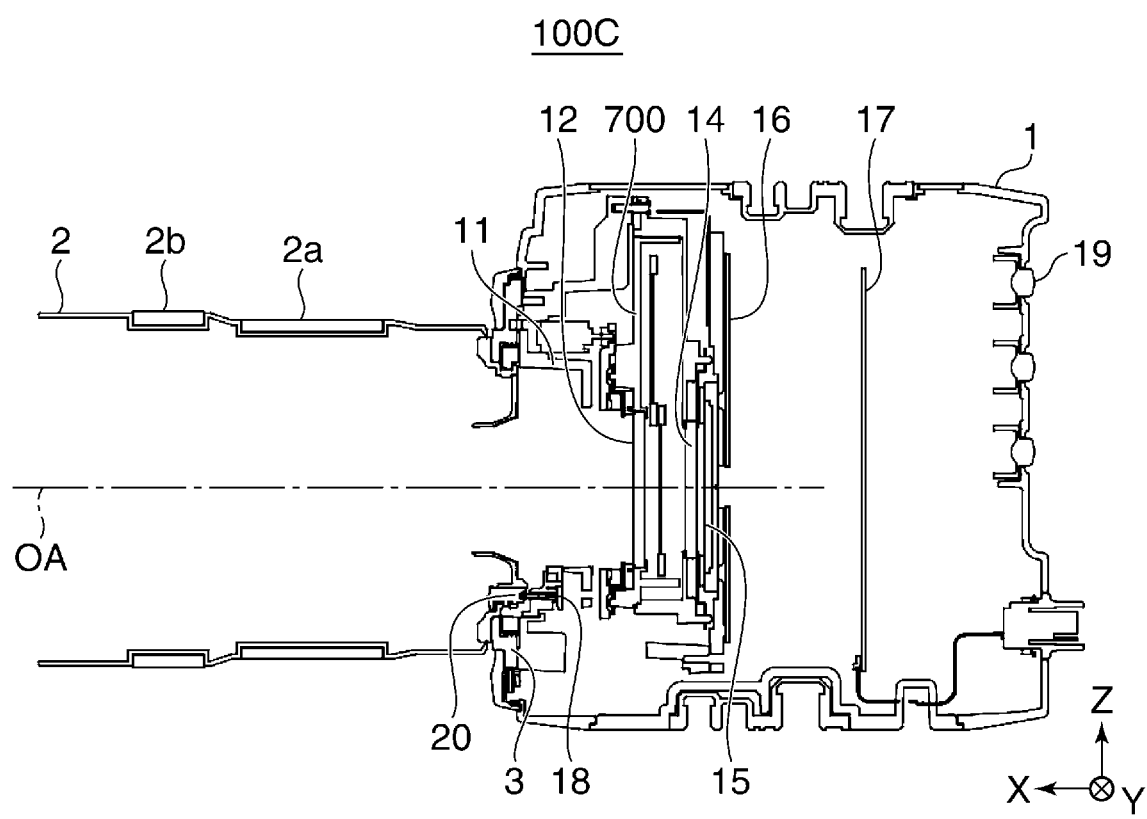
FIG. 32 is a vertical cross-sectional view of an image pickup apparatus according to a ninth embodiment.
Figure 33:
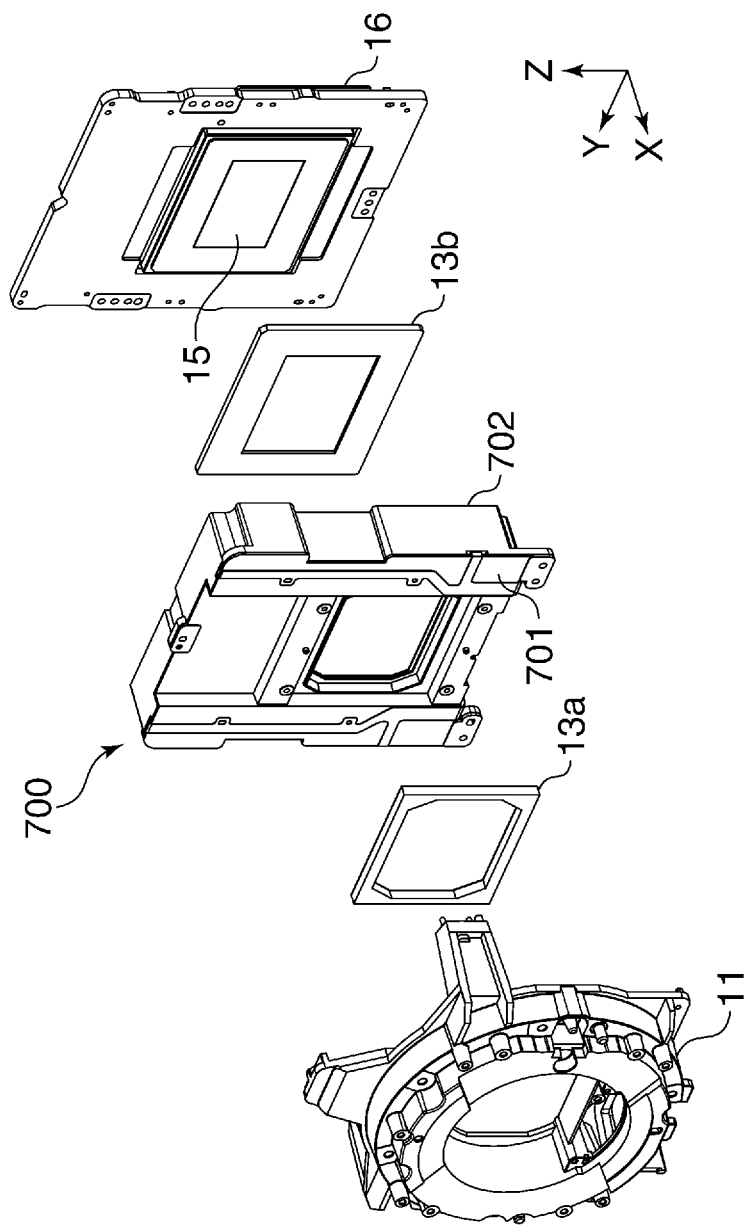
FIG. 33 is a partial exploded perspective view of the image pickup apparatus according to the ninth embodiment.

Next, a description will be given of a ninth embodiment of the present invention. FIG. 32 is a vertical cross-sectional view (cross-sectional view which includes the optical axis OA and is orthogonal to the Y-axis) of an image pickup apparatus 100C according to the ninth embodiment. FIG. 33 is a partial exploded perspective view of the image pickup apparatus 100C. The image pickup apparatus 100C differs from the image pickup apparatus 100 according to the first embodiment in that an ND unit 700 is provided in place of the unnecessary light reduction member 10 and the ND unit 13 of the image pickup apparatus 100. Therefore, the same component elements of the image pickup apparatus 100C as those of the image pickup apparatus 100 are denoted by the same reference numerals, and description thereof is omitted.

Figure 34:
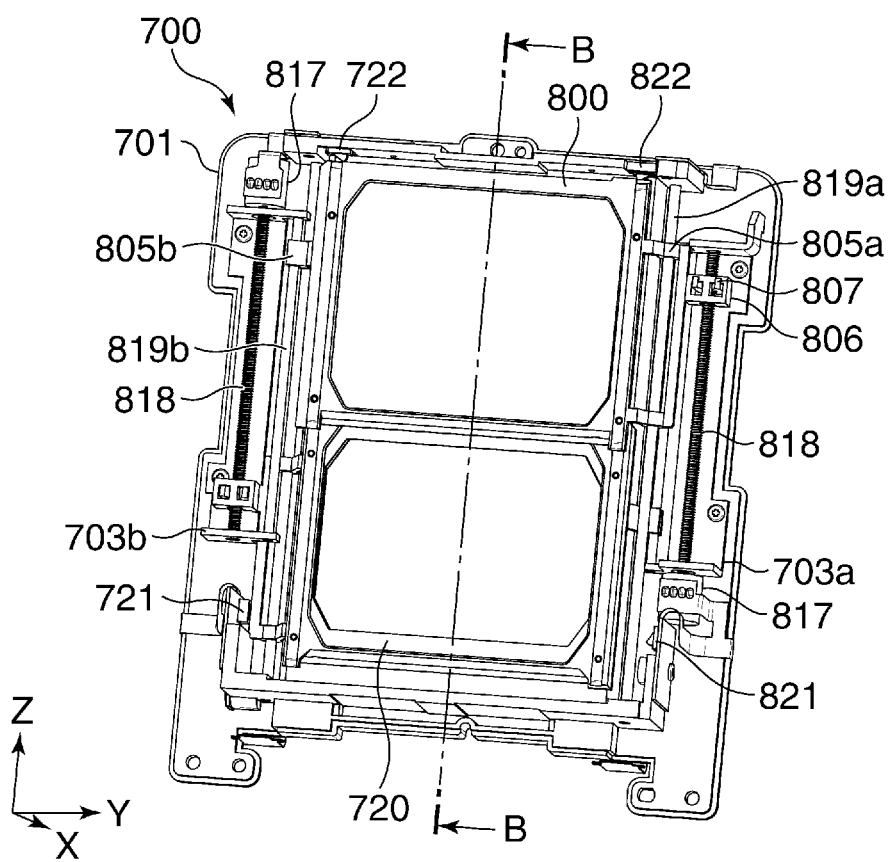
FIG. 34 is a perspective view useful in explaining an internal structure of an ND unit of the ninth embodiment.

The ND unit 700 included in the image pickup apparatus 100C incorporates a plurality of optical filters (specifically, two optical filters), such as an ND filter and an infrared absorption filter, and each optical filter can be individually inserted into and retracted from the photographic optical path by motors 817 (see FIG. 34). The ND unit 700 includes exterior covers 701 and 702 forming the exterior.

FIG. 34 is a perspective view useful in explaining the internal structure of the ND unit 700, which shows a state in which the exterior cover 702 has been removed. The ND unit 700 has a first filter holding member 720 and a second filter holding member 800 disposed therein movable in the Z-axis direction, and has a structure in which when one of these filter holding members is inserted into the photographic optical path, the other is retracted out of the photographic optical path. In FIG. 32, the first filter holding member 720 is in the retracted state and the second filter holding member 800 is in the inserted state, while in FIG. 34, the first filter holding member 720 is in the inserted state and the second filter holding member 800 is in the retracted state. Holding metal sheets 703*a* and 703*b* are attached to the exterior cover 701, and guide shafts 819*a* and 819*b* are fixed to the holding metal sheets 703*a* and 703*b*, respectively. The motors 817 are mounted on the holding metal sheets 703*a* and 703*b*, respectively, and lead screws 818 are rotatably fitted to the two motors 817, respectively.

Figure 35:
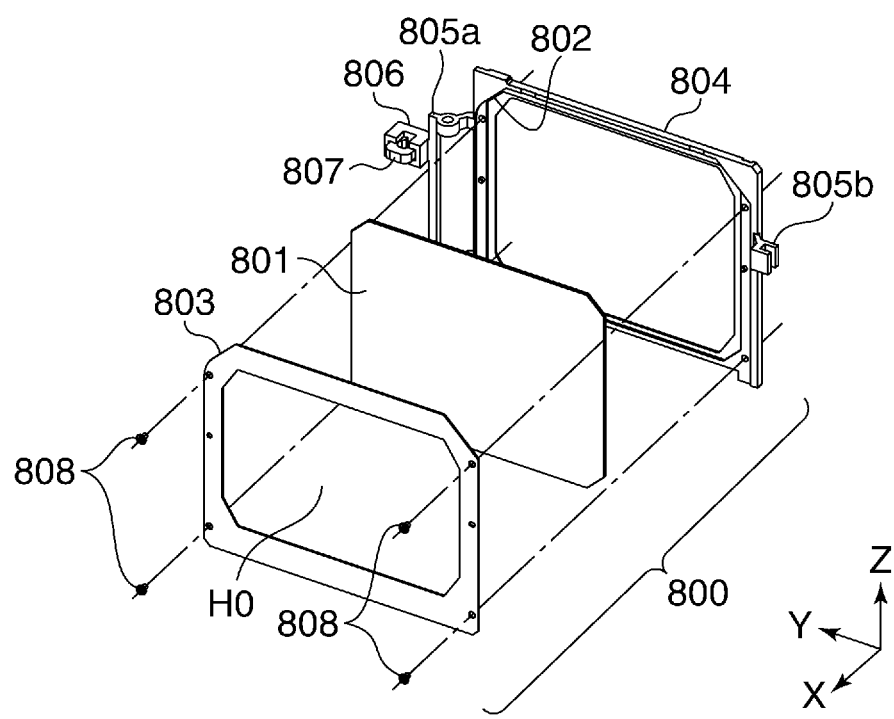
FIG. 35 is an exploded perspective view of a filter holding member of the ND unit of the ninth embodiment.

The method of moving the optical filter holding member in the Z-axis direction will be described, by taking the second filter holding member 800 as an example. FIG. 35 is an exploded perspective view of the second filter holding member 800. The second filter holding member 800 includes a holding frame 804, a second optical filter 801, and a thin plate member 803, and the thin plate member 803 is formed with an opening HO. The thin plate member 803 is formed of a light shielding material so as to reduce reflection of light from the interchangeable lens side, and to further reduce reflection of light from an edge surface, the thin plate member 803 is molded to be thinner than an edge portion of the holding frame 804. The second optical filter 801 is fitted in a vertical wall portion 802 of the holding frame 804, and the thin plate member 803 is arranged to surround the outer periphery of the second optical filter 801. The second optical filter 801 is fixed with fixing screws 808 in a state held between the vertical wall portion 802 and the thin plate member 803. Note that the fixing screws 808 are arranged to be invisible when the ND unit 700 is viewed from the mount 3. The method of fixing the second optical filter 801 is not limited to this, but for example, the second optical filter 801 may be fixed e.g. with an adhesive, and further, the second filter holding member 800 may have a structure without the thin plate member 803.

The holding frame 804 has arm portions 805a and 805b extending substantially in the Y-axis direction. The arm portion 805a is formed with a hole, through which the guide shaft 819a is slidably inserted. Further, the arm portion 805b is formed with a slit, through which the guide shaft 819b is slidably fitted. Further, the arm portion 805a is provided with a nut holding portion 806 extending therefrom and holding a nut 807, and the nut 807 is meshed with the lead screw 818. Therefore, when the motor 817 is driven, the lead screw 818 is rotated, and the nut 807 is moved in the Z-axis direction in accordance with rotation of the lead screw 818, whereby the whole second filter holding member 800 is moved in the Z-axis direction while being guided by the guide shafts 819a and 819b.

An insertion-side detection switch 821 and a retraction-side detection switch 822 are provided on the exterior cover 701. When the second filter holding member 800 is inserted into the photographic optical path, thereby causing the arm portion 805a to press the insertion-side detection switch 821, it is detected that the second filter holding member 800 is in the inserted position in the photographic optical path. On the other hand, when the retraction-side detection switch 822 is pressed by an upper end of the holding frame 804, it is detected that the second filter holding member 800 is in the retracted position outside the photographic optical path. Note that the structure of the first filter holding member 720 is almost the same as that of the second filter holding member 800, and the method of moving the first filter holding member 720 is also the same as that of the second filter holding member 800, and hence description thereof is omitted. Further, an insertion-side detection switch 721 and a retraction-side detection switch 722 are provided on the exterior cover 701, and similarly to the second filter holding member 800, it is possible to detect whether the first filter holding member 720 is in the inserted position or the retracted position using these switches 721 and 722.

Next, how the ND unit 700 suppresses unnecessary light from entering the image pickup device 15 will be described. FIGS. 36A and 36B are cross-sectional views taken along B-B in FIG. 34. FIG. 36A is a cross-sectional view showing a state in which an interchangeable lens, large in effective light flux, is mounted, and FIG. 36B is a cross-sectional view showing a state in which an interchangeable lens, small in effective light flux, is mounted. FIGS. 37A and 37B are front views corresponding to FIGS. 36A and 36B, respectively. FIG. 37A corresponds to FIG. 36A and shows a state in which the interchangeable lens, large in effective light flux F2, is mounted, and FIG. 37B corresponds to FIG. 36B and shows a state in which the interchangeable lens, small in effective light flux F1, is mounted.

In the image pickup apparatus 100C, the camera microcomputer 125 collates the lens information received from the interchangeable lens 2 with the light flux area information stored in the lens database 128, and acquires the corresponding light flux area information. The camera microcomputer 125 moves the first filter holding member 720 and the second filter holding member 800 to the respective positions where the effective light flux is not shielded and also unnecessary light can be effectively suppressed from entering the image pickup device 15, whereby the size of the opening is controlled based on the acquired light flux area information. More specifically, as shown in FIGS. 36A and 37A, to cope with the large effective light flux F2, the second filter holding member 800 is retracted from the photographic optical path. On the other hand, as shown in FIGS. 36B an 37B, to cope with the small effective light flux F1, the first filter holding member 720 is moved in the positive Z-axis direction by a distance $\Delta Z1$, and the second filter holding member 800 is moved in the negative Z-axis direction by a distance $\Delta Z2$, to reduce an opening HO, whereby unnecessary light is shielded.

Note that the inserted position and the retracted position of the first filter holding member 720 and the second filter holding member 800 are known by the insertion-side detection switch 821 and the retraction-side detection switch 822. Therefore, the camera microcomputer 125 drives the motors 817 by a rotational amount corresponding to a necessary movement amount, starting from a position corresponding to turn-on/off of each switch, whereby it is possible to adjust the opening HO to a desired size. In the case of an interchangeable lens, small in effective light flux F1, as well, when setting the first filter holding member 720 to the retracted state and the second filter holding member 800 to the inserted state, it is only required to adjust the positions of the first filter holding member 720 and the second filter holding member 800 in the Z-axis direction similarly to the above. That is, it is only required to determine the position of an edge of the opening HO in the positive Z-axis direction by the position of the end portion of the first filter holding member 720 in the negative Z-axis direction, and the position of an edge of the opening HO in the negative Z-axis direction by the position of an edge of the opening of the second filter holding member 800.

Figure 38:
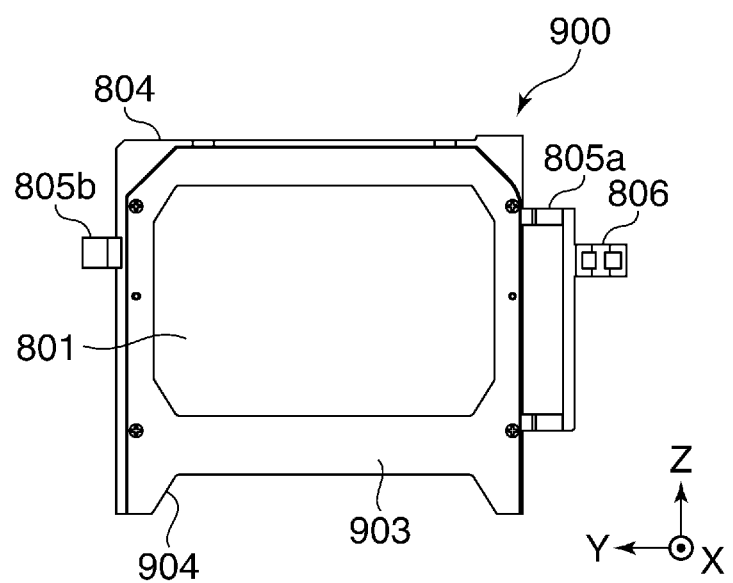
FIG. 38 is a front view of a second filter holding member of a tenth embodiment.
Figure 39:
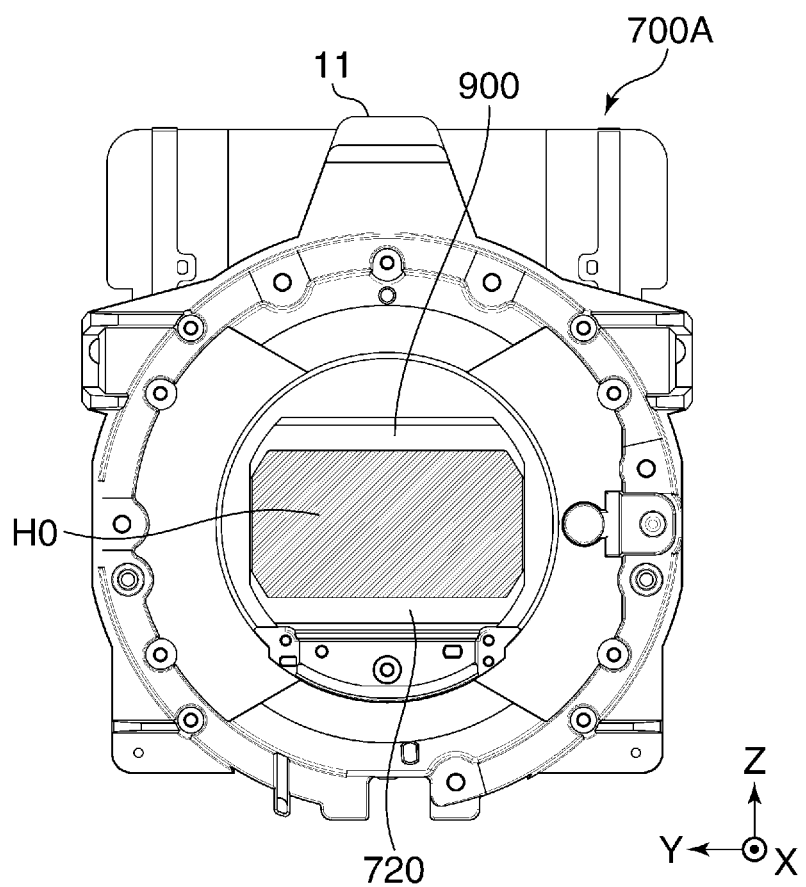
FIG. 39 is a front view of the ND unit having the second filter holding member shown in FIG. 38.

Next, a description will be given of a tenth embodiment of the present invention. In the present embodiment, a variation of the ND unit 700 described in the ninth embodiment will be described. FIG. 38 is a front view of a second filter holding member 900 as a variation of the second filter holding member 800 described in the ninth embodiment. FIG. 39 is a front view of an ND unit 700A having the first filter holding member 720 and the second filter holding member 900, as viewed from the front base 11. The same component elements of the second filter holding member 900 as those of the second filter holding member 800 are denoted by the same reference numerals, and description thereof is omitted.

The second filter holding member 900 includes a thin plate member 903, and an end portion (end in the negative Z-axis direction) of the thin plate member 903, which is inserted into the photographic optical path, is formed with a cutout 904 having a substantially trapezoidal shape. Therefore, as shown in FIG. 39, when the width of the opening HO in the Z-axis direction is reduced by the first filter holding member 720 and the second filter holding member 900, it is possible to shield light at the corners in the positive Z-axis direction, and hence it is possible to more effectively suppress unnecessary light from entering the image pickup device 15. Note that the construction of the second filter holding member 900 can be applied to the first filter holding member 720. This makes it possible to realize the same state as that shown in FIG. 39 when the second filter holding member 900 is in the inserted state and the first filter holding member 720 is in the retracted state.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Further, the embodiments of the present invention are described only by way of example, and it is possible to combine the embodiments, on an as-needed basis. For example, in the first embodiment, the description is given of the unnecessary light reduction member 10 which adjusts the opening amount by driving the two blade members (the front blade 102 and the rear blade 104). However, the structure of the unnecessary light reduction member 10 is not limited to this, but the opening amount may be adjusted by using three or more blade members.

Further, although in the above-described embodiments, the camera body 1 includes the lens database 128, the camera body 1 may be configured such that a communication unit which enables communication with an external apparatus is provided in the camera body 1, and the effective light flux area is identified by accessing the lens database stored in the external apparatus. Further, the number of optical filters included in the above-described various ND units is not limited to the above examples. Further, the types of the optical filters included in the ND unit are only required to be set at any time needed by taking the use and the like thereof into consideration, and the ND filter is not necessarily required to be included. Further, for example, although in the seventh embodiment, the description is given of the construction for adjusting the position of the optical filter in the Z-axis direction, the position of the optical filter may be adjusted in the Y-axis direction.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2017-055837 filed Mar. 22, 2017, which is hereby incorporated by reference herein in its entirety.

What is claimed is:

1. An image pickup apparatus on and from which a lens unit can be mounted and removed, comprising:
    an image pickup device;
    a mount on and from which the lens unit is mounted and removed;
    a light shield that is provided between the image pickup device and the mount, and shields light in a peripheral part of a light flux guided by the lens unit by having an opening amount thereof adjusted in a photographic optical path; and
    a processor configured to control the opening amount of the light shield based on information on the lens unit mounted on the mount,
    wherein the processor controls the opening amount of the light shield, based on the information on the lens unit, such that an unnecessary light flux other than an effective light flux entering the image pickup device through the lens unit is suppressed from entering the image pickup device.

2. The image pickup apparatus according to claim 1, further comprising:
    a memory configured to store light flux information of an interchangeable lens which can be mounted on the image pickup apparatus,
    wherein the processor is further configured to function as an acquisition unit configured to acquire the information on the lens unit from the lens unit mounted on the mount, and
    wherein the processor controls the opening amount of the light shield such that an effective light flux area of light entering the image pickup device through the lens unit is not shielded, by collating the information on the lens unit acquired by the acquisition unit with the light flux information stored in the memory.

3. The image pickup apparatus according to claim 2, wherein the information on the lens unit includes information on a model of the lens unit, and
    wherein the memory stores light flux information corresponding to the information on the model.

4. The image pickup apparatus according to claim 2, wherein in a case where the information on the lens unit cannot be acquired from a lens unit mounted on the image pickup apparatus, the processor controls the opening amount of the light shield to an opening amount at which an effective light flux of a lens, which is the largest in effective light flux entering the image pickup device, of lenses that can be mounted on the mount, is not shielded.

5. The image pickup apparatus according to claim 1, wherein the processor controls the opening amount of the light shield according to a predetermined operation of the lens unit mounted on the mount.

6. The image pickup apparatus according to claim 5, wherein the predetermined operation includes at least one of operations of a zoom lens, a focus lens, and a diaphragm, which are included in the lens unit.

7. The image pickup apparatus according to claim 1, wherein the processor controls the opening amount of the light shield, in a state in which the image pickup apparatus has been powered on, in response to mounting of the lens unit on the image pickup apparatus.

8. The image pickup apparatus according to claim 1, further comprising a shutter that is different from the light shield, and is capable of traveling according to an exposure time period of the image pickup device, and
    wherein the light shield includes a plurality of blades, and
    wherein the processor changes the opening amount of the light shield by moving the plurality of blades within a plane which is orthogonal to an optical axis, and is different from a traveling plane of the shutter.

9. The image pickup apparatus according to claim 1, further comprising a shutter that is different from the light shielding member, and is capable of traveling according to an exposure time period of the image pickup device, and wherein the light shielding member is a disc-shaped member which has a plurality of openings which are different in opening area, and is arranged such that a radial direction thereof is orthogonal to the optical axis, and wherein the control unit controls the opening amount of the light shielding member, by rotating the disc-shaped member within a plane which is orthogonal to the optical axis and is different from a traveling plane of the shutter, to thereby insert one of the plurality of openings, which has a predetermined opening area, into the photographic optical path.

10. The image pickup apparatus according to claim 1, further comprising a shutter that is different from the light shielding member, and is capable of traveling according to an exposure time period of the image pickup device, and wherein the light shielding member includes a plurality of disc-shaped members each of which is formed with a plurality of openings and which are arranged such that a radial direction thereof is orthogonal to the optical axis, and at predetermined space intervals in the optical axis direction, and wherein the control unit controls the opening amount of the light shielding member, by rotating the plurality of disc-shaped members within planes which are orthogonal to the optical axis and are different from a traveling plane of the shutter, respectively.

11. The image pickup apparatus according to claim 10, wherein at least one of the plurality of disc-shaped members can be moved in the optical axis direction.

12. The image pickup apparatus according to claim 11, further comprising a clutch mechanism configured to allow the disc-shaped member to move in the optical axis direction in a case where the disc-shaped member is rotated in a first direction, and restricts the disc-shaped member from moving in the optical axis direction in a case where the disc-shaped member is rotated in a second direction opposite to the first direction.

13. The image pickup apparatus according to claim 10, further comprising an optical filter disposed in at least one of the plurality of openings, for reducing an amount of light entering the image pickup device.

14. The image pickup apparatus according to claim 1, further comprising:

a shutter that is different from the light shielding member, and is capable of traveling according to an exposure time period of the image pickup device; and an optical filter configured to reduce an amount of light entering the image pickup device, and wherein the light shielding member includes a plurality of frame members which are arranged at predetermined space intervals in the optical axis direction, and can be individually inserted into and retracted from the photographic optical path on a plane which is orthogonal to the optical axis and is different from a traveling plane of the shutter, wherein the optical filter is disposed in at least one of the plurality of frame members, and wherein the control unit causes one or a plurality of frame members, selected from the plurality of frame members, to be inserted into the photographic optical path.

15. The image pickup apparatus according to claim 14, wherein the control unit controls the opening amount of the light shielding member by adjusting a position of a frame member which is inserted in the photographic optical path, out of the plurality of frame members, in a direction of inserting and retracting the frame member.

16. The image pickup apparatus according to claim 14, wherein the control unit controls the opening amount of the light shielding member by adjusting a position of a frame member which is retracted from the photographic optical path, out of the plurality of frame members, in the direction of inserting and retracting the frame member into and from the photographic optical path.

17. The image pickup apparatus according to claim 14, further comprising a detection unit configured to detect a position of a light source, and wherein the control unit adjusts a position of a frame member inserted in the photographic optical path, out of the plurality of frame members, in the direction of inserting and retracting the frame member, according to the position of the light source detected by the detection unit.

18. A method of controlling an image pickup apparatus on and from which a lens unit can be mounted and removed, including an image pickup device, a mount part on and from which the lens unit is mounted and removed, and a light shielding member that is provided between the image pickup device and the mount part, and shields light in a peripheral part of a light flux guided by the lens unit by having an opening amount thereof adjusted in a photographic optical path, the method comprising:

controlling an opening amount of the light shielding member based on information on the lens unit mounted on the mount part, and controlling the opening amount of the light shielding member, based on the information on the lens unit, such that an unnecessary light flux other than an effective light flux entering the image pickup device through the lens unit is suppressed from entering the image pickup device.

* * * * *